United States Patent [19]

Neuhard et al.

[11] Patent Number: 5,875,484
[45] Date of Patent: *Feb. 23, 1999

[54] METHOD AND SYSTEM FOR DETERMINING AND OVERRIDING INFORMATION UNAVAILABILITY TIME AT A COUPLING FACILITY

[75] Inventors: Deborah Elizabeth Neuhard, Poughkeepsie; Jeffrey Mark Nick, Fishkill; Kelly Brusie Pushong, Highland; Michael Dustin Swanson, Poughkeepsie, all of N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 779,196

[22] Filed: Jan. 6, 1997

Related U.S. Application Data

[60] Division of Ser. No. 146,647, Nov. 1, 1993, Pat. No. 5,630,050, which is a continuation-in-part of Ser. No. 73,909, Jun. 8, 1993, Pat. No. 5,761,739.

[51] Int. Cl.$^6$ .................................................. G06F 13/14
[52] U.S. Cl. ........................ 711/167; 711/163; 711/162; 395/200.3; 395/672; 395/726; 395/181
[58] Field of Search .................................. 395/472, 490, 395/494, 672, 200.33, 200.3–200.47, 726, 182.09, 181; 711/145, 163, 167, 162

[56] References Cited

U.S. PATENT DOCUMENTS

| | | | |
|---|---|---|---|
| 3,805,247 | 4/1974 | Zucker et al. | 395/566 |
| 4,442,485 | 4/1984 | Ota et al. | 395/877 |
| 4,463,424 | 7/1984 | Mattson et al. | 711/136 |
| 4,775,932 | 10/1988 | Oxley et al. | 707/206 |
| 4,870,572 | 9/1989 | Hosono et al. | 711/153 |
| 4,907,151 | 3/1990 | Bartlett | 711/166 |
| 4,907,161 | 3/1990 | Sansone et al. | 705/403 |
| 4,914,577 | 4/1990 | Stewart et al. | 711/207 |

(List continued on next page.)

FOREIGN PATENT DOCUMENTS

| | | |
|---|---|---|
| 58846 | 9/1982 | European Pat. Off. . |
| 57-137936 | 8/1982 | Japan . |
| 04-370849 | 12/1992 | Japan . |

OTHER PUBLICATIONS

Andrew S. Tanenbaum, "Modern Operating System", pp. 402–406 and pp. 433–436, 1992.

Andrew S. Tanenbaum, "Modern Operating System", 1992, Prentice Hall, Inc., pp. 27–71 and pp. 240–262.

"IBMSystem/390 Principles of Operation," Form No. SA22–7201–00 (1990).

Geake, Mainframe Matters, Electronics Weekly, n1522, p. 10(1), (Sep. 12, 1990).

MVS/ESA Application Development Reference: Services For Authorized Assembler Language Program, IBM Publication No. GC28–1650, pp. 17–25 (Copyright 1988, 1991).

Primary Examiner—Tod R. Swann
Assistant Examiner—Hong C. Kim
Attorney, Agent, or Firm—Heslin & Rothenberg, P.C.; Lawrence D. Cutter

[57] ABSTRACT

A method and system for capturing and controlling access to information in a data processing system are provided. The data processing system includes one or more operating systems coupled to a coupling facility. When one or more operating systems lose communication with the coupling facility, a surviving operating system captures some or all of the information in the coupling facility, including that information associated with the failed operating system(s). In order to capture the information when a system fails or at any other time, the information in the coupling facility is serialized, thereby preventing all access to the information except for those commands capturing the information. While the information is serialized, requests for the information are queued and then re-driven once serialization is released. If an operating system loses communication with the coupling facility during the creation of a dump, another operating system will continue the dump.

12 Claims, 47 Drawing Sheets

U.S. PATENT DOCUMENTS

| | | | |
|---|---|---|---|
| 4,989,132 | 1/1991 | Mellender et al. | 395/705 |
| 5,008,853 | 4/1991 | Bly et al. | 395/331 |
| 5,065,311 | 11/1991 | Masai et al. | 395/182.18 |
| 5,095,480 | 3/1992 | Fenner | 370/238 |
| 5,101,494 | 3/1992 | Bilski et al. | 395/704 |
| 5,111,384 | 5/1992 | Aslanian et al. | 395/183.02 |
| 5,155,678 | 10/1992 | Fukumoto et al. | 707/202 |
| 5,161,227 | 11/1992 | Dias et al. | 395/674 |
| 5,175,849 | 12/1992 | Schneider | 707/202 |
| 5,193,171 | 3/1993 | Shinmura et al. | 711/113 |
| 5,226,145 | 7/1993 | Moronaga et al. | 711/202 |
| 5,289,470 | 2/1994 | Chang et al. | 711/173 |
| 5,317,739 | 5/1994 | Elko et al. | 395/200.46 |
| 5,339,427 | 8/1994 | Elko et al. | 395/673 |
| 5,375,233 | 12/1994 | Kimber et al. | 707/205 |
| 5,388,266 | 2/1995 | Frey et al. | 711/163 |
| 5,390,328 | 2/1995 | Frey et al. | 395/683 |
| 5,394,555 | 2/1995 | Hunter et al. | 711/148 |
| 5,442,785 | 8/1995 | Roffe et al. | 707/8 |
| 5,457,793 | 10/1995 | Elko et al. | 707/205 |
| 5,463,754 | 10/1995 | Beausoleil et al. | 395/200.43 |
| 5,493,668 | 2/1996 | Elko et al. | 711/130 |
| 5,504,857 | 4/1996 | Baird et al. | 395/182.04 |
| 5,537,574 | 7/1996 | Elko et al. | 711/141 |
| 5,544,345 | 8/1996 | Carpenter et al. | 711/150 |
| 5,559,979 | 9/1996 | Shiga et al. | 711/218 |
| 5,566,319 | 10/1996 | Lenz | 711/147 |

| | |
|---|---|
| TOTAL-DIRECTORY-ENTRY COUNT | (TDEC) |
| TOTAL-DATA-AREA-ELEMENT COUNT | (TDAEC) |
| ADJUNCT-ASSIGNMENT INDICATOR | (AAI) |
| MAXIMUM STORAGE CLASS | (MSC) |
| MAXIMUM CASTOUT CLASS | (MCC) |
| DATA-AREA-ELEMENT CHARACTERISTIC | (DAEX) |
| MAXIMUM DATA-AREA SIZE | (MDAS) |
| STRUCTURE SIZE | (SS) |
| MAXIMUM STRUCTURE SIZE | (MXSS) |
| MINIMUM STRUCTURE SIZE | (MNSS) |
| STRUCTURE AUTHORITY | (SAU) |
| USER STRUCTURE CONTROL | (USC) |
| LCID VECTOR | (LCIDV) |
| TARGET STRUCTURE SIZE | (TSS) |
| TARGET DATA AREA ELEMENT COUNT | (TGDAEC) |
| TARGET DIRECTORY-ENTRY COUNT | (TGDEC) |

| | |
|---|---|
| NAME | (N) |
| USER-DATA FIELD | (UDF) |
| STORAGE CLASS | (SC) |
| CHANGE INDICATOR | (C) |
| DATA-CACHED INDICATOR | (D) |
| CAST-OUT-PARITY-BITS INDICATOR | (CP) |
| CAST-OUT CLASS | (CC) |
| CAST-OUT-LOCK VALUE | (CLV) |
| DATA-AREA SIZE | (DAS) |
| LCEN-VALIDITY INDICATOR | (LVI) |
| LOCAL-CACHE ENTRY NUMBER | (LCEN) |

| | |
|---|---|
| MAXIMUM DATA-LIST-ENTRY SIZE | (MDLES) |
| LIST-STRUCTURE TYPE | (LST) |
| LOCK-TABLE-ENTRY CHARACTERISTIC | (LTEX) |
| LIST-ELEMENT CHARACTERISTIC | (LELX) |
| MINIMUM STRUCTURE SIZE | (MNSS) |
| LOCK-TABLE-ENTRY COUNT | (LTEC) |
| LIST COUNT | (LC) |
| STRUCTURE SIZE | (SS) |
| MAXIMUM STRUCTURE SIZE | (MXSS) |
| TARGET STRUCTURE SIZE | (TSS) |
| TARGET MAXIMUM-ELEMENT COUNT | (TMELC) |
| TARGET MAXIMUM-ENTRY COUNT | (TMEC) |
| MAXIMUM LIST-SET-ELEMENT COUNT | (MLSELC) |
| LIST-SET-ELEMENT COUNT | (LSELC) |
| NON-ZERO-LOCK-TABLE-ENTRY COUNT | (NLTEC) |
| MAXIMUM LIST-SET-ENTRY COUNT | (MLSELC) |
| LIST-SET-ENTRY COUNT | (LSEC) |
| STRUCTURE AUTHORITY | (SAU) |
| USER STRUCTURE CONTROL | (USC) |
| USER-IDENTIFIER VECTOR | (UIDV) |

| USER IDENTIFIER | (UID) |
|---|---|
| USER STATE | (US) |
| LIST-NOTIFICATION TOKEN | (LNT) |
| USER AUTHORITY | (UAU) |
| SYSTEM IDENTIFIER | (SYID) |
| USER-ATTACHMENT CONTROL | (UAC) |

| DATA-LIST-ENTRY SIZE | (DLES) |
|---|---|
| LIST NUMBER | (LN) |
| LIST-ENTRY IDENTIFIER | (LEID) |
| VERSION NUMBER | (VN) |
| LIST-ENTRY KEY | (LEK) |
| LIST-ENTRY NAME | (LEN) |

| DUMPING-OBJECT TYPE | (DOT) |
|---|---|
| CAPTURE-COMPLETE INDICATOR | (CCI) |
| OBJECT IDENTIFIER | (OID) |
| DIB COUNT | (DIBC) |
| DIB SIZE | (DIBS) |
| DIB LIST SIZE | (DLS) |
| OBJECT CONTROLS | |

*fig. 18*

| | |
|---|---|
| LIST-ENTRY-COUNT LIMIT | (LECL) |
| LIST-ENTRY-COUNT | (LEC) |
| LIST-STATE-TRANSITION COUNT | (LSTC) |
| LIST AUTHORITY | (LAU) |
| USER LIST CONTROLS | (ULC) |
| LIST-MONITOR-TABLE ENTRY 0 | |
|     LIST-MONITORING-ACTIVE BIT | (LMAB) |
|     LIST-NOTIFICATION-REQUEST TYPE | (LNRT) |
|     LIST-NOTIFICATION-ENTRY NUMBER | (LNEN) |
| LIST-MONITOR-TABLE ENTRY 1 | |
|     LIST-MONITORING-ACTIVE | |
|     LIST-NOTIFICATION-REQUEST TYPE | |
|     LIST-NOTIFICATION-ENTRY NUMBER | |
| ... | |
| LIST-MONITOR-TABLE ENTRY n | |
|     LIST-MONITORING-ACTIVE | |
|     LIST-NOTIFICATION-REQUEST TYPE | |
|     LIST-NOTIFICATION-ENTRY NUMBER | |

| | |
|---|---|
| AUTHORITY | (AU) |
| CAPTURE COMPLETION CODE | (CAPCC) |
| COMPARATIVE AUTHORITY | (CAU) |
| COMPARATIVE DUMPING AUTHORITY | (CDAU) |
| COMPARATIVE DUMPING SERIALIZATION | (CDS) |
| COMPARATIVE STRUCTURE AUTHORITY | (CSAU) |
| DATA-BLOCK SIZE | (DBS) |
| DUMP-LOCAL-CACHE INDENTIFIER | (DLCID) |
| DUMP-TABLE-ENTRY NUMBER | (DTEN) |
| DUMPING AUTHORITY | (DAU) |
| DUMPING INFORMATION | (DINF) |
| DUMPING-LIST LENGTH | (DLL) |
| DUMPING SERIALIZATION | (DS) |
| DUMP TABLE SIZE | (DTS) |
| ELEMENT NAME | (EN) |
| INITIALIZATION-COMPLETE INDICATOR | (ICI) |
| REPLACEMENT DUMP AUTHORITY | (RDAU) |
| STRUCTURE IDENTIFIER | (SID) |
| STRUCTURE TYPE | (ST) |
| STRUCTURE AUTHORITY | (SAU) |
| TOTAL DUMPING SPACE | (TDS) |
| ADJUNCT AREA | |
| ASSOCIATED REQUEST BLOCK | (ARB) |
| GLOBAL DUMP CONTROLS | (GDC) |

*fig. 13*

| | |
|---|---|
| DUMPING-OBJECT TYPE 1 | (DOT1) |
| ADJUNCT-INCLUSION INDICATOR 1 | (AII1) |
| DIB-EXCLUSION INDICATOR 1 | (DEI1) |
| RANGE INFORMATION 1 | (RI1) |
| START OF RANGE 1 | (SR1) |
| END OF RANGE 1 | (ER1) |

| | |
|---|---|
| DUMPING-OBJECT TYPE 2 | (DOT2) |
| ADJUNCT-INCLUSION INDICATOR 2 | (AII2) |
| DIB-EXCLUSION INDICATOR 2 | (DEI2) |
| RANGE INFORMATION 2 | (RI2) |
| START OF RANGE 2 | (SR2) |
| END OF RANGE 2 | (ER2) |

⋮

| | |
|---|---|
| DUMPING-OBJECT TYPE n | (DOTn) |
| ADJUNCT-INCLUSION INDICATOR N | (AIIn) |
| DIB-EXCLUSION INDICATOR N | (DEIn) |
| RANGE INFORMATION N | (RIn) |
| START OF RANGE N | (SRn) |
| END OF RANGE N | (ERn) |

*fig. 17*

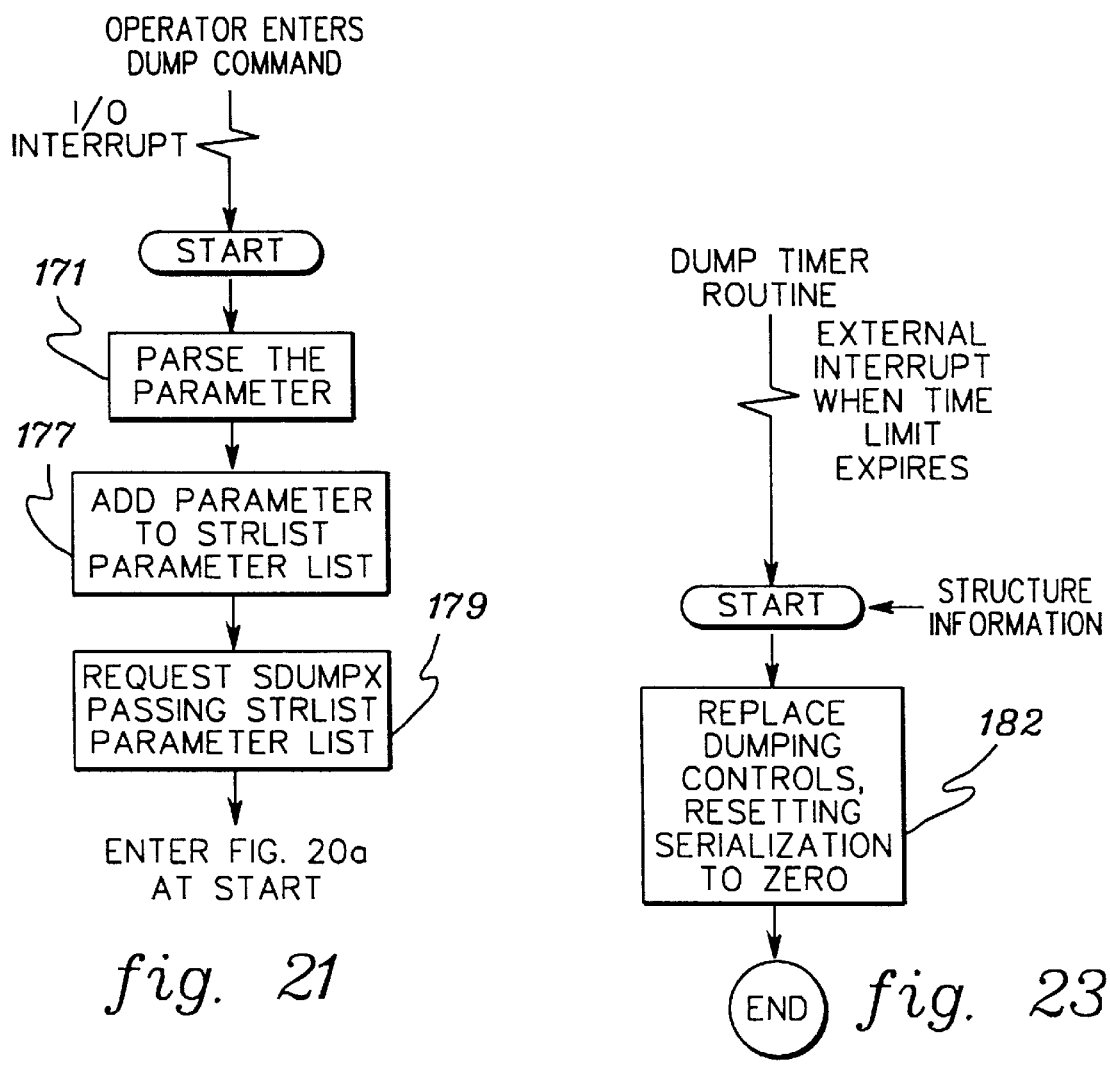
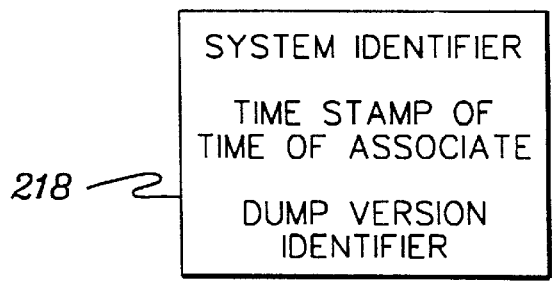
fig. 25

METHOD AND SYSTEM FOR DETERMINING AND OVERRIDING INFORMATION UNAVAILABILITY TIME AT A COUPLING FACILITY

This application is a divisional of application Ser. No. 08/146,647 filed Nov. 1, 1993, U.S. Pat. No. 5,630,050, issued May 13, 1997, which is a continuation-in-part of application Ser. No. 08/073,909 filed Jun. 8, 1993, U.S. Pat. No. 5,761,739, issued Jun. 2, 1997.

TECHNICAL FIELD

This invention relates in general to the field of data processing and, in particular, to a facility for capturing and/or accessing a portion or all of the information stored within a shared or coupling facility.

CROSS REFERENCE TO RELATED APPLICATIONS

This application contains subject matter which is related to the subject matter of the following applications which are assigned to the same assignee as this application. Each of the below listed applications is hereby incorporated by reference in its entirety:

"Configurable, Recoverable Parallel Bus," by N. G. Bartow et al., Ser. No. 07/839,657, (Docket No. PO9-91-066), Filed: Feb. 20, 1992, U.S. Pat. No. 5,357,608, Issued Oct. 18, 1994;

"High Performance Intersystem Communications For Data Processing Systems," by N. G. Bartow et al., Ser. No. 07/839,652, (Docket No. PO9-91-067), Filed: Feb. 20, 1992, U.S. Pat. No. 5,412,803, Issued May 02, 1995;

"Frame-Group Transmission And Reception For Parallel/Serial Buses," by N. G. Bartow et al., Ser. No. 07/839,986, (Docket No. PO9-92-001), Filed: Feb. 20, 1992, U.S. Pat. No. 5,267,240, Issued Nov. 30, 1993;

"Communicating Messages Between Processors And A Coupling Facility," by D. A. Elko et al., Ser. No, 07/860,380, (Docket No. PO9-91-006), Filed: Mar. 30, 1992 (Abandoned), File Wrapper Continuation application Ser. No. 08/420,893, (Docket No. PO9-91-006X), Filed: Apr. 11, 1995, U.S. Pat. No. 5,561,809, Issued Oct. 01, 1996;

"Sysplex Shared Data Coherency Method And Means," by D. A. Elko et al., Ser. No. 07/860,805, (Docket No. PO9-91-052), Filed: Mar. 30, 1992, U.S. Pat. No. 5,537,574, Issued Jul. 16, 1996;

"Method And Apparatus For Distributed Locking Of Shared Data, Employing A Central Coupling Facility," by D. A. Elko et al., Ser. No. 07/860,808, (Docket No. PO9-91-059), Filed: Mar. 30, 1992, U.S. Pat. No. 5,339,427, Issued Aug. 16, 1994;

"Command Quiesce Function," by D. A. Elko et al., Ser. No. 07/860,330, (Docket No. PO9-91-062), Filed: Mar. 30, 1992, U.S. Pat. No. 5,339,405, Issued Aug. 16, 1994;

"Storage Element For A Shared Electronic Storage Cache," by D. A. Elko et al., Ser. No. 07/860,807, (Docket No. PO9-91-078), Filed: Mar. 30, 1992, U.S. Pat. No. 5,457,793, Issued Oct. 10, 1995;

"Management Of Data Movement From A SES Cache To DASD," by D. A. Elko et al., Ser. No. 07/860,806, (Docket No. PO9-91-079), Filed: Mar. 30, 1992, U.S. Pat. No. 5,493,668, Issued Feb. 20, 1996;

"Command Retry System," by D. A. Elko et al., Ser. No. 07/860,378, (Docket No. PO9-92-002), Filed: Mar. 30, 1992, U.S. Pat. No. 5,392,397, Issued Feb. 21, 1995;

"Integrity Of Data Objects Used To Maintain State Information For Shared Data At A Local Complex," by D. A. Elko et al., Ser. No. 07/860,800, (Docket No. PO9-92-003), Filed: Mar. 30, 1992, U.S. Pat. No. 5,331,673, Issued Jul. 19, 1994;

"Management Of Data Objects Used To Maintain State Information For Shared Data At A Local Complex," by J. A. Frey et al., Ser. No. 07/860,797, (Docket No. PO9-92-004), Filed: Mar. 30, 1992, U.S. Pat. No. 5,388,266, Issued Feb. 07, 1995;

"Recovery Of Data Objects Used To Maintain State Information For Shared Data At A Local Complex," by J. A. Frey et al., Ser. No. 07/860,647, (Docket No. PO9-92-005), Filed: Mar. 30, 1992, U.S. Pat. No. 5,394542, Issued Feb. 28, 1995;

"Message Path Mechanism For Managing Connections Between Processors And A Coupling Facility," by D. A. Elko et al., Ser. No. 07/860,646, (Docket No. PO9-92-006), Filed: Mar. 30, 1992 (Abandoned), File Wrapper Continuation application Ser No. 08/324,447 (Docket No. PO9-92-006X), Filed: Oct. 18, 1994, U.S. Pat. No. 5,463,736, Issued Oct. 31, 1995;

"Method And Apparatus For Notification Of State Transitions For Shared Lists Of Data Entries," by J. A. Frey et al., Ser. N. 07/860,809, (Docket No. PO9-92-007), Filed: Mar. 30, 1992, U.S. Pat. No. 5,390,328, Issued Feb. 14, 1995;

"Method And Apparatus For Performing Conditional Operations On Externally Shared Data," by J. A. Frey et al., Ser. No. 07/860,655, (Docket No. PO9-92-008), Filed: Mar. 30, 1992 (Abandoned), File Wrapper Continuation application Ser. No. 08/383,532 (Docket No. PO9-92-008X), Filed Feb. 01, 1995;

"Apparatus And Method For List Management In A Coupled DP System," by J. A. Frey et al., Ser. No. 07/860, 633, (Docket No. PO9-92-009), Filed: Mar. 30, 1992, U.S. Pat. No. 5,410,695, Issued Apr. 25, 1995;

"Interdicting I/O And Messaging Operations In A Multi-System Complex," by D. A. Elko et al., Ser. No. 07/860,489, (Docket No. PO9-92-010), Filed: Mar. 30, 1992, U.S. Pat. No. 5,394,554, Issued Feb. 28, 1995;

"Method And Apparatus For Coupling Data Processing Systems," by Elko et al., Ser. No. 07/860,803, (Docket No. PO9-92-012), Filed: Mar. 30, 1992, U.S. Pat. No. 5,317,739, Issued May 31, 1994;

"Authorization Method For Conditional Command Execution," by Elko et al., Ser. No. 08/021,285, (Docket No. PO9-92-018), Filed: Feb. 22, 1993 (Abandoned), File Wrapper Continuation application Ser. No. 08/408,446 (Docket No. PO9-92-018X), Filed: Mar. 22, 1995, U.S. Pat. No. 5,450,590, Issued Sep. 12, 1995.

BACKGROUND ART

When a system failure occurs, information necessary to determine the cause must be recorded for service. This information includes data and control information in storage. In a single system, this storage may be in private address spaces or in common area. Units of work which may alter this storage are stopped while storage content is recorded. In particular, all address spaces, except those which are not needed, are set non-dispatchable. When the storage has been captured, the address spaces are reset and made dispatchable by the operating system.

By stopping the units of work that use the resources, system performance is degraded, since there is a great deal of idle time. In a multisystem environment, work units which alter shared resources execute across operating system images. Control information exists in each of the sharing systems and data exists on a commonly accessible data store. Gathering information to service a failure is a problem since work units which alter the data exists across operating systems, control information about data access exists across operating systems, and the data exists on a commonly accessible data store and is not captured on a failure.

Therefore, a need exists for a technique for serializing coupling facility data by preventing access to the data, not by stopping the work that may be using the data. In particular, a need exists for a technique for queuing requests to use the data until the serialization is released and the data is available. A further need exists for a method and system for accessing information in a data processing system such that requests to use data are queued until serialization is released and then the requests are re-driven. A further need exists for a technique for determining the amount of time that all users of a particular structure can tolerate not having access to that structure. A further need exists for a method and system for overriding the predefined amount of time, if it is determined such step is desirable. A further need exists for a technique for continuing a dump by another system in the sysplex when communication is lost between one or more operating systems and the coupling facility. Further, a need exists for a technique for capturing data when one or more operating systems coupled to a coupling facility lose communication with the coupling facility.

SUMMARY OF THE INVENTION

The shortcomings of the prior art are overcome and additional advantages are provided through the provision of a method for capturing data in a data processing system having one or more operating systems coupled to a coupling facility. A dump of information stored within the coupling facility is requested and the dump is created within the coupling facility.

In one embodiment, when an operating system loses communication with the coupling facility, it is detected. A program within one of the operating systems requests the dump and the dump includes information located in the coupling facility associated with the operating system which lost communication with the coupling facility.

In a further embodiment, the program requesting the dump is located in an operating system, which did not lose communication with the coupling facility. In yet a further embodiment, all of the operating systems lose communication with the coupling facility, and therefore, the dump is requested by the first operating system which re-establishes communication with the coupling facility.

In a further embodiment, an operator requests the dump using, for instance, a dump command. Examples of commands which may cause a dump are DUMP and SLIP.

In one embodiment, in requesting the dump, a parameter list is built, which identifies the information to be included in the dump. The identified information may include a portion or all of the information stored in the coupling facility. A dumping macro uses the parameter list and initiates the dump.

When a dump is requested of the information stored in the coupling facility, the information to be captured is serialized such that the information can only be accessed by a predefined set of commands. Therefore, a request for the information is stored. Subsequent to releasing serialization of the information, the request is redriven.

In yet a further embodiment of the invention, a method for controlling access to information stored in a data processing system is provided. A request for information located in a coupling facility of the data processing system is initiated. A determination is made as to whether the information can be accessed. If the information cannot be accessed, the request is stored. Once the information is available, the request is re-initiated.

In another embodiment of the invention, a method for capturing data in a data processing system having a plurality of operating systems coupled to a coupling facility is provided. A dump of information stored in the coupling facility is initiated by a first of the plurality of operating systems. This dump is continued by a second of the plurality of operating systems when the first of the plurality of operating systems is unable to proceed with the dump. In one embodiment, the dump is continued by updating a status control at the coupling facility representing which operating system is responsible for completing the dump and specifying to the operating system responsible for the dump that the dump is to be continued.

In another aspect of the invention, a system for capturing data in a data processing system having one or more operating systems coupled to a coupling facility is provided. The system includes means for requesting a dump of information stored within the coupling facility and means for creating the dump within the coupling facility.

In another embodiment of the invention, a system for capturing data in a data processing system having a plurality of operating systems coupled to a coupling facility is provided. Included in the system are means for initiating a dump of information stored in the coupling facility by a first of the plurality of operating systems and means for continuing the dump by another operating system, when the first operating system is unable to proceed with the dump.

In yet a further embodiment of the invention, a system for controlling access to information stored in a data processing system is provided. The system includes means for initiating a request for information located in a coupling facility of the data processing system, means for determining whether the information can be accessed, means for storing the request when the information cannot be accessed, and means for re-initiating the request when the information is available.

In another aspect of the invention, a system for capturing data in a data processing system having one or more operating systems coupled to a coupling system is provided. The system includes means for detecting when an operating system loses communication with the coupling facility and means for requesting a dump of information stored within the coupling facility. The dump includes information from the operating system which lost communication with the coupling facility.

In accordance with the principles of the present invention, a control facility is provided for capturing and accessing data in a data processing system. The mechanisms of the present invention advantageously enable users of shared data the ability to specify a maximum time over which serialization of the shared data may be held. Further, the ability to override the time limit is provided.

The shared data may be accessed by a number of operating systems, but the mechanisms of the present invention do not require all the operating systems to coordinate stopping of work units referencing shared data. Further, the mechanisms advantageously allow the capture of service data and control information to occur at the shared data facility and, it allows the capture to be initiated by systems following the failure of one or more of the sharing systems. In addition, following the failure of one or more sharing systems, service data and control information capture can be continued by surviving systems.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

FIG. 4 depicts one example of the controls associated with a cache structure, in accordance with the principles of the present invention;

FIG. 5 depicts one example of a local cache control block associated with each local cache of the data processing system depicted in FIG. 1, in accordance with the principles of the present invention;

FIG. 6 depicts one embodiment of a directory information block in connection with the directory depicted in FIG. 3, in accordance with the principles of the present invention;

FIG. 8 depicts one example of the controls associated with the list structure of FIG. 7, in accordance with the principles of the present invention;

FIG. 9 depicts one embodiment of a list-user control block, in accordance with the principles of the present invention;

FIG. 10 depicts one example of the controls associated with a list within the list structure of FIG. 7, in accordance with the principles of the present invention;

FIG. 11 illustrates one example of a list entry control block, in accordance with the principles of the present invention;

FIG. 13 depicts one embodiment of request/response operands, in accordance with the principles of the present invention;

FIG. 17 depicts one example of an associated request block, in accordance with the principles of the present invention;

FIG. 18 depicts one example of the operands associated with an object header of the dump table of FIG. 15, in accordance with the principles of the present invention;

FIG. 21 illustrates one embodiment of the logic associated with an operator dump command, in accordance with the principles of the present invention;

FIG. 23 illustrates one example of the logic associated with a dump timer routine, of the present invention;

FIG. 25 depicts one embodiment of a dump authority block, in accordance with the principles of the present invention;

BEST MODE FOR CARRYING OUT THE INVENTION

In accordance with the principles of the present invention, a control facility is provided for capturing and accessing data in a data processing system. As described in further detail below, in one example, the data processing system has a plurality of operating systems coupled to a coupling facility. Programs executing under the control of one of the operating systems may request a dump of coupling facility structures at any time. When one or more of the operating systems loses communication with the coupling facility by, for example, failing or losing connectivity to the coupling facility, one of the surviving systems requests a dump of some or all of the information stored in the coupling facility. This dump includes information from the operating systems that lost communication with the coupling facility. Further, if all of the operating systems lose communication with the coupling facility, the first operating system to re-communicate with the coupling facility will request a dump of some or all of the information located in the coupling facility. The information to be included may be selected by the user in a manner described in detail below. Likewise, if a system loses communication with a coupling facility while it is creating a dump, another operating system will continue the dump for the system that lost communication.

Before a dump may be taken of the information located in the coupling facility, the information or, more particularly, the individual structures containing the information, is serialized so that no other requests, beside the dumping requests, may access the information to be dumped.

In accordance with the principles of the present invention, while a structure is serialized, no further requests may be made against the structure. Thus, a queue is created for holding the requests. After the structure is no longer serialized, the requests on the queue are re-driven.

Figure 1:
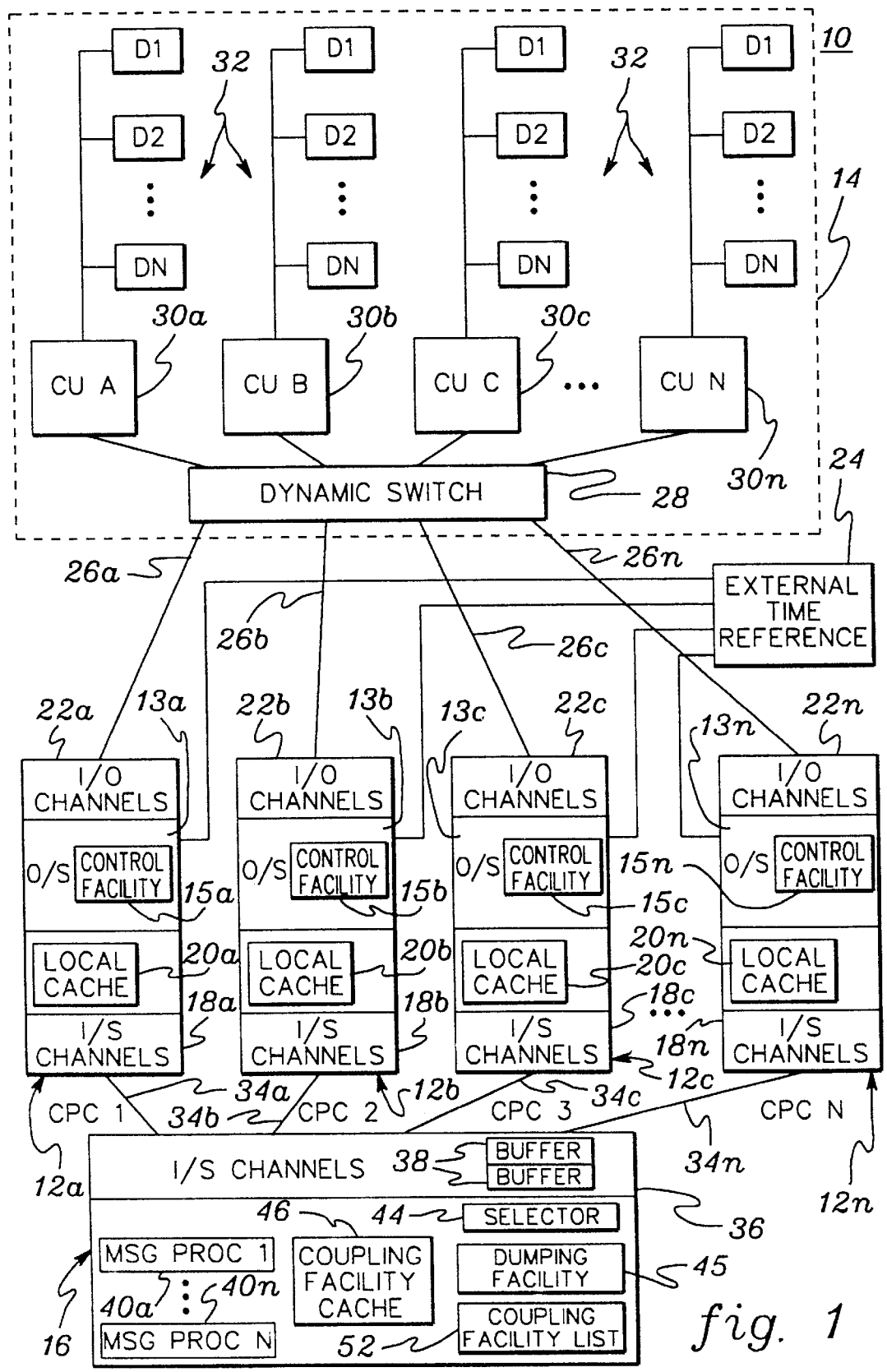
FIG. 1 depicts one example of a block diagram of a data processing system incorporating the control facility of the present invention.

FIG. 1 is a block diagram of a data processing system 10 incorporating the control facility of the present invention. Data processing system 10 includes multiple central processing complexes (CPCs) 12a through 12n which are coupled to an input/output (I/O) system 14 and a coupling facility 16. (As used herein, central processing complexes 12a–12n are collectively referred to as central processing complex (CPC) 12.) The main components associated with each central processing complex 12, input/output system 14 and coupling facility 16 are described in detail below.

Each of the CPCs 12a–12n may be an International Business Machines' (IBM) system following the Enterprise Systems Architecture/390 Principles of Operation as described in IBM publication SA22-7201-00, which is hereby incorporated by reference in its entirety. Each of CPCs 12a–12n includes one or more central processing units (CPUs) (not shown) which executes an operating system 13a–13n, respectively. As used herein, operating systems 13a–13n are collectively referred to as operating system 13. In one instance, operating system 13 is International Business Machines' Multiple Virtual Storage (MVS) operating system for controlling execution of programs and the processing of data, as is well known. In addition, in accordance with the principles of the present invention, each operating system 13a–13n includes a control facility 15a–15n, respectively, for capturing and accessing information in a coupling facility under program initiated control at any time or operating system initiated control when one or more operating systems lose communication with the coupling facility, as described further below.

In addition, each CPC 12a–12n contains a plurality of intersystem (I/S) channels 18a–18n, a plurality of local caches 20a–20n, and a plurality of input/output (I/O) channels 22a–22n, respectively. (Local caches 20a–20n are referred to herein collectively as local cache 20. Similarly, intersystem channels 18a–18n and input/output channels 22a–22n are collectively referred to as intersystem channels 18 and input/output channels 22, respectively.) It will be understood that input/output channels 22 are part of the well known channel subsystem (CSS), which also includes intersystem channels 18 disclosed herein, even though channels 18 and 22 are shown separately in FIG. 1 for convenience.

Coupled to each CPC 12a–12n is an external time reference (ETR) 24, which provides time stamps of control information used for sequencing events, such as writing into a log to document recovery from failures, backing out of undesired operations and for audit trails. External time reference 24, which uses fiber optic interconnect cables, synchronizes the time clocks (not shown) of CPCs 12a–12n to a precision equal to or less than the duration of the shortest externally visible operation. External time reference 24 provides for cable length propagation time differences, where those differences are important, in order to be able to maintain synchronization to within the length of the mentioned external operation.

As depicted in FIG. 1, each central processing complex 12a–12n is coupled via a link 26a–26n, respectively, to input/output system 14. Input/output system 14 includes, for example, a dynamic switch 28, which controls access to multiple input/output (I/O) control units (CU) 30a through 30n and one or more direct access storage devices (DASD) D1 through DN (collectively referred to as DASD 32), which are controlled by the control units. Dynamic switch 28 may be an ESCON Director Dynamic Switch available from IBM Corporation, Armonk, N.Y. Such a dynamic switch is disclosed in U.S. patent application Ser. No. 07/429,267 for "Switch and its Protocol," filed Oct. 30, 1989 and assigned to the owner of the present invention, which application is incorporated herein by reference in its entirety. As is known, input/output commands and data are sent from a central processing complex 12a–12n to an I/O control unit 30a–30n through dynamic switch 28 by means of I/O channels 22a through 22n of the respective CPCs 12a through 12n. Channel programs for a particular I/O channel are established by channel command words (CCWs), as is well known in the art.

Each central processing complex 12a–12n is also coupled via a bus 34a–34n, respectively, to coupling facility 16. Coupling facility 16 contains storage accessible by the CPCs and performs operations requested by programs in the CPCs. The coupling facility enables sharing of data which is directly accessible by multiple operating systems. As described below, the coupling facility contains control information regarding shared data and may contain shared data. In one embodiment, coupling facility 16 is a structured-external storage (SES) processor and includes, for example, a plurality of intersystem (I/S) channels 36 for communicating with intersystem channels 18a–18n, one or more buffers 38 located within intersystem channels 36 for storing data received from inter-system channels 18a–18n, message processors 40a–40n for handling messages, a selector 44 for directing message requests received over an intersystem channel to a message processor 40a–40n, a dumping facility 45, including the microcode and storage required for creating a dump, as described in detail in co-pending, commonly assigned patent application entitled "A Dumping Service Facility for Multisystem Environments," by Elko et al., Ser. No. 08/073,909, filed Jun. 8, 1993, which is incorporated herein by reference in its entirety, a coupling facility cache 46 and a coupling facility list 52, which are described in further detail below. Even though only one coupling facility 16 is shown in the embodiment of FIG. 1, it will be understood that multiple coupling facilities may be provided for, each with its own I/S channels and message paths connected to all or some subset of the CPCs 12a–12n.

Figure 2:
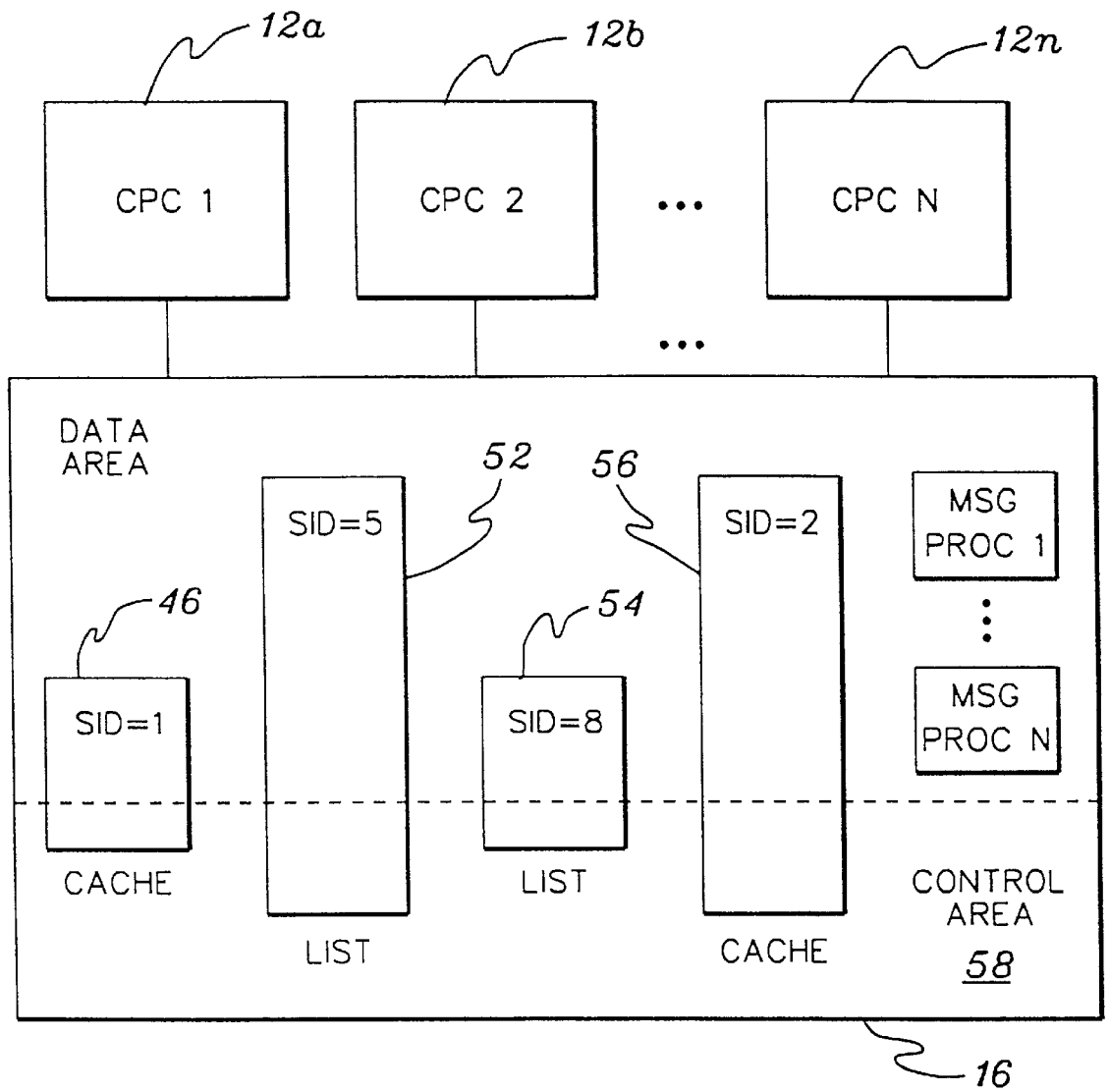
FIG. 2 depicts one example of a coupling facility including multiple storage structures, in accordance with the principles of the present invention.

Coupling facility cache 46 of coupling facility 16 is one example of a coupling facility storage structure. As shown in FIG. 2, coupling facility 16 includes multiple storage structures, such as storage structures 46, 52, 54 and 56. The storage structures include, for instance, list structures (for example, 52 and 54) and cache structures (for example, 46 and 56). Each coupling facility storage structure contains data objects and control objects. The data objects may reside in any storage location, whereas the control objects are generally restricted to control area 58.

A set of commands is provided for each coupling facility storage structure type, as well as additional commands for referencing global objects. The creation, deletion and attributes of a particular structure are controlled by the operating system program through allocation and de-allocation commands. Allocation commands for list structures are described in "Apparatus and Method For List Management In A Coupled DP System" (Docket No. PO9-92-009), by J. A. Frey et al., Ser. No. 07/860,633, Filed: Mar. 30, 1992, which is hereby incorporated by reference in its entirety. In addition, allocation commands for cache structures are described in "Sysplex Shared Data Coherency Method and Means" (Docket No. PO9-91-052), by D. A. Elko et al., Ser. No. 07/860,805, Filed: Mar. 30, 1992, which is also hereby incorporated by reference in its entirety.

Allocated structures (such as cache structures 46 and 56 and list structures 52 and 54) reside in separate coupling facility storage locations and are located by a structure identifier (SID). The SID value provides an identification of a target structure by a command. A command of a particular structure type, such as a cache-structure or list-structure command, may only address or alter the contents of a single structure of the given type.

Figure 3:
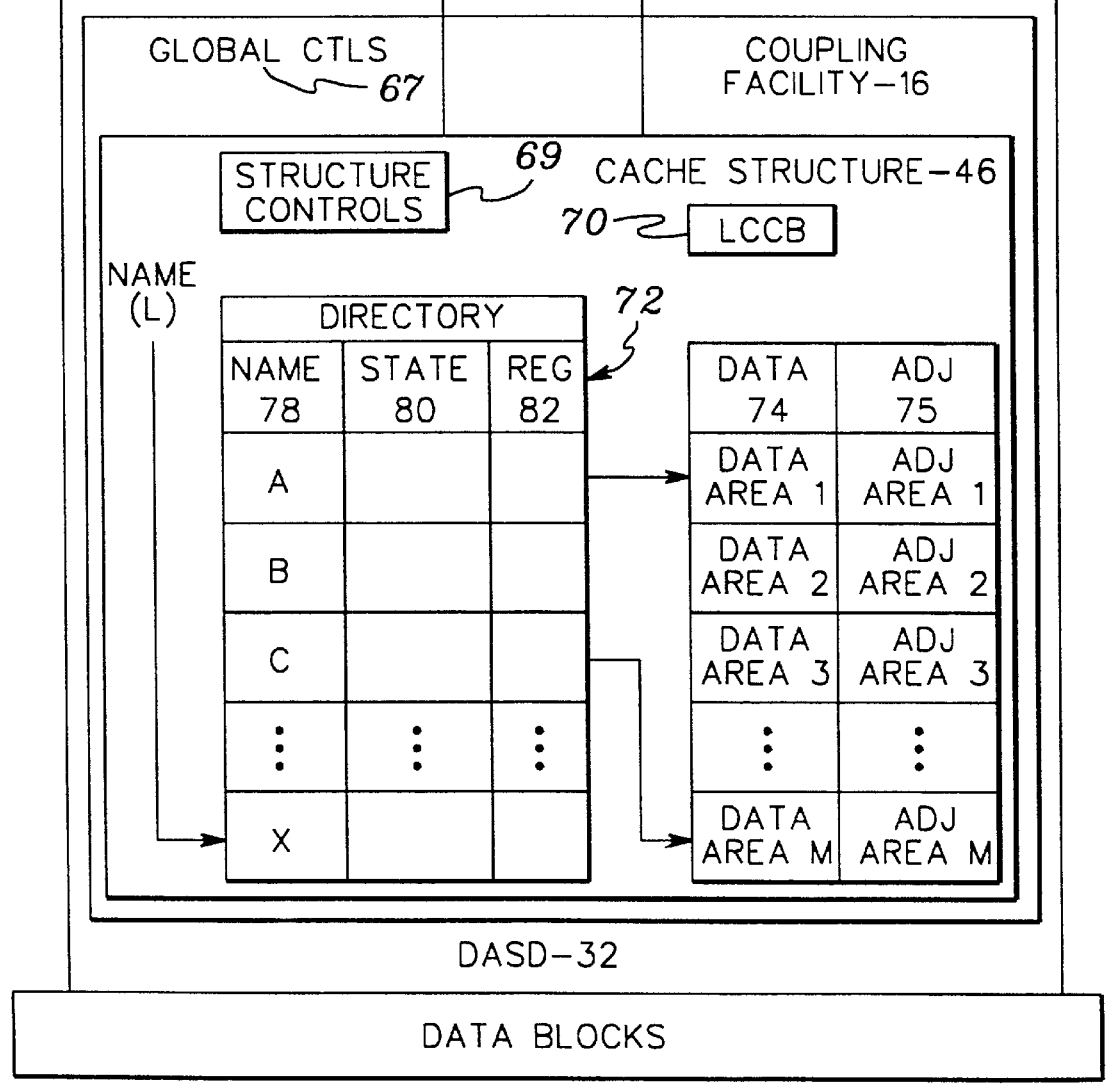
FIG. 3 depicts one embodiment of a three-level storage hierarchy in a network of attached processors, in accordance with the principles of the present invention.
Figure 7:
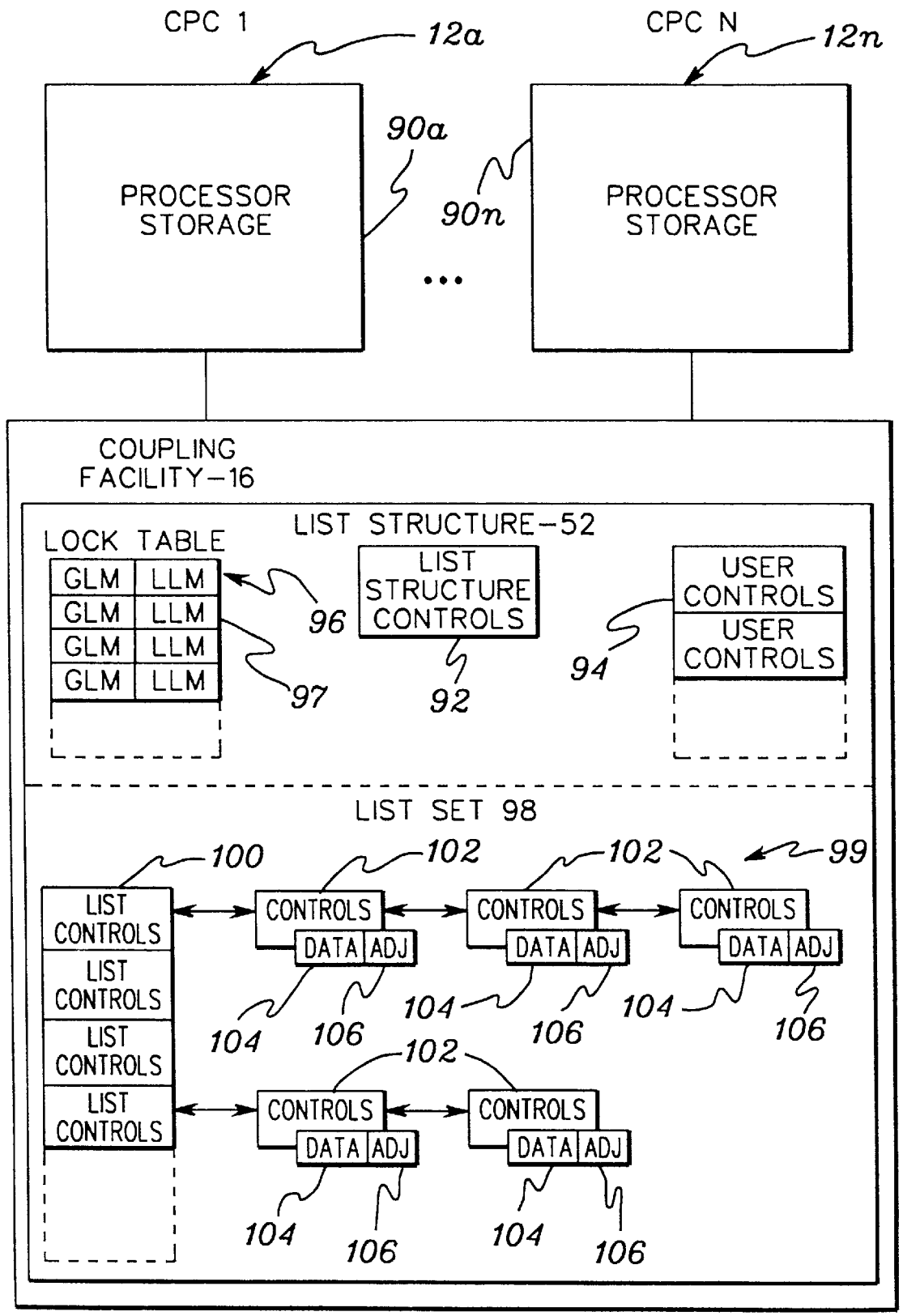
FIG. 7 depicts one example of a list structure, in accordance with the principles of the present invention.

The partitioning of the coupling facility storage and control area 58 into structures, as shown in FIGS. 2, 3 and 7, is managed by the operating system program. The data objects are organized in tables or lists with an optional adjunct data area. The remaining objects are controls. The relative amount of storage assigned to data and control objects is determined by program-specified parameters in the allocation commands.

Referring to FIG. 3, a three-level storage hierarchy in a network of attached processors 12a–12n is described. The lowest level of the hierarchy is DASD 32, the intermediate level is coupling facility cache structure 46, and the highest level is local cache 20 (e.g., local caches 20a and 20b). Each of these levels is described below.

Direct access storage devices 32 include data blocks which represent data stored in the devices. Local caches 20a and 20b include, for instance, a 16-byte name field 60A, 60B for referencing data; a data field 64A, 64B for storing the data; an optional adjunct data field 66A, 66B for additional data; and a state field 68A, 68B, respectively for indicating whether the data is valid or invalid. When the data is located in local cache 20, the state of the data is either valid or invalid. The data is validated by CPU instructions and invalidated by, for example, SES-write and SES-invalidate operations. The valid state of the data is tested by a CPU instruction. A valid named data object must be registered in a coupling facility cache directory, described below, in order to maintain local cache coherency. Local cache coherency is maintained by the invalidation process. A registered local-cache entry may test as invalid.

Cache structure 46 includes, for instance, a number of cache structure controls 69, one or more local-cache control blocks (LCCB) 70, a directory 72, a data area 74, and an adjunct area 75, each of which is explained in further detail below.

As shown in FIG. 4, cache structure controls 69 include, for instance, the following controls:

(a) Total-Directory-Entry Count (TDEC): A value that specifies the number of directory entries allocated for the cache.

(b) Total-Data-Area-Element Count (TDAEC): A value that specifies the number of data-area elements allocated for the cache.

(c) Adjunct-Assignment Indicator (AAI): A value that indicates the presence or absence of adjunct areas. Two possible values are: adjunct areas not assigned; adjunct areas assigned. When adjunct areas are assigned, an adjunct area is associated with each directory entry.

(d) Maximum storage Class (MSC): A value that specifies the number of storage classes. Valid storage-class values range from one to the maximum-storage-class value.

(e) Maximum Cast-Out Class (MCC): A value that specifies the number of cast-out classes. Valid cast-out class values range from one to the maximum cast-out class value.

(f) Data-Area-Element Characteristic (DAEX): A value that specifies the number of bytes in each data-area element. The size of the data-area element in bytes is the product of 256 and 2 raised to the power of the value specified in the data-area-element characteristic.

(g) Maximum Data-Area Size (MDAS): A value that specifies the maximum allowable size of a data area as an integral multiple of the data-area-element size. The maximum data-area size is set by the program when the cache is allocated.

(h) Structure Size (SS): A value that specifies the number of units of, for example, SES storage allocated for the cache.

(i) Maximum Structure Size (MXSS): A value that specifies the maximum number of units of SES storage that can be allocated for the cache.

(j) Minimum Structure Size (MNSS): A value that specifies the minimum number of units of SES storage that can be allocated for the cache.

(k) Structure Authority (SAU): A value associated with each bit in the SID vector.

(l) User Structure Control (USC): A value defined by the user.

(m) LCID Vector (LCIDV): A bit string with an initial value of zero. The bit positions start at zero and increase sequentially to the local-cache-identifier limit. The bit at position (i) in the string is set to one when a local cache is attached with an LCID value of (i). When the bit is one, the local-cache-identifier is assigned. The bit at position (i) is reset to zero when the local cache is detached and LCID unassignment is requested, when the cache structure is de-allocated, or when a SES power-on reset occurs. When the bit is zero, the local-cache-identifier is not assigned.

(n) Target Structure Size (TSS): A value that specifies the target number of units of SES storage to be allocated.

(o) Target Data Area Element Count (TGDAEC): A value that specifies the target for the maximum number of data-area elements that are available for assignment to directory entries in a cache structure.

(p) Target Directory-Entry Count (TGDEC):

A value that specifies the target for the maximum number of possible directory entries in a cache structure.

As mentioned above, in addition to structure controls 69, cache structure 46 includes local-cache control block 70. In one embodiment, local-cache control block 70 includes the following fields (FIG. 5):

(a) Local Cache Identifier (LCID): A value that identifies a local cache.

(b) Attachment Status (AS): A control that describes the state of the attachment of a local cache. When the value of the attachment status is one, the local cache is attached. When the value of the attachment status is zero, the local cache is detached.

The attachment status controls the execution of commands that specify the local cache. When the local cache is attached, all commands that specify the local cache are processed normally. When the local cache is detached, all commands that specify the local cache, except attach local cache, detach local cache and read local cache information are suppressed with a request-exception condition.

(c) Local-Cache Token (LCT): A value used to identify the local cache on the CPC.

(d) Local-Cache Authority (LCAU): A value set by the program when the local cache is attached.

(e) System Identifier (SYID): A value specified by the program when a message path, used to communicate commands and messages (as described in detail in co-pending U.S. patent application entitled "Communicating Messages Between Processors And A Coupling Facility," by D. A. Elko et al., Ser. No. 07/860,380, (Docket No. PO9-91-006), Filed: Mar. 30, 1992 and co-pending U.S. patent application entitled "Message Path Mechanism For Managing Connections Between Processors And A Coupling Facility," by D. A. Elko et al., Ser. No. 07/860,646 (Docket No. PO9-92-006), filed Mar. 30, 1992, each of which is incorporated herein by reference in its entirety), is activated. The system identifier is maintained in a message-path status vector and copies into the local cache controls when an attach-local-cache command is communicated over the message path.

(f) Attachment Information (AINF): A value set by the program when the local cache is attached.

Referring back to FIG. 3, cache structure 46 also includes directory 72. Directory 72 is a collection of directory entries positioned into storage classes and arranged as a fully associative array. The subset of changed directory entries is additionally positioned into cast-out classes. As described with reference to FIGS. 3 and 6, directory 72 includes a name field 78, a state field 80 for indicating the state of each directory entry and a register field 82, described below. Whenever a named data object is placed in the higher two levels of the storage hierarchy (i.e., coupling facility cache structure 46 and local cache 20), its name is registered in name column 78 and its state is registered in state column 80 by coupling facility cache directory 72. In general, state information indicates whether the data is changed, unchanged, locked for cast-out, or resident in coupling facility 16. In particular, state field 80 includes:

(a) User-Data Field (UDF): The user-data field contains a value that is associated with the data when it is initially changed in the SES cache and is maintained until the data-table entry is re-used. The user-data field is valid when the data is cached as changed.

(b) Storage Class (SC): A value which identifies the storage class assigned for the name.

(c) Change Indicator (C): A value which, in conjunction with the cast-out lock, indicates the changed state of the data. When the change bit is one, the data is cached as changed. When the change bit is zero and the data is not locked for cast-out, the data is either not cached, or is cached but not changed. When the change bit is zero and the data is locked for cast-out, the data is cached as changed. Whenever the data is in the changed state, the most recent version of the data resides in the cache. When the change bit is one, the data bit must also be one.

(d) Data-Cached Indicator (D): A value which indicates whether the data is located in the SES cache. When the data bit is one, the data is cached. When the data bit is zero, the data is not cached.

(e) Cast-Out-Parity-Bits Indicator (CP): A field which indicates the current assignment of the cast-out parity. Three possible values are: cast-out parity is zero; cast-out parity is one; the cast-out parity is unknown.

(f) Cast-Out Class (CC): A value which identifies the cast-out class assigned for the name.

(g) Cast-Out Lock Value (CLV): A value which indicates the cast-out state of the data. When the cast-out lock is zero, the data is not being cast-out. When the cast-out lock is not zero, the value of the first byte of the cast-out lock identifies the local cache that is casting out the data block from the SES cache to DASD. The value of the second byte identifies the cast-out process on the local system. When the cast-out lock is not zero, the data bit must be one.

(h) Data-Area Size (DAS): A value that specifies the size of the data area as an integral multiple of the data-area-element size. The initial value is zero when the directory entry is assigned and is zero until the data bit is set to one.

In addition to the above, register 82 is a table containing information on the location of the locally cached copies of the data block. Each row in the table corresponds to an attached local cache. The columns contain the local-cache entry number (LCEN) and a valid bit (LVI) for the local-cache entry number. When the local-cache entry number-validity indicator (LVI) is zero, the LCEN field is invalid. Location information includes which of the local caches 20a–20n contains a copy. Certain SES-read and SES-write commands register the local cache copy in coupling facility cache directory 72. SES-write and SES-invalidate commands remove the registration and invalidate local copies.

Cache structure 46 further includes data areas 74 and optional adjunct data areas 75. The data sizes are variable with the range of variability being, in one embodiment, between 1 and n times the data-area element size. The data-area element size is fixed for each coupling facility cache structure 46 and is a power of 2 with a minimum size of 256 bytes.

Coupling facility cache 46 is normally smaller than DASD storage 32. Thus, periodically, the changed data is transferred from cache 46 to the backing DASD 32 (FIG. 3). This process, called cast-out, is controlled by the operating system program. In one embodiment, a control associated with a cast-out class includes a cast-out-class-count, which indicates the number of elements associated with the cast-out class. Cast-out involves for a coupling facility, such as a SES facility, the following operations:

A SES-read for cast-out operation is issued that sets the cast-out serialization and copies the data block to main storage which may or may not be put in local cache 20.

An I/O operation is executed that copies the data block to DASD 32.

A SES-unlock cast-out locks operation is issued that releases the cast-out serialization.

Multiple cast-out processes may co-exist for a single one of local caches 20a–20n. Whenever data is locked for cast-out, an identifier for local cache 20a–20n and an identifier for the cast-out process are placed in directory 72. This is disclosed in U.S. patent application Ser. No. 07/860, 806 for "Management of Data Movement from a SES Cache to DASD" by D. A. Elko, et al. (Attorney Docket No. PO9-91-079), incorporated herein by reference in its entirety as noted.

The least recently used (LRU) unchanged data and directory resources are reclaimed by coupling facility cache 46 when needed to meet new requests. The data objects are mapped into one of several storage classes by the operating system program. Each storage class includes a number of controls, as well as a reclaiming vector including, for instance, reclaiming-vector entry 1 (RVE1) through reclaiming-vector entry 64 (RVE64), that controls the reclaiming process. This allows the allotment of coupling facility storage among the storage classes to be dynamically adjusted to account for changes in workload characteristics. The reclaiming vector is maintained by the operating system program. The above is disclosed in U.S. patent application Ser. No. 07/860,807 for "Storage Element for a Shared Electronic Storage Cache" by D. A. Elko, et al. (Attorney Docket No. PO9-91-078), incorporated herein by reference in its entirety, as noted above.

Referring back to FIG. 3, cache structure 46 is located within coupling facility 16. Also contained within facility 16 is a set of global controls 67. In one embodiment, global controls 67 include a coupling facility authority control (e.g., a SES authority control) as well as facility dependent information such as total free space for the coupling facility and the largest data block to be stored in the coupling facility, etc.

Described in detail above is one example of a cache storage structure. In addition to cache structures, there are list structures, such as list structure 52, depicted in FIGS. 2 and 7. Referring to FIG. 7, the contents of a list structure, such as list structure 52, is described in detail.

List structure 52 resides within coupling facility 16. As shown in FIG. 7, in one embodiment, coupling facility 16 is coupled to processor storage 90a–90n located within each CPC 12a–12n, respectively. List structure 52 includes list-structure controls 92, user controls 94 and, optionally, a lock table 96, and/or a list set 98. List set 98 includes list controls 100 and list-entry controls 102. Each of the components of list structure 52 is described in detail below.

List structure controls 92 contain attributes of the structure and are initialized when list structure 52 is created. One example of the controls associated with list structure controls 92 is depicted in FIG. 8. Referring to FIG. 8, list structure controls 92 include:

(a) Maximum Data-List-Entry Size (MDLES): An object or field that specifies the maximum size of the data list entry.

(b) List-Structure Type (LST): An object or field that indicates the list objects created on allocation. A field contains a counter indicator (CI), a lock indicator (LI), a data indicator (DI), an adjunct indicator (AI), a name indicator (NI) and a key indicator (KI).

The counter indicator specifies that either: a list-entry count and list-entry-count limit are defined or a list-element count and list-element-count limit are defined.

The lock indicator specifies whether or not a lock table is created.

The data and adjunct indicators specify whether: no list-set is created; list entries have adjunct only; list entries have data only; or list entries have data and adjunct in the list entries.

The name indicator specifies whether or not list entries are names.

The key indicator specifies whether or not the list entries are keyed.

(c) Lock-Table-Entry Characteristic (LTEX): An object or field that specifies the number of bytes in each lock-table entry. The number of bytes is the product of 2 raised to the power of the LTEX value.

(d) List-Element Characteristic (LELX): An object or field that specifies the number of bytes in each list element. The number of bytes is the product of 256 and 2 raised to the power of the LELX value.

(e) Minimum Structure Size (MNSS): A value that specifies the minimum number of units of SES storage that can be allocated for the list.

(f) Lock-Table-Entry Count (LTEC): An object or field that specifies the number of lock-table entries allocated.

(g) List Count (LC): An object or field that specifies the number of lists created.

(h) Structure Size (SS): An object or field that specifies the amount of storage allocated.

(i) Maximum Structure Size (MXSS): A value that specifies the maximum number of units of SES storage that can be allocated for the list.

(j) Target Structure Size (TSS): A value that specifies the target number of units of SES storage to be allocated.

(k) Target Maximum-Element Count (TMELC): A value that specifies the target for the maximum number of list elements that are available for assignment to list entries or retry-data blocks, or both, in the list set.

(l) Target Maximum-Entry Count (TMEC): A value that specifies the target for the maximum number of possible list entries in a list set.

(m) Maximum List-Set-Element Count (MLSELC): An object or field that specifies the maximum number of list elements that are available for assignment to list entries or retry-data blocks, or both, in the list set.

(n) List-Set-Element Count (LSELC): An object or field that specifies the number of list elements that have been assigned to list entries or retry-data blocks, or both, in the list set.

(o) Non-Zero-Lock-Table-Entry-Count (NLTEC): An object or field that specifies the number of non-zero lock-table entries that exist in the structure.

(p) Maximum List-Set-Entry Count (MLSELC): An object or field that specifies the maximum number of possible list entries in a list set.

(q) List-Set-Entry Count (LSEC): An object or field that specifies the number of existing list entries in the list set.

(r) Structure Authority (SAU): A value associated with each bit in the SID vector.

(s) User Structure Control (USC): A field per structure defined by the user.

(t) User-Identifier Vector (UIDV): An object or field that specifies the assigned UIDs, described below.

Referring back to FIG. 7, user controls 94 are created and initialized when the list-structure user is attached. In one embodiment, user controls 94 include the following fields (FIG. 9):

(a) A User Identifier (UID): A value that identifies an attached list user.

(b) A User State (US): A field that specifies the state of the user. The value has the following encoding: the user is detached; the user is attached.

(c) A List-Notification Token (LNT): A value that specifies a list-notification vector to the system.
(d) A User Authority (UAU): A value that is compared and conditionally updated.
(e) A System Identifier (SYID): A value specified by the program when the message path is activated. The system identifier is maintained in a message-path status vector and copied into the user controls when an attach-list-structure-user command is communicated over the message path.
(f) A User-Attachment Control (UAC): A field per attached user defined by the user.

Referring once again to FIG. 7, lock table 96 consists of a sequence of one or more lock table entries 97 identified by a lock-table-entry number (LTEN). In one embodiment, lock table entry 97 includes a lock-table-entry number (LTEN), which starts at zero and runs consecutively and a lock-table-entry value (LTEV), including a global-lock manager (GLM) object and optionally, a local-lock-manager (LLM) object or both. The lock-table entry format is determined by the list-structure type located within list structure controls 92.

Commands associated with list structure 52 provide a means for updating lock-table entry 97. That is, a command may compare global-lock managers (GLM) and conditionally replace a global-lock manager (GLM), a local-lock manager (LLM), or both the global-lock and local-lock managers (GLM) and (LLM). The list commands also provide a means for reading an entry in lock-table 96 or the next non-zero lock-table entry, or for clearing lock table 96.

As previously mentioned, also contained within list structure 52 is list set 98. In one example, list set 98 includes one or more lists 99 represented by list controls 100, which are numbered consecutively, starting at zero. In one embodiment, list controls 100 include the following controls, as depicted in FIG. 10:
(a) List-Entry-Count Limit (LECL): An object or field that specifies the maximum number of possible list entries in a list. This object is initialized to the maximum list-set-entry count when a list structure is created.
(b) List-Entry Count (LEC): An object or field that specifies the number of list entries currently in the list.
(c) List-State-Transition Count (LSTC): An object or field that specifies the number of empty to not-empty list state transitions that have occurred.
(d) List Authority (LAU): A value that is compared and conditionally updated. The LAU is initialized to zeros.
(e) User List Control (ULC): A field per list defined by the user.
(f) List-Monitor-Table: The list-monitor table contains information used to process the list-notification vector of each user who has registered interest in the state transitions of the list.

The list-monitor table is a sequence of objects, called list-monitor-table entries. The number of list-monitor-table entries is determined when the table is created and is equal to the maximum number of list-structure users. The list-monitor-table entries are numbered from zero to the user-identifier limit.

Each list-monitor-table entry has a list-monitoring-active-bit object, a list-notification-request-type object and a list-notification-entry-number object, each of which is described below:
(1) List-Monitoring-Active Bit (LMAB): An object or field that specifies whether the user associated with the list-monitor-table entry is monitoring the list-state transitions of the list.

When a user is not monitoring a list, all previously issued list-notification commands on behalf of the associated user for this list are complete.
(2) List-Notification-Request Type (LNRT): An object or field that indicates whether the list-notification-vector summaries are to be updated when an empty to not-empty state transition occurs on a monitored list.
(3) List-Notification-Entry Number (LNEN): An object or field that specifies a list-notification-vector entry.

Each list 99 consists of a sequence of zero or more entries. The list-structure type (described above) determines whether all the list entries in list set 98 have a data list entry 104, an adjunct list entry 106, or both. Associated with each entry of a list 99 is one of list-entry controls 102. Controls 102 contain list-entry-location information and other information for controlling operations against data list entry 104.

In particular, list entry controls 102 include the following controls, as depicted in FIG. 11:
(a) Data-List-Entry Size (DLES) indicating the size of the associated data entry.
(b) A List Number (LN) representing the list that a particular entry is associated with.
(c) A List-Entry Identifier (LEID) identifying a particular list entry. The list-entry identifier is unique to a list set 98 and is assigned by coupling facility 16.
(d) A Version Number (VN) object that is conditionally compared and conditionally updated, reflecting a program specified state for the list entry.
(e) An optional List-Entry Key (LEK) indicating a key, if one exists. When list-entry keys exist, the keyed list entries are ordered by the key with the lowest numerical key at the leftmost position. Elements with the same key value may be located by first or last within the same key value.

When an unkeyed list entry is created or moved, the target list-entry position is always located by an unkeyed position. When a keyed list entry is created or moved, the target list-entry position is always located by a keyed position and first or last within the same key value.
(f) An optional List-Entry Name (LEN). A list-entry name is unique to a list set 98 (FIG. 7) at any particular instant and is provided by the operating system program.

List commands provide a means for conditionally creating, reading, replacing, moving, or deleting one entry in list 99. A number of comparisons may be requested during these processes. They include a list-number comparison, a version-number comparison, a global-lock-manager (GLM) comparison, or any combination of the preceding. Additionally, when global locks are compared, local locks (LLM) may be compared. A list entry may be moved from one list 99 to another within the same structure 52 or from one position to another within the same list 99. This is disclosed in U.S. patent application Ser. No. 07/860,655 for "Method and Apparatus for Performing Conditional Operations on Externally Shared Data" by J. A. Frey, et al. (Attorney Docket No. PO9-92-008), incorporated herein by reference in its entirety as noted.

The position of a list entry in list 99 is determined when it is created, and may be changed when any entry in the list is created, deleted or moved. A list entry or list-entry position is located within a list set 98 by means of the list-entry identifier or the optional list-entry name (as described above), or by position. Position is specified by means of a list number, a direction, and an optional list-entry key.

The list commands also provide a means for synchronously writing and moving, moving and reading, or reading and deleting one entry of list 99. More than one list entry may be deleted synchronously, and more than one data list entry 104 or adjunct list entry 106 may also be read synchronously. Data list entry 104 is always returned in the data area designated in main storage by a message command/response block, described below. The adjunct list entry is returned in either a message command/response block or the data area, depending on the command. This is disclosed in U.S. patent application Ser. No. 07/860,633 for "Apparatus and Method for List Management in a Coupled DP system" by J. A. Frey, et al., (Attorney Docket No. PO9-92-009), incorporated herein by reference in its entirety, as noted.

In addition to cache and list structures, there also exists, for instance, lock structures. A lock structure is comprised of a coupling facility list structure with an associated lock table and a set of operating system services to assist in lock contention resolution.

Figure 12:
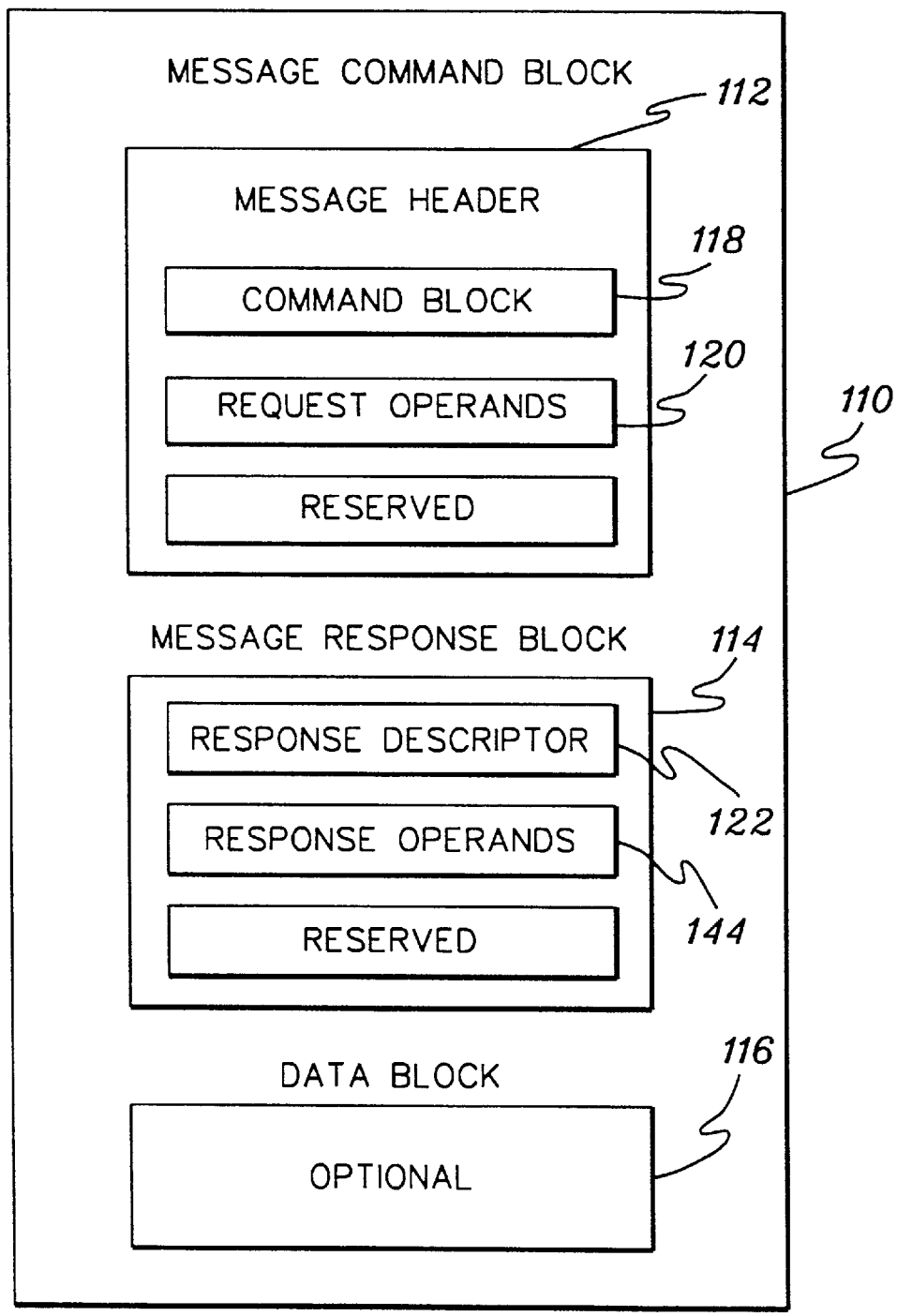
FIG. 12 depicts one example of a message command/response block, in accordance with the principles of the present invention.

In one embodiment, messages are communicated between CPC 12 and coupling facility 16 via a message command/response block 110 (FIG. 12). In one example, message command/response block 110 includes a message command block 112, a message response block 114 and an optional data block 116. Message command block 112 includes a command block 118 and a plurality of request operands 120 and message response block 114 includes a response descriptor 122 and a plurality of response operands 124. In one embodiment of the present invention, request operands 120 and response operands 124 include the operands listed below, which are depicted in FIG. 13. (An operand may be a request operand, a response operand or both, depending upon the command. It is also possible that other request and/or response operands exist, which are not shown in FIG. 13.). In one embodiment, the response/request operands include the following:

(a) Authority (AU): A value that contains the contents of the global-authority control.
(b) Capture Completion Code (CAPCC): A value that indicates whether the capture is completed.
(c) Comparative Authority (CAU): A value that is compared with the value of the global-authority control.
(d) Comparative Dumping Authority (CDAU): A value that is compared with the value of a dumping-authority control, described below.
(e) Comparative Dumping Serialization (CDS): A value that is compared with the value of a dumping-serialization control, described below.
(f) Comparative Structure Authority (CSAU): A comparison authority value operand used to compare to the structure authority control value in structure controls.
(g) Data-Block Size (DBS): A value that specifies the size of the data block as an integral multiple of 4096-byte units. The value must be non-zero.
(h) Dump-Local-Cache Identifier (DLCID): The identifier of an attached local cache associated with a dump table, described below. The dump-local-cache-identifier operand is only meaningful when the structure type is a cache structure. When the dump-local-cache identifier is zero, no local cache is associated with the dump table.
(i) Dump-Table-Entry Number (DTEN): An object or field that identifies a dump-table entry.
(j) Dumping Authority (DAU): A value that contains the contents of the dumping-authority control.
(k) Dumping Information (DINF): A value that contains program-specified information associated with the dump.
(l) Dumping-List Length (DLL): An object or field that specifies the number of ranges in the range list of an associate-dump-table command, which is described in detail below.
(m) Dumping Serialization (DS): A value that contains the value of the dumping-serialization control.
(n) Dump Table Size (DTS): A value that contains the value of the dump table size operand, described below.
(o) Element Name (EN): A value that identifies an element in an object list. The element name depends on the structure type as follows:
SES List List Entry Identifier (LEID)
SES Cache Name (N)
(p) Initialization-Complete Indicator (ICI): A value that contains the initialization complete indicator.
(q) Replacement Dump Authority (RDAU): A value that designates the value of a replacement dump authority control.
(r) Structure Identifier (SID): An index value into a SID vector (a bit string wherein the bit at position (i) in the string is set to one when a structure is allocated with a SID value of (i)) used to identify the structure associated with the specified index value to be accessed.
(s) Structure Type (ST): A value that contains the structure type operand.
(t) Structure Authority (SAU): A value that designates the value of a structure authority control.
(u) Total Dumping Space (TDS): A value that designates the value of a total dumping space control.
(v) Adjunct Area: A 64-byte storage object optionally associated with each directory entry in a cache structure or each list entry in a list structure, as described above.
(w) Associated Request Block (ARB): Described in detail below.
(x) Global Dump Controls (GDC): The global dump controls include an associated-dump-table-count representing a number of dump tables, if any, located within a dump space, a free dumping space control indicating whether any of the dumping space is available for use; a maximum requested dumping space control representing the maximum amount of dump space that has been requested; and a total dumping space control indicating the current amount of allocated dump space.

In accordance with the principles of the present invention, a user is connected to a structure, such as a cache, list or lock structure via, for example, a connection service referred to as IXLCONN. In one embodiment, the IXLCONN service requires the caller to be in task mode and Supervisor State or PKM allowing keys 0–7. The caller supplies information to the service, such as, for example, the name of the coupling facility structure to connect to and attributes of the structure, such as the number of lock entries for a lock structure. In addition, the first connected user of the structure can define how long SVC dump, described below, can hold serialization on the structure for dumping purposes. That is, the first connected user of the structure determines the amount of time that all users of the structure can tolerate not having access to the structure. When the first user connects to the structure, the access time limit is set to the value specified by the ACCESSTIME parameter on the IXLCONN macro, described below. This value is saved in the structure controls in, for instance, the user structure control (see FIGS. 4 and 8) when the user is attached to the structure. As described further below, for a structure in a STRLIST parameter list, SVC dump will enforce the time limit by releasing the serialization after the time limit expires.

The ACCESSTIME keyword allows the connector to indicate dump serialization may not be held at all, i.e., the structure will not be permitted to be dumped (ACCESSTIME=MAXIMUM,MAXTIME=0); dump serialization may be held up to a maximum specified time (ACCESSTIME=MAXIMUM,MAXTIME=n when n is tenths of seconds); or dump serialization may be held for as long as it takes to dump all data that was requested to be dumped while the structure is serialized (ACCESSTIME=NOLIMIT). The access time parameter specified by the connector that allocates the structure can be overridden when an SVC dump is requested by the operator.

One example of the syntax for IXLCONN is shown below:

```
[xlabel] IXLCONN    STRNAME=xstrname
                    ,CONNAME=xconname
                    [,ACCESSTIME=MAXIMUM
                        [,MAXTIME={xmaxtime|0}]]
                    [,ACCESSTIME=NOLIMIT]
                    ,TYPE=CACHE
                        ,VECTORLEN=xvectorlen
                        ,NUMCOCLASS=xnumcoclass
                        ,NUMSTGCLASS=xnumstgclass
                    ,TYPE=LIST
                        ,LISTHEADERS=xlistheaders
                    ,TYPE=LOCK
                        ,LOCKENTRIES=xlockentries
                        ,NUMUSERS=xnumusers
                    ,ANSAREA=xansarea
                    ,ANSLEN=xanslen
```

Where:

[xlabel] is an optional symbol, starting in column 1, that is the name on the IXLCONN macro invocation. The name must conform to the rules for an ordinary assembler language symbol. DEFAULT: No name.

STRNAME(xstrname) is the name (RS-type) (or address in register (2)–(12) ASM only) of a required 16 character input that specifies the structure name the user wishes to connect to. The logical structure name provides the ability to map the request to a physical facility.

In one embodiment, the structure name must be 16 characters long, padded on the right with blanks if necessary. It may validly contain numeric characters, uppercase alphabetic characters, national characters ($, @, #), or an underscore (_). It must begin with an uppercase alphabetic character. IBM names will begin with SYS, an IBM component prefix, or letters A–I.

CONNAME(xconname) is the name (RS-type) (or address in register (2)–(12) ASM only) of a 16 character input that specifies a name by which the user wishes to be identified. The name must be unique within the scope of a given structure.

The CONNAME must be 16 characters long, padded on the right with blanks if necessary. It may validly contain numeric characters, uppercase alphabetic characters, national characters ($, @, #), or an underscore (_). It must begin with an uppercase alphabetic character.

[ACCESSTIME({MAXIMUM|NOLIMIT})] is an optional keyword input which defines the length of time that the connector can tolerate not having access to the structure. Access will be denied to connectors when SVC dump obtains serialization in order to dump data in the structure. When SVC dump holds serialization on the structure, new connections are not permitted. DEFAULT: MAXIMUM

[ACCESSTIME(MAXIMUM)] specifies that the maximum time for which the connector can tolerate not having access to the structure. The maximum time is defined by the connector which allocates the structure using the MAXTIME keyword.

[MAXTIME({xmaxtime|0})]] is the name (RS-type) (or address in register (2)–(12) ASM only) of an optional halfword input that specifies the maximum time in tenths of seconds that the connector can tolerate not having access to the structure.

If zero is specified, which is the default, serialization will not be obtained for the structure by SVC dump. SVC dump will not be able to obtain serialization on the structure and, therefore, cannot include this structure in an SVC dump. DEFAULT: 0

[ACCESSTIME(NOLIMIT)] specifies that serialization may be held for as long as is required to capture all data requested.

TYPE({CACHE|LIST|LOCK}) is a required keyword input which defines the structure type for the structure to which the user is connecting to.

TYPE(CACHE) specifies a cache structure.

VECTORLEN(xvectorlen) is the name (RS-type) (or address in register (2)–(12) ASM only) of a required fullword input that contains the number of local buffers in the user's local cache which require concurrent registration. The value of this field is used to allocate resources which map the local buffers in the user's cache to the named entries in the cache structure.

NUMCOCLASS(xnumcoclass) is the name (RS-type) (or address in register (2)–(12) ASM only) of a required fullword input that contains the number of cast-out classes.

NUMSTGCLASS(xnumstgclass) is the name (RS-type) (or address in register (2)–(12) ASM only) of a required fullword input that contains the number of storage classes.

TYPE(LIST) specifies a list structure.

LISTHEADERS(xlistheaders) is the name (RS-type) (or address in register (2)–(12) ASM only) of a required fullword input that contains the number of list headers to be allocated for the list structure. The number of list headers must be greater than zero.

TYPE(LOCK) specifies a lock structure.

LOCKENTRIES(xlockentries) is the name (RS-type) (or address in register (2)–(12) ASM only) of a required fullword input that contains the number of lock entries to be allocated for the lock structure.

The number of lock entries will be rounded upward to a power of 2, if it is not already.

NUMUSERS(xnumusers) is the name (RS-type) (or address in register (2)–(12) ASM only) of a required byte input that contains the maximum number of users that may connect and use the lock structure.

ANSAREA(xansarea) is a required input. It is the name (RS-type) area to contain the data being returned by the IXLCONN service routine. In this area a sysplex-wide unique connect token (CONTOKEN) that is used on subsequent requests for services from the connected XES user initiating the IXLCONN request is returned. The answer area must begin on a double word boundary.

ANSLEN(xanslen) is the name (RS-type) of a required fullword input that contains the length of the ANSAREA.

Described above is one embodiment of a data processing system which includes the control facility of the present invention. While the invention is described in relation to a multisystem environment, such as the one depicted in FIG. 1, it can also be used with a single system environment, which includes one central processing complex 12.

Figure 14:
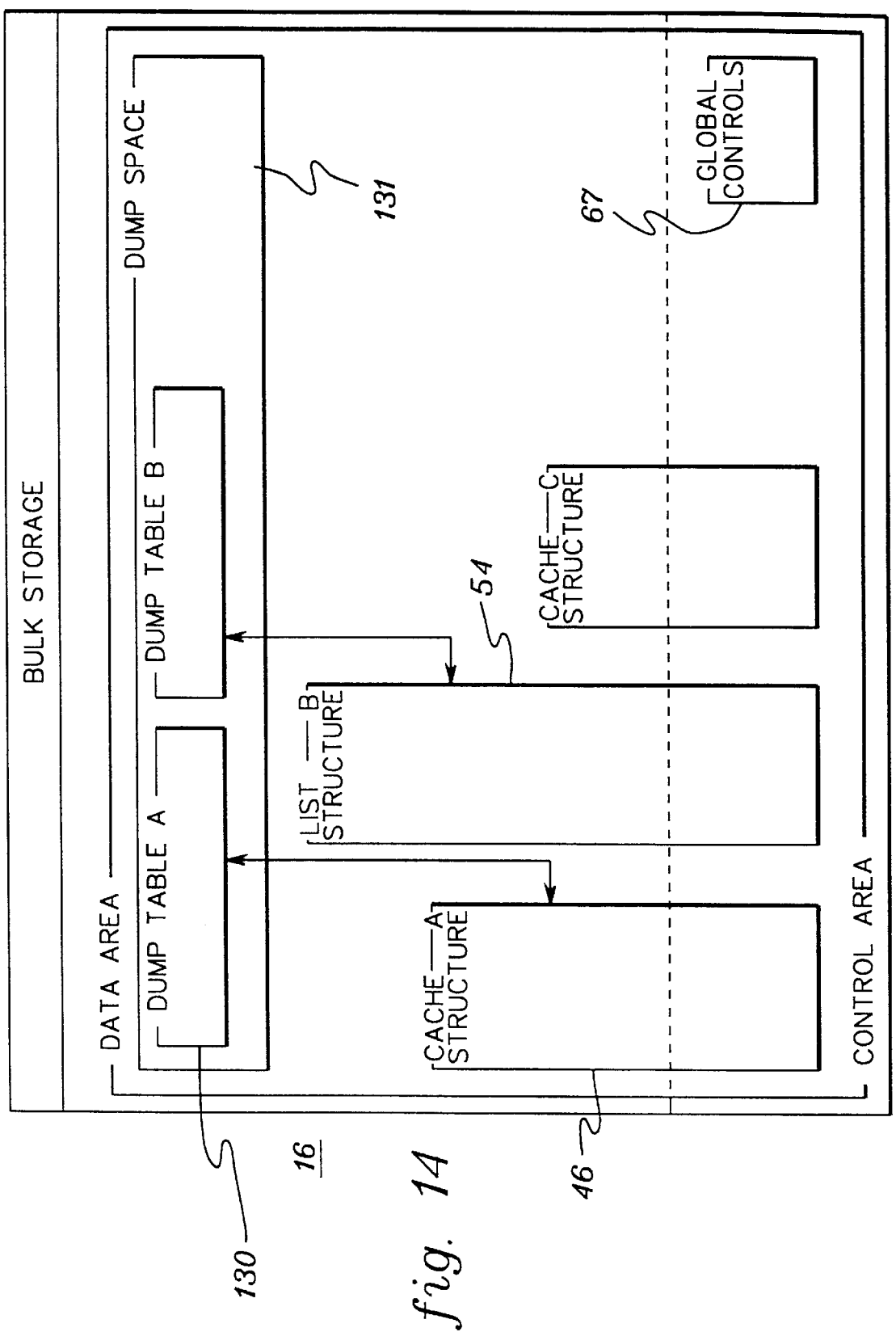
FIG. 14 depicts one example of a coupling facility in which dump tables are present in a dump space, in accordance with the principles of the present invention.

In accordance with the principles of the present invention, mechanisms are provided within the operating systems in order to capture and/or control access to information stored in a coupling facility. Such requests may originate at any time from programs using the SDUMPX interface, operator commands, or internally by the operating system when one or more of the operating systems lose communication with the coupling facility. As described in further detail herein, some or all of the information stored within the coupling facility is captured. The captured information is stored in a dump table 130 (FIG. 14), which is created within a dump space 131 of bulk storage within coupling facility 16. Dump table 130 is associated with a particular structure (e.g., cache structure A). As shown, each structure may be associated with a dump table, but all the dump tables reside within one dump space 131.

Figure 15:
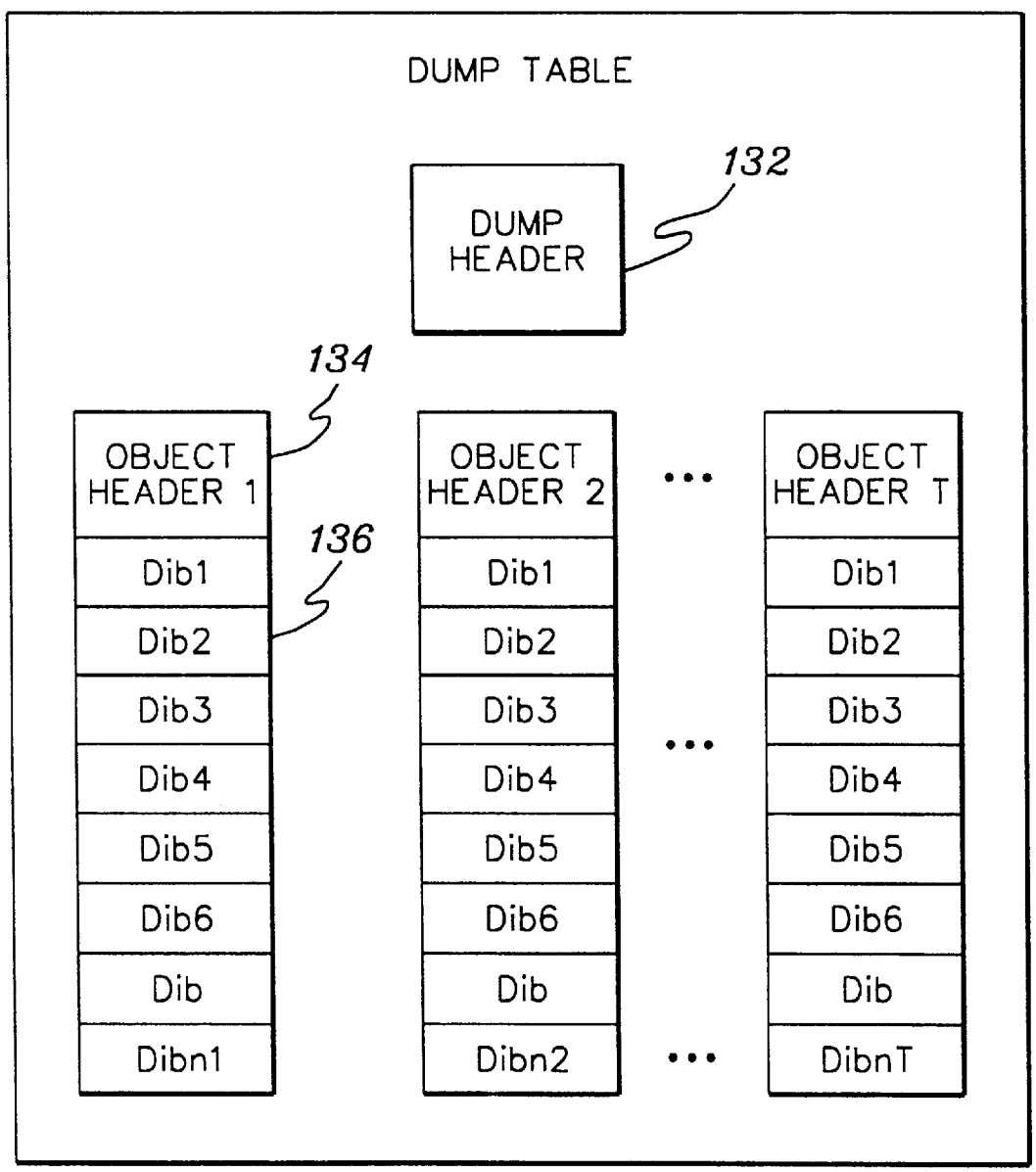
FIG. 15 depicts one example of a dump table, in accordance with the principles of the present invention.

In one instance, dump table 130 includes a dump header 132 (FIG. 15), one or more object headers 134, each of which corresponds to an object located in the coupling facility structure to be dumped, and one or more dumping information blocks (DIBS) 136, each of which corresponds to a particular object.

Figure 16:
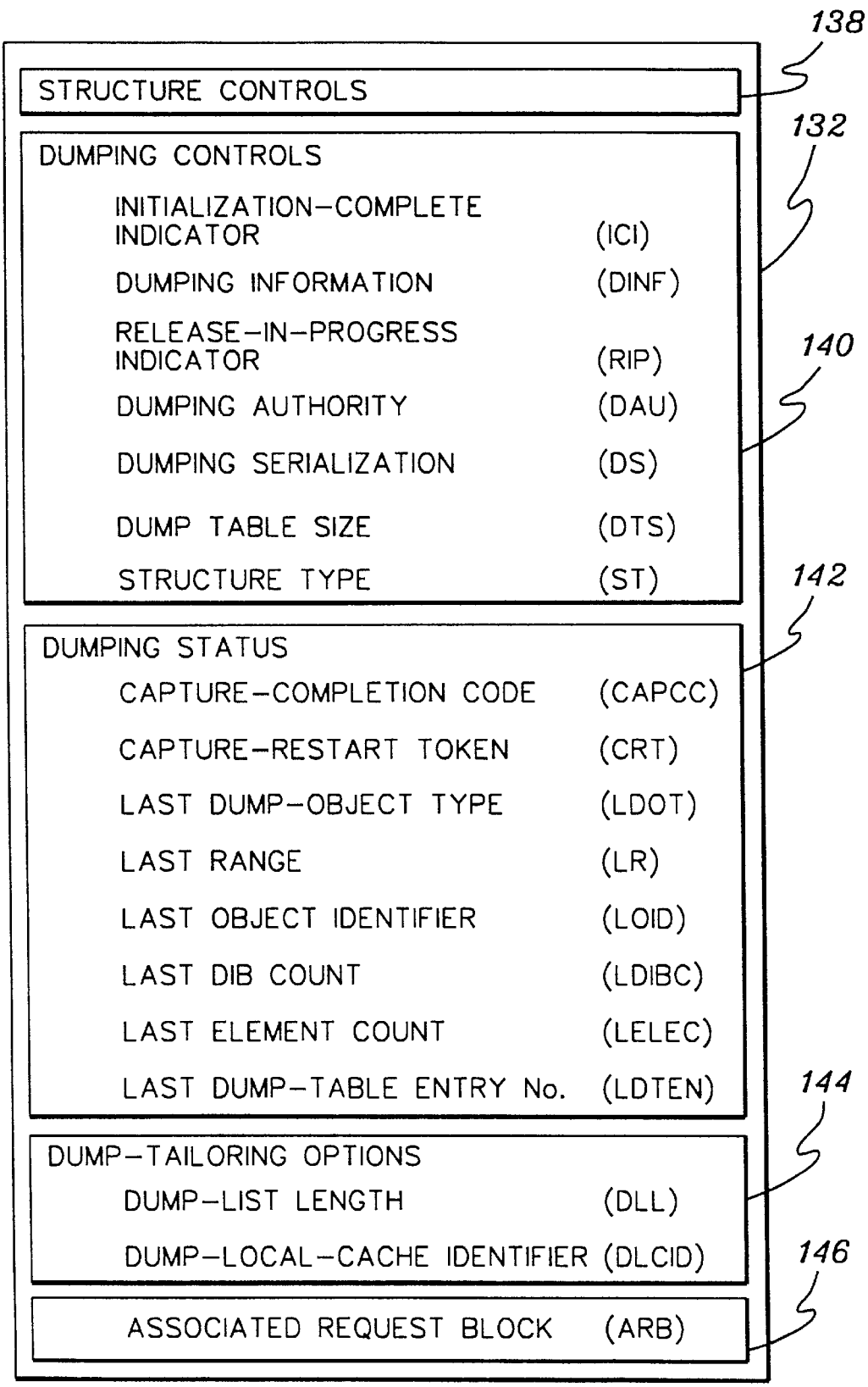
FIG. 16 depicts one example of a dump header of the dump table of FIG. 15, in accordance with the principles of the present invention.

Referring to FIG. 16, dump header 132 includes structure controls 138, dumping controls 140, dumping status 142, dump-tailoring options 144 and an associated request block 146. Each of the above are described in further detail herein.

Structure controls 138 include a number of operands depending on the type of structure, i.e., a list structure or cache structure. As described in detail above, if the structure is a list structure, then structure controls 138 include the following operands depicted in FIG. 8: Maximum Data-List-Entry Size, List-Structure Type, Lock-Table-Entry Characteristic, List-Element Characteristic, Minimum Structure Size, Lock-Table-Entry Count, List Count, Structure Size, Maximum Structure Size, Target Structure Size, Target Maximum-Element Count, Target Maximum-Entry Count, Maximum List-Set-Element Count, List-Set-Element Count, Non-Zero-Lock-Table-Entry-Count, Maximum List-Set-Entry Count, List-Set-Entry Count, Structure Authority, User Structure Control, and User-Identifier Vector.

On the other hand, if the structure is a cache structure, then as described above with reference to FIG. 4, the operands include the following: Total-Directory-Entry Count, Total-Data-Area-Element Count, Adjunct-Assignment Indicator, Maximum Storage Class, Maximum Cast-Out Class, Data-Area-Element Characteristic, Maximum Data-Area Size, Structure Size, Maximum Structure Size, Minimum Structure Size, Structure Authority, User Structure Control, LCID Vector, Target Structure Size, Target Data Area Element Count and Target Directory-Entry Count.

Dumping controls 140 contain program-specified values that describe the dump and control access to the dump table and the structure while the dump is in progress. Dumping controls are associated with each dump table and include the following operands:

(a) Initialization-Complete Indicator (ICI): A value that indicates whether the dumping initialization process has completed. The value is zero, if initialization is in progress and the value is one, if initialization is complete. The initialization-complete indicator is set by the dumping initialization procedure and remains fixed after initialization is complete.

(b) Dumping Information (DINF): A program-designated value that is assigned to the dump table. Dumping information control is a program-modifiable dumping control set by an associate dump table command, and may be updated by a replace dumping controls command, described below.

(c) Release-In-Progress Indicator (RIP): A value that indicates whether a release-dump-table process is in progress. The value is zero, if a release of the dump table is not in progress, and the value is one, if a release of the dump table is in progress. The release-in-progress indicator is set by the release dump table command, described below, and is reset when the release process is completed.

(d) Dumping Authority (DAU): A program-designated value set by the associate dump table command, updated by the replace dumping controls command and reset by the release dump table command. When the value is zero, the dumping controls are available. When the value is non-zero, the dumping controls are in use.

(e) Dumping Serialization (DS): A program-designated value set by the associate dump table command and updated by the replace dumping controls command. When the value is non-zero, dumping serialization is held on the structure. Otherwise, the structure is not serialized.

(f) Dump Table Size (DTS): An unsigned binary integer that specifies the number of 4K-byte units of coupling facility (SES) storage assigned to the dump table. The dump table size control is set by the dumping initialization procedure and remains fixed after initialization is complete.

(g) Structure Type (ST): A value that identifies the structure type. The structure type is set by the dumping initialization procedure and remains fixed after initialization is complete.

Associated with dumping controls 140 are the following dumping control states, which are managed by the coupling facility:

(a) Dumping Controls Available (DCA): When a structure is allocated or following the successful execution of a release dump table command (described below), dumping controls 140 are available. When in the dumping-controls-available state, normal structure commands that specify the structure are executed. Only one dumping command, the associate dump table command, is executed.

(b) Capture-In-Progress State (CIP): An associate dump table command places the dumping controls in the capture-in-progress state. When in the capture-in-progress state, the dumping authority is non-zero, the dumping serialization is non-zero, and the capture completion code contains X'00'. The following commands, each of which are described below, are executed: release dump table, capture dump data, read captured block, replace dumping controls, read dumping controls and read dumping-object data. No other commands that specify the structure are executed.

(c) Capture-Complete Serialization-Held State (CCSH): When the capture process reaches normal completion or encounters a dump-table-full condition, the capture process is completed and the dumping controls enter the capture-complete serialization-held state. The dumping authority is non-zero, the dumping serialization is non-zero, and the capture-completion code is either normal completion or dump table full, depending on the reason for completion. The following commands are executed: release dump table, replace dumping controls, read captured block, read dumping controls and read dumping-object data. No other commands that specify the structure are executed.

(d) Capture-Complete Serialization-Released State (CCSR): When the replace dumping serialization command is executed with a replace value of zero for the dumping serialization, the dumping controls enter the capture-complete serialization-released state. No further capture operations are processed for the dump table. The dumping authority is non-zero, the dumping serialization is zero and the capture-completion code depends on the reason for completion. When the initial state is capture in progress, the capture-completion code is serialization released. Otherwise, it is unchanged. The following commands are executed: release dump table, read captured block, read dumping controls, replace dumping controls, read dumping-object data and non-dumping commands. No other dumping commands that specify the structure are executed.

Returning back to FIG. 16, dumping status 142 provides a visible checkpoint of the dump as the capture operation progresses. Dumping status is maintained for each dump table and is updated at the conclusion of each capture operation. The dumping-status objects include:

(a) Capture-Completion Code (CAPCC): A value that indicates the capture operation is still in progress or the reason the capture operation was completed. The following capture-completion codes are defined:

Capture in Progress

Normal Completion

Dump Table Full

Serialization Released

The capture-completion code is set to Capture in Progress when the dump table is associated with the structure and remains Capture in Progress until the capture operation is completed. When the capture-complete indicator is set to one for every valid object specified in the associated request block, the capture-completion code is set to Normal Completion, indicating normal completion. When the dump table is full and not all capture-complete indicators are set to one, the capture-completion code is set to Dump Table Full, indicating an out-of-storage condition. When the dumping serialization is set to zero while capture is in progress, the capture-completion code is set to Serialization Released, indicating that the dumping serialization has been released.

(b) Capturing-Restart Token (CRT): An internal SES object associated with each dump table that controls the capture process.

(c) Last Dump-Object Type (LDOT): A value that identifies the object type of the object specified by the last object identifier (LOID) operand, described below. The value of the last-dumping-object-type object is valid when the last-range object contains a non-zero value.

(d) Last Range (LR): A value that contains the last range value processed by a capture dump data command. The last range value is initialized to zero by an associate dump table command, described below.

(e) Last Object Identifier (LOID): A value that contains the last object identifier processed by a capture dump data command. The value of the last object identifier object is valid when the last range object contains a non-zero value and the last dump object type object contains one of the values: SES List Designated by List Number, SES-Cache Storage Class and SES-Cache Cast-Out Class.

(f) Last DIB Count (LDIBC): A value that contains the count of the number of DIBs stored in the dump table for the object specified by the last object identifier. The value of the last DIB count object is valid when the last range object contains a non-zero value.

(g) Last Element Count (LELEC): A value that contains the count of the number of elements contained in the object specified by the last object identifier. The value of the last-element-count object is valid when the last-range object contains a non-zero value.

(h) Last Dump-Table-Entry Number (LDTEN): A value that identifies the highest valued dump-table entry that contains a captured block.

Dump-tailoring options 144 define the subset of control elements that are specified for inclusion in the dump. The dump tailoring options include the following operands:

(a) Dump-List Length (DLL): An object or field that specifies the number of ranges in the ARB range list of an associate dump table command.

(b) Dump-Local-Cache Identifier (DLCID): The identifier of an attached local cache associated with the dump table. The dump-local-cache identifier object is only maintained when the structure is a cache and it is used to select the specified local cache user fields from registry 82 (FIG. 3). When the dump-local-cache identifier is zero, no local cache is associated with the dump table.

Associated Request Block 146 is provided in the data block of the associate dump table command when the dump table is created and is copied into the dump header by the capture process, described below. Referring to FIG. 17, associated request block 146 contains the dumping information and the list of object-identifier ranges to be included in the dump. In particular, each range in the associated request block includes the following operands:

(a) Dumping-object Type for Nth Object (DOTn) (shown in FIG. 17 are 1 through n): A value that identifies the object-type assigned to the nth range in the range list defined for the dump table. One embodiment of the values of the dumping-object type operand include: SES-list lock table, SES-list list number, SES-list user controls, SES-cache storage class, SES-cache cast-out class and SES-cache local cache controls.

(b) Adjunct-Inclusion Indicator (AIIN) for the Nth object: A value associated with each range in the range list that designates whether adjunct data is included in the dump table. When the value is one, adjunct-data inclusion is requested for each object in the range. When the value is zero, adjunct-data inclusion is not requested. When the adjunct-inclusion indicator is one, adjunct data is present in the structure and the dumping-object type, described herein, is SES-list list number, SES-cache storage class or SES-cache cast-out class, then adjunct data is included in each dumping information block (DIB) stored for the object. When the dumping-object type is SES-list lock table, SES-list user controls or SES-cache local cache controls, the adjunct-inclusion indicator must be zero.

(c) DIB-Exclusion Indicator (DEIn) for Nth object: A value associated with each range in the range list that designates whether dumping-information blocks are excluded for each object in the range from the dump table. When the value is one, dumping-information blocks are excluded for each object in the range from the dump table. When the value is zero, a dumping-information block is included for each element in each object specified by the object-identifier range.

When the adjunct-inclusion indicator and the DIB-exclusion indicator for an object-identifier range are both ones, the DIB-exclusion indicator takes precedence. In this case, no dumping-information blocks or adjunct-data fields are included in the dump table for the objects specified by the object range. Only object headers are included in the dump table.

(d) Range Information (RIn) for the Nth object: A value associated with each range in the range list that contains program-specified information.

(e) Start of Nth Range (SRn): A value that specifies the lowest-valued object identifier in the Nth range in the associated request block. When the Nth object type is SES-list lock table, SES-list user controls or SES-cache local cache controls, the Nth start-of-range value is ignored. When the Nth object type is SES-list list number, SES-cache storage class or SES-cache cast-out class, the Nth start-of-range value must be less than or equal to the Nth end-of-range value.

The entire range of objects for a given dumping-object type may be included in the dump by specifying a value of X'0000 0000' for the Nth start of range and a value of X'FFFF FFFF' for the Nth end of range.

(f) End of Nth Range (ERn): A value that specifies the highest-valued object identifier in the Nth range in the associated request block. When the Nth object type is SES-list lock table, SES-list list user controls or SES-cache local-cache controls, the Nth end-of-range value is ignored. When the Nth object type is SES-list list number, SES-cache storage class, or SES-cache cast-out class, the Nth end-of-range value must be greater than or equal to the nth start-of-range value.

The range list may be in any order and may include overlapping ranges, although this should be avoided to minimize the size of the dump table.

This list of objects created in the dumping controls will be in the order specified by the range list. Thus, when storage is constrained, the range-list order represents a priority order for including objects in the dump. If storage classes and cast-out classes are both specified for the dump of a cache structure, the same directory entry may appear twice in the dump table.

Copies of the structure controls, dumping controls, dumping status and the dump-tailoring options are copied into the dump-header record, which is contained in the first two dump-table entries, during the dumping process.

Referring back to FIG. 15, dump table 130 also includes object header 134. When a particular object is captured, information describing that object is moved into object header 134. This information includes the operands depicted in FIG. 18 and described in detail below:

(a) Dumping-Object Type (DOT): A value that identifies the object type. The dumping object type depends on the structure type and the class of object requested when the dump is initiated. For a list structure, three classes of objects exist: List Lock Table; List Designated by List Number; and List User Control. For a cache structure, three classes also exist, which include: Cache Storage Class; Cache Cast-Out Class; and Cache Local Cache Controls.

(b) Capture-Complete Indicator (CCI): A value associated with each object designated to be captured that indicates whether all the elements in an object have been captured. When set to one, the capture operation for the object is complete. When zero, additional elements exist on the element list that have not been captured in the dump table.

(c) Object Identifier (OID): A value that identifies the captured object designated by the object header. The definition depends on the dumping-object type. The following lists the DOT type followed by the OID definition:
List User Controls/Not Applicable;
Lock Table/Not Applicable;
Lock Cache Controls/Not Applicable;
List Number/List-Number Value;
SES-Cache Storage Class/Storage-Class Value;
SES-Cache Cast-Out Class/Cast-Out Class Value.

(d) DIB Count (DIBC): The number of dumping-information blocks stored in the dump table for the object.

(e) DIB Size (DIBS): An object or field that specifies the size, in bytes, of the dumping-information block. The DIB size depends on the dumping-object type, the setting of the adjunct-inclusion indicator, and whether adjunct data is present in the structure. When the dumping-object type supports adjunct data, the adjunct-inclusion indicator is one and, if adjunct data is present in the structure, then adjunct data is included in the DIB. Otherwise, adjunct data is not included.

(f) DIB-List Size (DLS): The number of dump-table entries that contain the DIB list for the object.

(g) Object Controls: The format of object controls is dependent on the object type. The object control for list user controls and local cache controls is the number of attached users (NAU) (not shown). Cast-Out Class Count (not shown) is the object control for cast-out class. The object controls for storage class are described in detail in U.S. patent application Ser. No. 08/073,909, incorporated herein by reference in its entirety, as noted; the object controls for a list are shown in FIG. 10; and there are no object controls for a locked table.

Figure 19:
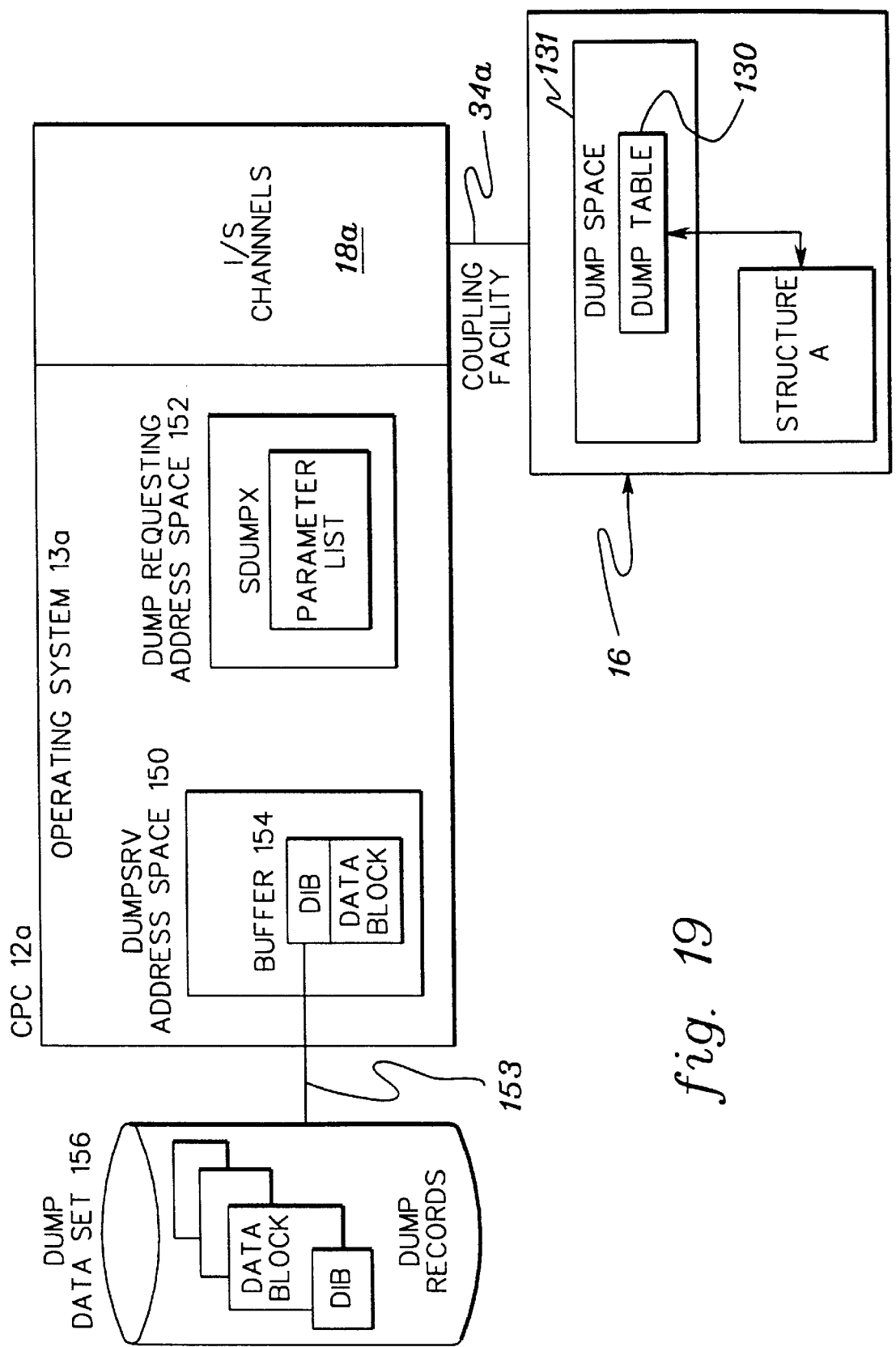
FIG. 19 illustrates one embodiment of an overview diagram representing the capture portion of the present invention.
Figure 20A:
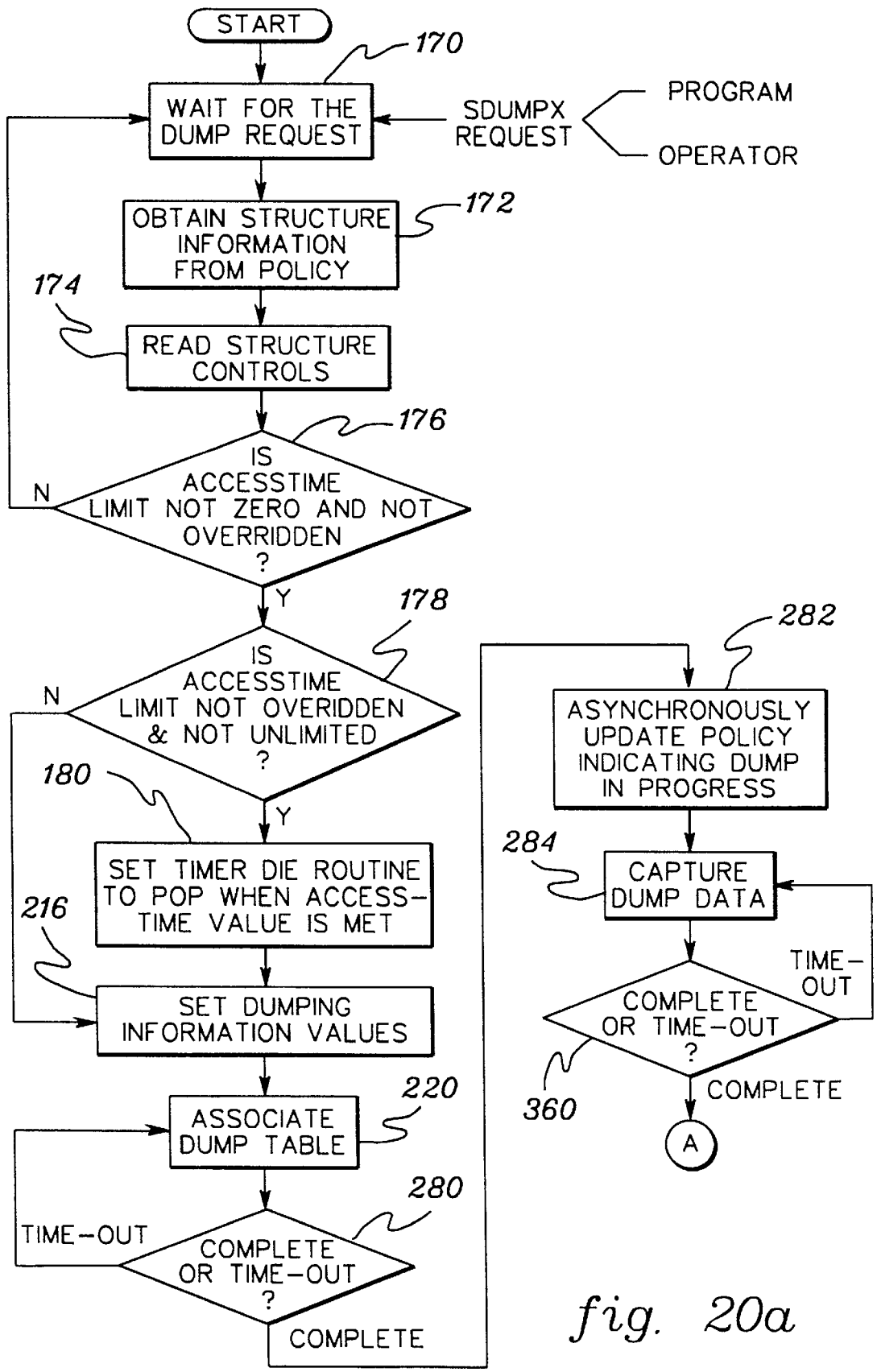
FIGS. 20a–20b illustrate one embodiment of the logic associated with the capture portion of the present invention.
Figure 20B:
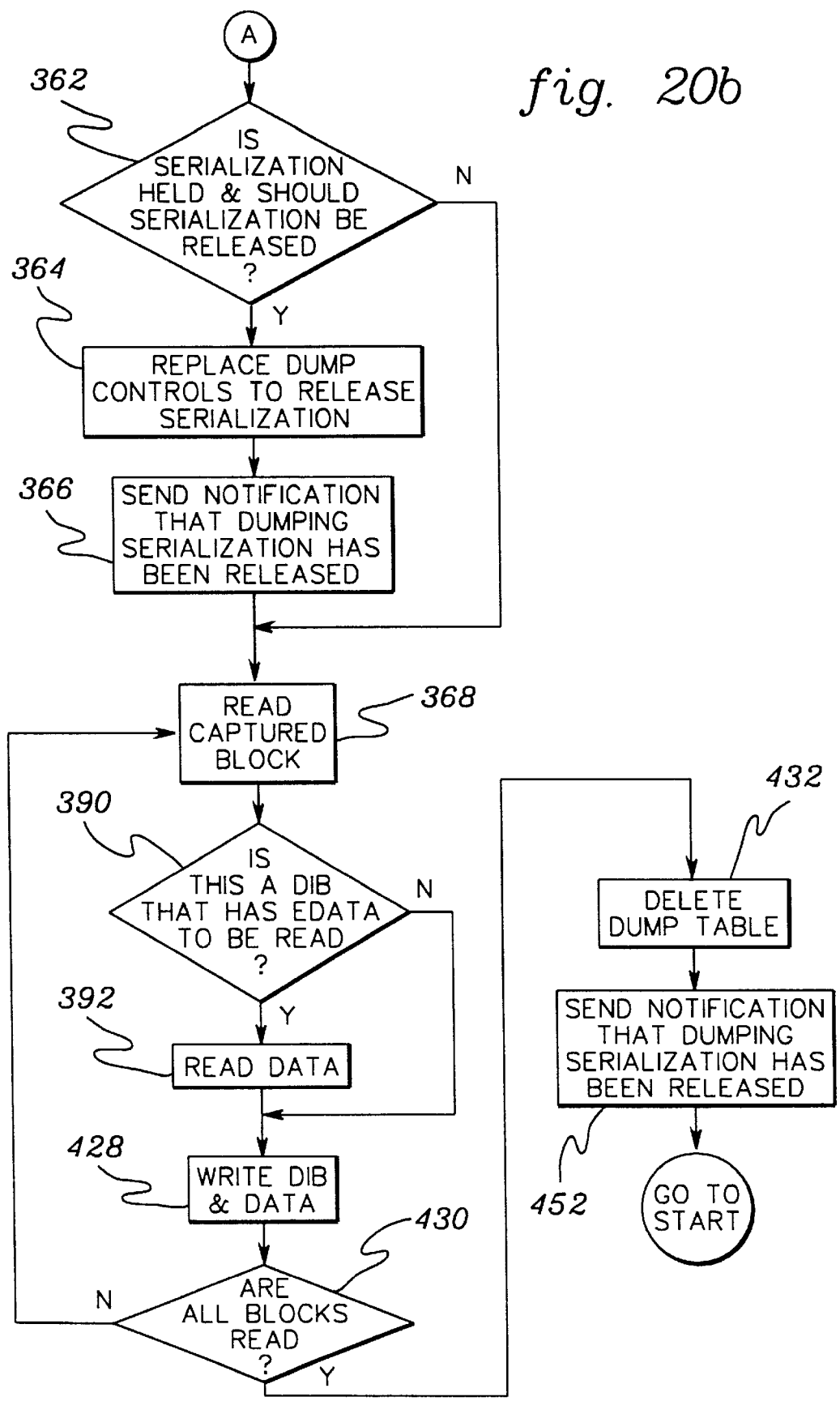

In accordance with the principles of the present invention, a dump request is initiated such that valuable information stored within the coupling facility, including information related to a failed system(s), is captured. Such requests may originate at any time from programs using the SDUMPX interface or through operator command. The operating system may internally initiate such a request when one or more operating systems loses communication with the coupling facility. In particular, each operating system monitors the status of the other operating systems, which is stored in a couple data set described below, and when one of the operating systems detect that one or more of the other operating systems lost communication with the coupling facility, the system that detected the loss will issue a dump request, as described in detail herein. The mechanisms associated with handling a dump request are described in detail with reference to the figures. FIG. 19 is a diagram, which is helpful in understanding the capturing mechanisms of the present invention and FIGS. 20a–20b represent an overview flow diagram depicting the processing associated with a dump request, in accordance with the principles of the present invention.

Referring to FIG. 19, the main components associated with the capture portion of the present invention is described. CPC 12a includes, for example, operating system 13a and I/S channels 18a. I/S channels 18a couple CPC 12a and coupling facility 16 via bus 34a. Located within operating system 13a is a DUMPSRV address space 150 and a dump requesting address space 152. DUMPSRV address space 150 is, for instance, an MVS address space used to store data and execute dumping functions. It includes a buffer 154 for storing DIBs and data retrieved from coupling facility 16, when a dump is requested. The information stored in buffer 154 is written to a dump data set 156 via a link 153, in a manner described below. Dump data set 156 includes DIBs and data blocks as the dump records.

DUMP requesting address space 152 includes an SDUMPX request and a parameter list used to initiate a dump, as described in greater detail below. The parameter list, described below, is copied into the DUMPSRV address space, when a dump is requested.

Coupled to CPC 12a is coupling facility 16. Located within coupling facility 16 is dump table 130, dump space 131 and a cache or list structure, such as Structure A. (As described above, coupling facility 16 may include a plurality of dump tables and structures.) When a dump is requested by dump requesting address space 152 and created by the mechanisms in DUMPSRV address space 150, dump table 130 constructed within dump space 131 becomes associated with a structure to be dumped, such as Structure A.

Referring to the logic flow diagram of FIGS. 20a–20b, an overview of the procedure for handling a dump request is described in detail. A dump request is issued by either a program, such as, for example, an operating system program, or through an operator command, STEP 170 "WAIT FOR THE DUMP REQUEST." One example of a program request and several examples of operator requests are described in detail below.

In one embodiment, a request is made by a program through a macro referred to as SDUMPX. SDUMPX is described in IBM Publication MVS/ESA Application Development Reference: Services For Authorized Assembler Language Programs (GC28-1649), pages 189–209, which is hereby incorporated by reference in its entirety. The SDUMPX macro invokes SVC dump, which is known in the art, to provide a fast unformatted dump of virtual storage to a data set.

In accordance with the principles of the present invention, a revision has been made to the existing SDUMPX macro. This revision includes the addition of a structure list parameter (STRLIST), which is used to identify the structures to be included in a dump. In order to request coupling facility structure information from a program, the SDUMPX macro is invoked as follows:
SDUMPX STRLIST=(list address)
wherein the list address is an Rx-type address or Reg.(2)–(12). The parameter list must be addressable from the primary address space.

In one example, STRLIST parameter list is built, in accordance with the present invention, using a BLDDUMP macro. (In another embodiment, the parameter list may be built internal to the operating system.) The BLDDUMP macro may be used by programs to build parameter lists that are passed as input to SVC dump, such as the STRLIST parameter list. BLDDUMP is described in greater detail below.

The BLDDUMP macro builds the STRLIST parameter list that is specified as input on the SDUMPX macro. The BLDDUMP macro includes a TYPE parameter, which determines the particular operation the macro will perform on the parameter list. Examples of various TYPE parameters are listed below:
(a) BLDDUMP TYPE=INITIAL initializes the storage to binary zeroes and generates an initialized header for the dump parameter list. The length of the dump parameter list header is 24 bytes.
(b) BLDDUMP TYPE=STRUCTURE (for STRLIST) generates a structure entry in the dump parameter list. The length of this entry is 48 bytes.
(c) BLDDUMP TYPE=STRRNG (for STRLIST) generates a structure range entry in the dump parameter list. The length of this entry is 12 bytes.
(d) BLDDUMP TYPE=STROPT (for STRLIST) generates a structure option entry in the dump parameter list. The length of this entry is 12 bytes.
(e) BLDDUMP TYPE=ENDLIST completes the construction of the dump parameter list. No entries will be added to the dump parameter list.

The BLDDUMP service builds the dump parameter list in a block of storage that is passed in on the PARMAREA parameter, described below. Each time the BLDDUMP service is called, an entry of a fixed size that depends on the TYPE option will be built in the dump parameter list.

To determine the size of the block of storage needed for the parameter list, total the number of bytes of storage needed for each entry in the dump parameter list. The length of each entry can be found in the above description.

The minimum amount of storage that can be passed to BLDDUMP is 72 bytes. This requirement implies that there must be room for the header and one TYPE(STRUCTURE) entry. If this is not done, a return code and reason code will be returned on the TYPE(INITIAL) invocation, all subsequent invocations will fail, and the dump parameter list will contain nothing but zeros.

If the size is calculated incorrectly and, as a result, there is not enough room in the STRLIST parameter list to add a desired entry, a return code and reason code will be returned for that specific invocation. Secondly, subsequent BLDDUMP invocations will not be permitted to add entries to the STRLIST parameter list and will instead propagate the return and reason code. Lastly, the TYPE(ENDLIST) invocation will set the total length of the STRLIST to 16 bytes less than the length of the block of storage used for the STRLIST parameter list. In this case, it will be the responsibility of SDUMPX to check that all entries are processed.

Another problem will exist if the starting range value of the TYPE(STRRNG) entry is greater than the ending range value. If such a case does exist, a return code and reason code will be returned and the TYPE(STRRNG) entry will not be added to the dump parameter list.

As a recommendation to the user of this service, all of the TYPE(STRRNG) and TYPE(STROPT) entries for a requested structure in a TYPE(STRUCTURE) entry should be grouped together to avoid unnecessary usage of space in the parameter list.

In order to use this macro correctly, the user should adhere to the following guidelines. Failure to do so may result in unexpected errors or incorrect results:
TYPE(INITIAL) is specified before any other invocations of BLDDUMP.
TYPE(STRUCTURE) is specified for each structure desired in the dump and before any TYPE(STRRNG) or TYPE(STROPT) entries for that structure.

Once TYPE(STRUCTURE) is processed, you can specify one or more TYPE(STRRNG) or TYPE(STROPT) to dump until all of the desired ranges for a requested structure are specified. In addition, the macro allows prioritization of information requested for a desired structure. The STRRNG and STROPT types can be specified in any order, which gives the user flexibility in requesting the most important information to that user first.

When all of the requested structures and their requested ranges and options have been specified, the TYPE(ENDLIST) invocation is executed to complete the work of building the parameter list.

No actions should be taken on the built parameter list once TYPE(ENDLIST) is executed.

The environment for the BLDDUMP macro is as follows: The dispatchable unit mode is task or SRB mode; the minimum authorization is problem or supervisor state; any PSW key; the addressing (AMODE) is 31-bit; the address space control (ASC) mode is primary or access register; and the serialization is enabled or disabled.

One example of the syntax of the BLDDUMP macro is as follows:

```
[xlabel] BLDDUMP    PARMAREA=xparmarea
                    ,TYPE=INITIAL
                        ,PARMLENGTH=xparmlength
                    ,TYPE=STRUCTURE
                        ,STRNAME=xstrname
                        [,CONTOKEN={XCONTOKEN|NONE}
                        ,CONNAME={xconname}]
```

-continued

```
        ,TYPE=STRRNG
            ,OBJECT={COCLASS|STGCLASS|
              LISTNUM}
            ,DUMP=ALL
            DUMP=RANGE
                ,STARTVAL=xstartval
                ,ENDVAL={xendval|NONE}
            [,ADJUNCT={NO|CAPTURE|
              DIRECTIO}]
            [,ENTRYDATA={#NO|UNSERIALIZE|
              SERIALIZE}]
            [,SUMMARY={#NO|YES}]
        ,TYPE=STROPT
            OPTION={LOCKENTRIES|
              USERCNTLS }
        ,TYPE=ENDLIST
        [,RETCODE=xretcode]
        [,RSNCODE=xrsncode]
```

Where:

[xlabel] is an optional symbol, starting in column 1, that is the name on the BLDDUMP macro invocation. The name must conform to the rules for an ordinary assembler language symbol. DEFAULT: No name.

PARAMAREA (xparmarea) is a required input. It is the name (RS-type) (or address in register (2–)(12) ASM only) of the block of storage to be used for building the dump parameter list. This block of storage will eventually be passed in as input on the SDUMPX macro.

T Y P E ({INITIAL|STRUCTURE|STRRNG|STROPT|ENDLIST}) is a required keyword input that specifies the type of operation to be performed on the dump parameter list.

TYPE(INITIAL) initializes the storage to binary zeroes and generates an initialized header for the dump parameter list. The length of the dump parameter list header is 24 bytes.

PARMLENGTH(xparmlength) is the name (RS-type) (or address in register (2)–(12) ASM only) of a required fullword input which specifies the length, in bytes, of the block of storage used for the dump parameter list.

TYPE(STRUCTURE) generates a structure entry in the STRLIST dump parameter list. The length of this entry is 36 bytes.

STRNAME(xstrname) is the name (RS-type) (or address in register (2)–(12) ASM only) of a required 16 character input variable which contains the name of the structure to be dumped.

The following is a set of mutually exclusive keys. This set is optional; only one key may be specified.

[CONTOKEN({xcontoken|NONE})] is the name (RS-type) (or address in register (2)–(12) ASM only) of an optional 16 character input field that contains the connect token returned by the IXLCONN service, described above. The CONTOKEN uniquely identifies the user's connection to a structure. When this keyword is specified for a cache structure, the local cache entry number of the specified user for each entry will be included in the dump.

CONNAME({xconname})] is the name (RS-type) (or address in register (2)–(12) ASM only) of an optional 16 character input field that contains the name of the connected user. When this keyword is specified for a cache structure, the local cache entry number of a specified user will be included in the dump.

End of a set of mutually exclusive optional keys. DEFAULT: CONTOKEN

TYPE(STRRNG) generates a structure range entry in the STRLIST dump parameter list. The length of this entry is 12 bytes.

OBJECT({COCLASS|STGCLASS|LISTNUM}) is a required keyword input which indicates what type of range should be dumped.

COCLASS specifies that the requested range is a range of cast-out classes. This keyword should only be used if the requested structure is a cache structure. If the requested structure is not a cache structure, nothing will be dumped for this entry.

STGCLASS specifies that the requested range is a range of storage classes. This keyword should only be used if the requested structure is a cache structure. If the requested structure is not a cache structure, nothing will be dumped for this entry.

NOTE: If a data entry appears in both a cast-out class and a storage class, and both classes are requested to be dumped in two BLDDUMP parameter list entries, the entry will be dumped twice.

LISTNUM specifies that the requested range is a range of list numbers. This keyword should only be used if the requested structure is a list structure. If the requested structure is not a list structure, nothing will be dumped for this entry.

DUMP({ALL|RANGE}) is a required keyword input that specifies the ranges to be dumped of a requested object.

DUMP(ALL) specifies that all values of the requested object will be dumped. For example, when OBJECT (COCLASS) is specified with DUMP(ALL), all of the object controls and their associated entries in all of the cast-out classes will be dumped. If SUMMARY, described below, is specified, none of the associated entries will be dumped. Only the object controls will be dumped in this instance. For example, when OBJECT (COCLASS) DUMP(ALL) and SUMMARY(YES) are specified, all of the object controls for all of the cast-out classes will be dumped and no entries will be dumped for any of the cast-out classes.

DUMP(RANGE) specifies that a range of values of the requested object will be dumped. For example, when OBJECT(COCLASS) is specified with DUMP (RANGE), the object controls for the cast-out classes requested will be dumped, as well as their associated entries. If SUMMARY is specified, none of the associated entries will be dumped. Only the object controls will be dumped in this instance. For example, when OBJECT(COCLASS) DUMP(RANGE) and SUMMARY(YES) are specified, all of the object controls for the range of cast-out classes will be dumped and no entries will be dumped for any of these cast-out classes.

STARTVAL(xstartval) is the name (RS-type) (or address in register (2)–(12) ASM only) of a required fullword input which specifies the starting range value.

[ENDVAL({xendval|NONE}))] is the name (RS-type) (or address in register (2)–(12) ASM only) of an optional fullword input which specifies the ending range value. If ENDVAL is not specified, only the value specified on STARTVAL will be dumped for this range. DEFAULT: NONE

[ADJUNCT({NO|CAPTURE|DIRECTIO})] is an optional keyword input which indicates whether adjunct data should be included in the dump for all entries within the specified range, and if included, when the adjunct data should be dumped. This keyword is mutually exclusive with SUMMARY(YES). DEFAULT: No NO specifies that the adjunct data should not be dumped.

CAPTURE specifies that the adjunct data should be captured along with the control entries and stored in the dump table associated with the structure.

DIRECTIO specifies that the adjunct data should be dumped via direct I/O to dump data set 156 after the controls are captured.

[ENTRYDATA({NO|UNSERIALIZE|SERIALIZE}))] is an optional keyword input which indicates whether entry data should be included in the dump for all entries within the specified range. This keyword is mutually exclusive with SUMMARY(YES). DEFAULT: NO NO specifies that the entry data should not be dumped.

UNSERIALIZE specifies that the entry data should be dumped unserialized.

SERIALIZE specifies that the entry data should be dumped serialized.

[SUMMARY({NO|YES}])] is an optional keyword input which indicates whether the dump should only include a summary of the requested object. When this is requested, the entry control information for the entries is excluded. Only structure and class information will be included in the dump. SUMMARY(YES) is mutually exclusive with the ADJUNCT and ENTRYDATA keywords. DEFAULT: NO NO specifies that a summary dump of the requested object should not be taken.

YES specifies that a summary dump of the requested object should be taken.

TYPE(STROPT) generates a structure option entry in the STRLIST dump parameter list. The length of this entry is 12 bytes.

OPTION({LOCKENTRIES|USERCNTLS}) is a required keyword input which indicates what option is desired in the dump.

LOCKENTRIES specifies that the lock table entries associated with the requested structure should be included in the dump. This should only be specified when the structure is a list structure.

USERCNTLS specifies that the user attach controls should be included in the dump.

TYPE(ENDLIST) specifies that the building of the dump parameter list is complete. This must be specified when the building of the parameter list is complete.

[RETCODE(xretcode)] is the name (RS-type) of an optional fullword output variable (or register (2)–(12) ASM only) that will contain the return code.

[RSNCODE(xrsncode)] is the name (RS-type) of an optional fullword output variable (or register (2)–(12) ASM only) that will contain the reason code.

Referring back to FIG. 20a, in addition to requesting a dump via a program, an operator may also request a dump by using an operator dump command. An example of an operator dump command is DUMP. The DUMP command causes a system dump (i.e., SVC dump) through the SDUMPX macro interface. The SVC dump is stored on direct access data set 156. In one example, the syntax for the DUMP command is as follows:

DUMP COMM=(text)

Where COMM=(text) is the title (1–100 characters) the dump is to have. This title becomes the first record in dump data set 156.

In response to the DUMP command, the system prompts the user for the dump options to be specified via, for example, the following message:

IEE094D SPECIFY OPERANDS(S) FOR DUMP COMMAND.

One of the options that may be included is, for instance, STRLIST. In order to respond to the DUMP COMMAND, a known REPLY command, for example, may be used. DUMP and REPLY are explained in detail in IBM Publication MVS/ESA SYSTEM COMMANDS (GC28-1626-03), pages 4–131 through 4–134, which is hereby incorporated by reference in its entirety.

One embodiment of the logic associated with an operator entering a dump command is described in detail below with reference to FIG. 21. When an operator enters a dump command, such as DUMP, STRLIST is parsed to determine its attributes, STEP 171 "PARSE THE PARAMETER." In particular, the input from STRLIST on the DUMP command is broken down in order to obtain access to its constituent parts, such as the structures to be dumped.

Subsequent to parsing STRLIST, the parameter list, STRLIST, is built for the SDUMPX command using the parsed information, STEP 177 "ADD PARAMETER TO STRLIST PARAMETER LIST." Thereafter, the STRLIST parameter list is passed to SVC dump when a dump is requested, STEP 179, and flow enters FIG. 20a at START.

In addition to the DUMP command described above, an operator may use a CHNGDUMP command to request structures to be dumped when a single system fails or when all the systems connected to a coupling facility fail. CHNGDUMP is described in detail in MVS/ESA SYSTEM COMMANDS (GC28-1626-03), pages 4–19 through 4–30, which is incorporated herein by reference in its entirety. One embodiment of the syntax for the CHNGDUMP command is as follows:

CHNGDUMP SET, SDUMP,SYSFAIL,STRLIST=(structure names and options)

STRLIST, which is an addition to the CHNGDUMP command, in accordance with the principles of the present invention, is described in detail herein. CHNGDUMP creates the STRLIST parameter list internal to the operating system and stores it on the function data set.

If a structure in STRLIST already has dump options set, the dump options will be replaced. SVC dump will only save the dump options when the issuing system has connectivity to the function data set. If connectivity does not exist, an error message will be displayed. These options will be set for all systems connected to the function data set.

Figure 21A:
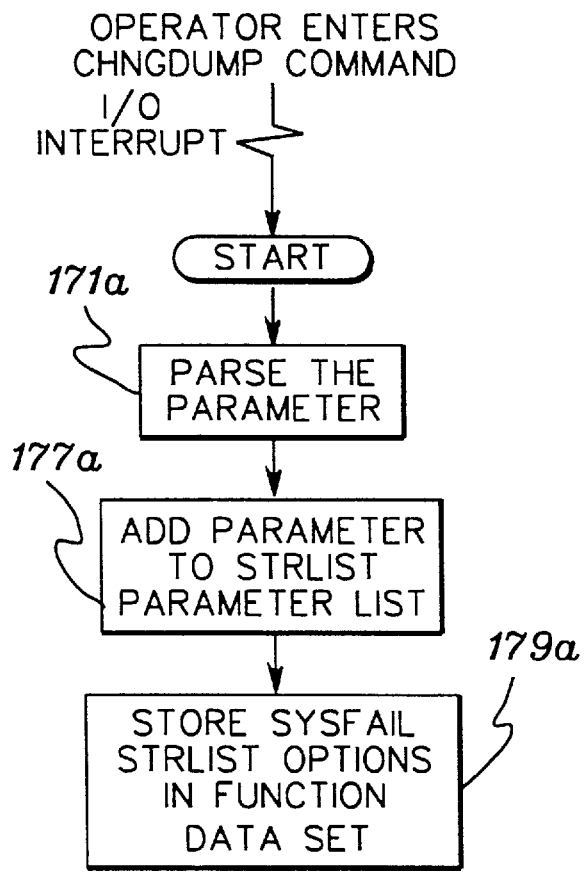
FIG. 21a illustrates one embodiment of the logic associated with an operator CHNGDUMP command, in accordance with the principles of the present invention.

One embodiment of the logic associated with an operator entering a CHNGDUMP command is described in detail below with reference to FIG. 21a. When an operator enters a CHNGDUMP command, the input STRLIST is parsed to determine its attributes, STEP 171a "PARSE THE PARAMETER." Subsequently, the parameter list, STRLIST, is built using the information, which was parsed, STEP 177a, and the SYSFAIL STRLIST options are stored on the function data set, STEP 179a.

A further operator dump command is a SLIP command. The SLIP command controls serviceability level indication processing, a diagnostic aid designed to intercept or trap certain system events. The operator can indicate the kinds of events to be trapped and what the system is to do when these events occur. SLIP should only be used at the direction of the system programmer and it is described in detail in IBM Publication MVS/ESA SYSTEM COMMANDS (GC28-1626-03), pages 4–227 through 4–268, which is incorporated herein by reference in its entirety.

Figure 21B:
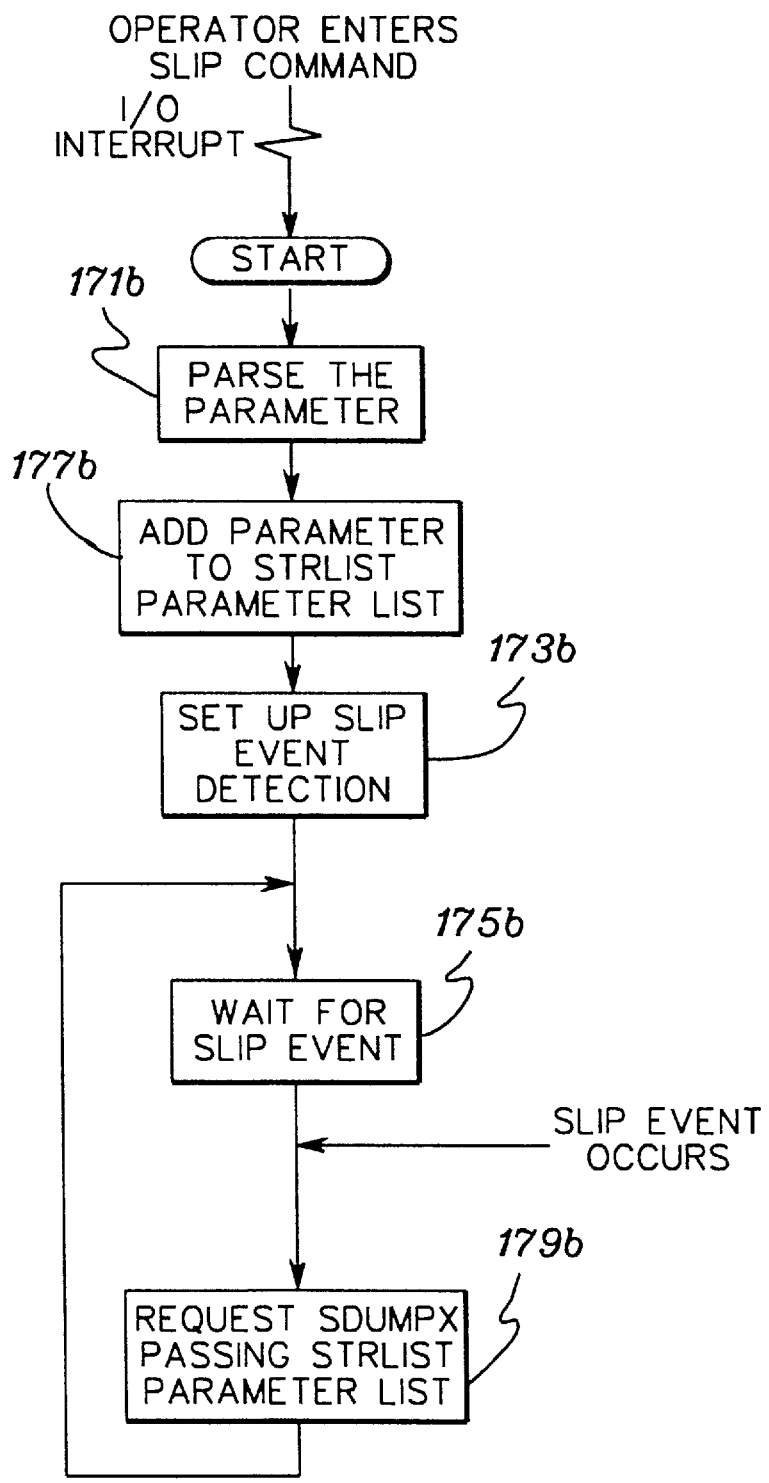
FIG. 21b illustrates one embodiment of the logic associated with an operator SLIP command, in accordance with the principles of the present invention.

One of the options which may be specified on the SLIP command is STRLIST. It may be specified for ACTION=SVCD or ACTION=SYNCSVCD for local or remote dump requests. Further, the flow described in FIG. 21b is pertinent to the SLIP command.

Initially, when the operator enters the SLIP command, STRLIST, which is an input on the SLIP command, is parsed, as described above, STEP 171b "PARSE THE PARAMETER." Subsequently, the structures and options from the parsed STRLIST are used to build the parameter list, STRLIST, for eventual passing to SDUMPX, STEP 177b "ADD PARAMETER TO STRLIST PARAMETER LIST."

After the parameter list is built, the slip event detection is set up in a known manner, STEP 173b "SET UP SLIP EVENT DETECTION." Thereafter, waiting takes place for the slip event, STEP 175b. once the slip event takes place, the parameter list is passed to SDUMPX and SDUMPX is requested, STEP 179b "REQUEST SDUMPX PASSING STRLIST PARAMETER LIST."

In one example, the syntax for the STRLIST parameter list is as follows:

```
STRLIST=(STRNAME=strname,CONNAME=conname
         ,ACCESSTIME=ENFORCE |
            OVERRIDE
         ,LOCKENTRIES
         ,USERCNTLS
         ,(COCLASS=ALL | (list)
         ,(STGCLASS=ALL | (list)
         ,(LISTNUM=ALL | (list)
         ,ADJUNCT=CAPTURE | DIRECTIO
         ,ENTRYDATA=SERIALIZE |
            UNSERIALIZE
         ,SUMMARY
     ,STRNAME=strname...)
```

Where (list) represents a list of start and end values. For example, (start1-end1,start2,start3end3, . . .).

The STRLIST parameter keywords are defined as follows:
STRNAME=strname
STRNM=strname
   strname is the name of the coupling facility structure to be included in the dump. If strname is an invalid name, a syntax error will be returned. A valid name starts with a letter and must be less than or equal to 16 characters.

The following keywords may be specified for each structure:
CONNAME=conname
CONM=conname
   conname is the name of a connected user. When this keyword is specified for a coupling facility cache structure, the user registry information for this user will be included in the dump. If the connected user represented by the conname does not exist, the dump will not contain user registry information. User registry information will always be included in the dump of a coupling facility list structure so the CONNAME keyword will be ignored when the structure is a coupling facility list structure.
ACCESSTIME=ENFORCE|OVERRIDE
ACC=ENF|OVER
   indicates whether the dump time limit specified on the ACCESSTIME parameter of the IXLCONN macro (described above) is in effect.

When ACCESSTIME=ENFORCE is specified, SVC dump will not hold serialization longer than the time interval specified on the IXLCONN macro. ACCESSTIME=ENFORCE is the default. If ACCESSTIME=0 was specified on the connect macro and ACCESSTIME=ENFORCE was specified on the dump request, the structure will not be included in the dump.

When ACCESSTIME=OVERRIDE is specified, the dump time limit is not in effect and SVC dump will release serialization after all the requested data for the structure has been processed.
LOCKENTRIES
LOCKE
   When this keyword is specified for a coupling facility list structure, the dump will include the lock table entries for the requested structure. Since lock table entries do not exist for coupling facility cache structures, this keyword will be ignored when specified for a coupling facility cache structure.
USERCNTLS
Uc
   When this keyword is specified, the user attach controls will be included in the dump.
COCLASS=ALL|(list)
COC=ALL|(list)
   Specifies which cast-out classes will be included in the dump. For each cast-out class, the cast-out class controls will be dumped and the directory information for each of the entries within the requested cast-out classes will be dumped (if SUMMARY was not specified).
   This keyword is only valid for a coupling facility cache structure. If this parameter is specified for a coupling facility list structure, the structure will not be included in the dump.
   When COCLASS=ALL is specified, the cast-out class controls for all cast-out classes will be dumped, along with the directory information for all entries within the classes (if SUMMARY was not specified).
   When COCLASS=(list) is specified, the cast-out class controls for the specified ranges of cast-out classes will be dumped, along with the directory information for the entries in the requested cast-out classes (if SUMMARY was not specified). The values specified in the range will be the hexadecimal cast-out class values. When a requested class does not exist, it will not be dumped.
STGCLASS=ALL|(list)
SC=ALL|(list)
   Specifies which storage classes will be included in the dump. For each storage class, the storage class controls will be dumped and the directory information for each of the entries within the requested storage classes will be dumped (if SUMMARY was not specified).
   This keyword is only valid for a coupling facility cache structure. If this parameter is specified for a coupling facility list structure, the structure will not be included in the dump.
   When STGCLASS=ALL is specified, the storage class controls for all storage classes will be dumped along with the directory information for all entries within the classes (if SUMMARY was not specified).
   When STGCLASS=(list) is specified, the storage class controls for the specified ranges of storage classes will be dumped along with the directory information for the entries in the requested storage classes (if SUMMARY was not specified). The values specified in the range will be the hexadecimal storage class values. When a requested class does not exist, it will not be dumped.
LISTNUM=ALL|(list)
LNUM=ALL|(list)

Specifies which lists will be included in the dump. The list controls will be dumped, along with the entry controls for the entries on each requested list (if SUMMARY was not specified).

This keyword is only valid for a coupling facility list structure. If this keyword is specified for a coupling facility cache structure, the structure will not be included in the dump.

When LISTNUM=ALL is specified, the list controls for all lists in the coupling facility list structure will be dumped, along with the entry controls (if SUMMARY was not specified).

When LISTNUM=(list) is specified, the list controls for the specified ranges of lists will be included in the dump, along with the entry controls for those lists. The values specified in the range will be the hexadecimal list values. When a requested list does not exist, it will not be dumped.

The following keywords may be specified for each range of storage classes, cast-out classes or lists:
ADJUNCT=CAPTURE|DIRECTIO
ADJ=CAP|DIO Indicates that the adjunct data for each element specified by the range will be included in the dump. When this keyword is not specified or when adjunct data does not exist for this structure, the adjunct data will not be included in the dump.

ADJUNCT may not be specified with SUMMARY. If they are both specified, a syntax error will be issued.

When ADJUNCT=CAPTURE is specified, the adjunct data will be captured in the structure dump table, along with the directory information, while dumping serialization is held.

When ADJUNCT=DIRECTIO is specified, the adjunct data will be written directly to the dump data set after the directory information is captured. The adjunct data will not be captured in the structure dump table. The adjunct data may be changing as it is being dumped.
ENTRYDATA=UNSERIALIZE|SERIALIZE
EDATA=UNSER|SER Indicates that the entry data for each element within the requested range should be included in the dump. When this keyword is not specified, or when entry data does not exist for the structure, entry data will not be included in the dump.

ENTRYDATA may not be specified with SUMMARY. If they are both specified, a syntax error will be issued.

When ENTRYDATA=UNSERIALIZE is specified, the entry data will be dumped after serialization is released. The entry data may be changing as it is being dumped.

When ENTRYDATA=SERIALIZE is specified, the entry data will be dumped while serialization is held. If ACCESSTIME=ENFORCE and the dump time limit expires before the entry data is written to the dump data set, SVC dump will continue to write the entry data to the dump data set even though serialization is not held.
SUMMARY
SUM Indicates that a summary of the range of classes or lists should be dumped. The directory information for the elements will be excluded from the dump. SUMMARY may not be specified with ADJUNCT or ENTRYDATA. If it is specified with either of these keywords, a syntax error will be returned.

Referring to FIG. 20a, subsequent to receiving a dump request, information relating to the structure(s) to be dumped is obtained from the coupling facility policy which is stored on DASD, STEP 172 "OBTAIN STRUCTURE INFORMATION FROM POLICY." The information for all structures is obtained. This information includes, for example, the associated coupling facility, the name of the defined structure(s), the local cache identifier (for a cache structure), and connect name (CONNAME) and connect token (CONTOKEN) for each user of a structure. If CONNAME or CONTOKEN is specified on the SDUMPX request, the associated LCID is selected from the policy data for the DLCID operand. After the structure information is obtained from the policy, the user structure control, which is associated with each particular structure is read, STEP 174 "READ STRUCTURE CONTROLS." If the structure is a cache structure, then the user structure control is set forth in FIG. 4. Likewise, if the structure is a list structure, then the user structure control is represented in FIG. 8.

The structure controls are read from the coupling facility to determine whether structure dumping serialization can be held for the structure and the user specified time limit for dumping serialization. In particular, the value of ACCESSTIME, which is stored in the user structure controls, is checked in order to determine, for example, the amount of time in which a structure can be serialized, INQUIRY 176 "IS ACCESSTIME LIMIT NOT ZERO OR OVERRIDDEN?"

Should the limit on ACCESSTIME be zero and if the limit is not overridden, flow returns to STEP 170 and the operating system waits for a dump request. On the other hand, if the ACCESSTIME limit is a value other than zero, or if the value is overridden, another determination is made, INQUIRY 178 "IS ACCESSTIME LIMIT NOT OVERRIDDEN AND NOT UNLIMITED?" If the ACCESSTIME limit is not overridden and it is not unlimited, then when the ACCESSTIME value is met, a timer routine is set to release serialization after the time limit has expired, STEP 180 "SET TIMER DIE ROUTINE TO POP WHEN ACCESSTIME VALUE MET." The timer routine is described in detail with reference to FIGS. 22 and 23.

Figure 22:
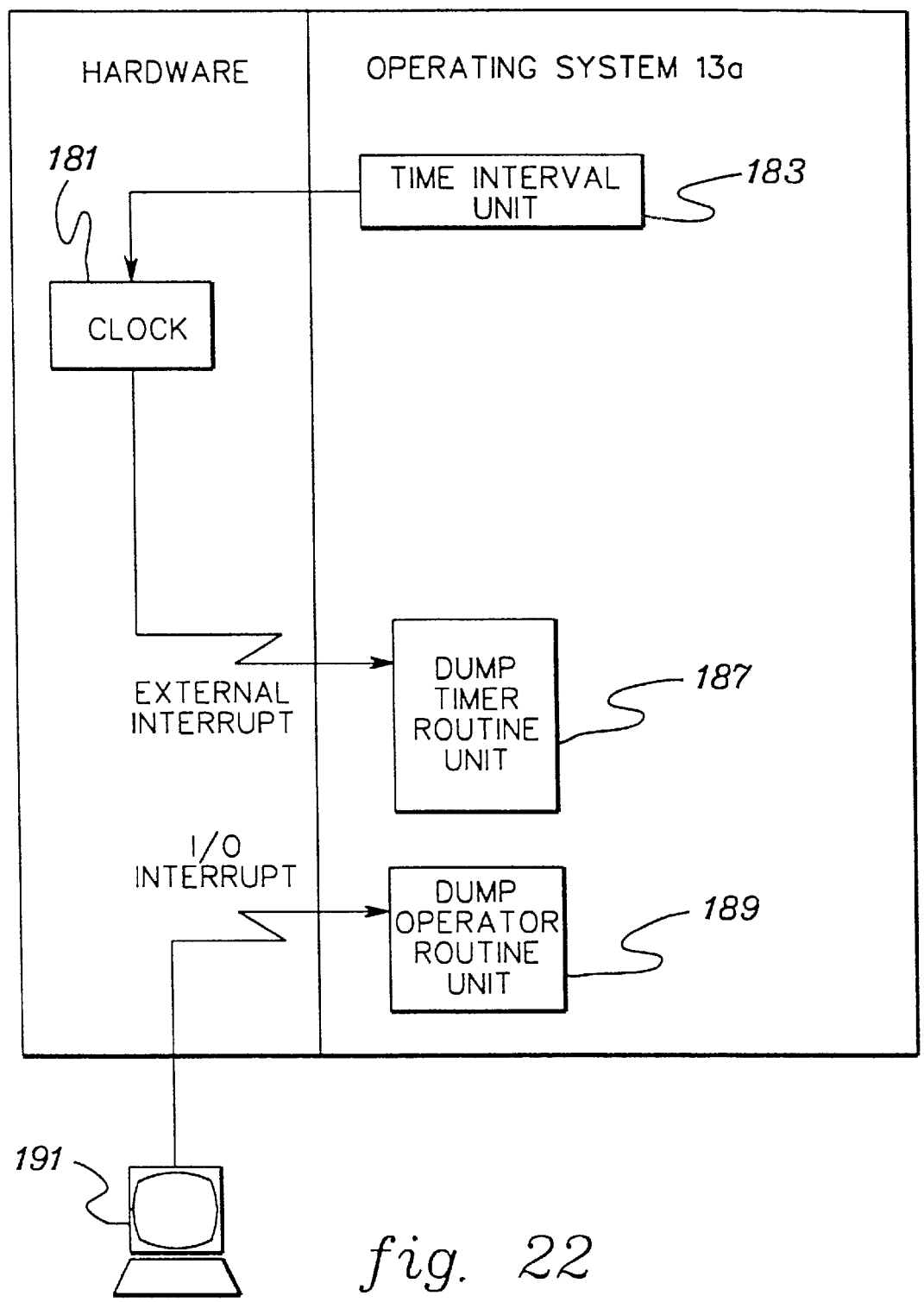
FIG. 22 is one example of an overview diagram relating to the timing of a dump request, in accordance with the principles of the present invention.

The mechanisms associated with invoking the timer routine are depicted in FIG. 22 and described herein. As shown in FIG. 22, CPC 12a contains a clock 181 and operating system 13a. Operating system 13a includes a time interval unit 183 for holding an operating system chosen value, such as, for instance, the value of ACCESSTIME (e.g., 10 seconds in length), which is selected from the user controls; and a dump timer unit 187 for invoking the dump timer routine described below with reference to FIG. 23. In order to invoke dump timer unit 187, the value in time interval unit 183 is compared to clock 181 and when the interval is exceeded, an external interrupt is signalled and sent to dump timer unit 187. In turn, unit 187 invokes the logic described in FIG. 23, which is described below.

Referring to FIG. 23, an external interrupt signal is passed to the routine when the time limit expires. As input to the routine is the structure information. A replace dumping controls command is used to release the dumping serialization of a structure, STEP 182 "REPLACE DUMPING CONTROLS, RESETTING SERIALIZATION TO ZERO." The replace dumping controls command is described in detail below with reference to FIGS. 24a–24b. (It is also described in detail in "A Dumping Service Facility For Multisystem Environments," by Elko et al., Ser. No. 08/073,909 (Docket No. PO9-92-068), Filed: Jun. 8, 1993, which is incorporated herein by reference in its entirety, as noted above.)

Referring back to FIG. 22, a dump operator unit 189 is provided for invoking the operator override time-out. In particular, when an operator wishes to invoke the dump operator routine, an I/O interrupt is sent from a dump console 191 to dump operator routine unit 189. Unit 189 is then used to invoke the logic described above with reference to FIGS. 24a–24b.

Figure 24A:
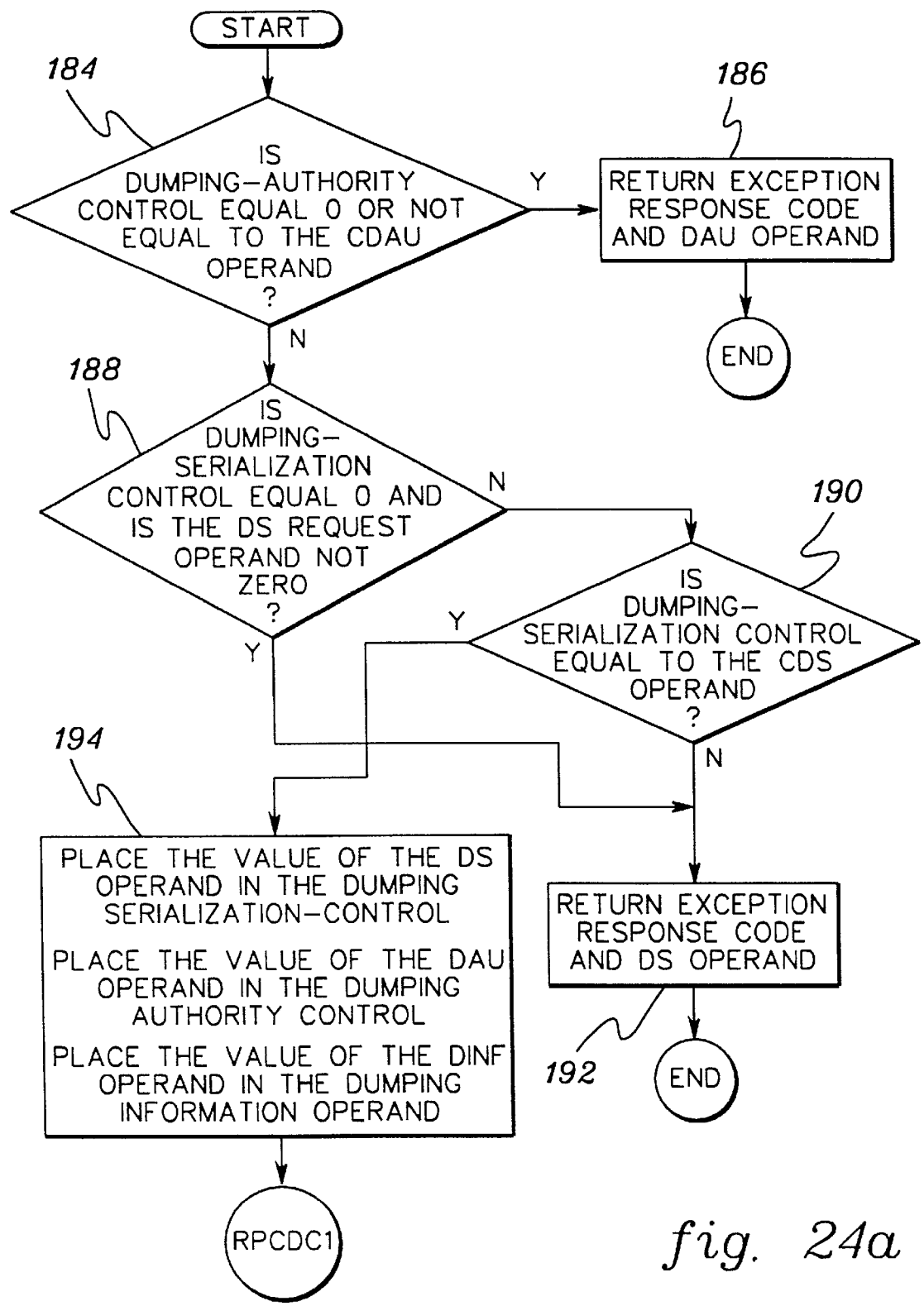
FIGS. 24a–24b illustrate one embodiment of the logic associated with a replace dumping controls command, in accordance with the principles of the present invention.
Figure 24B:
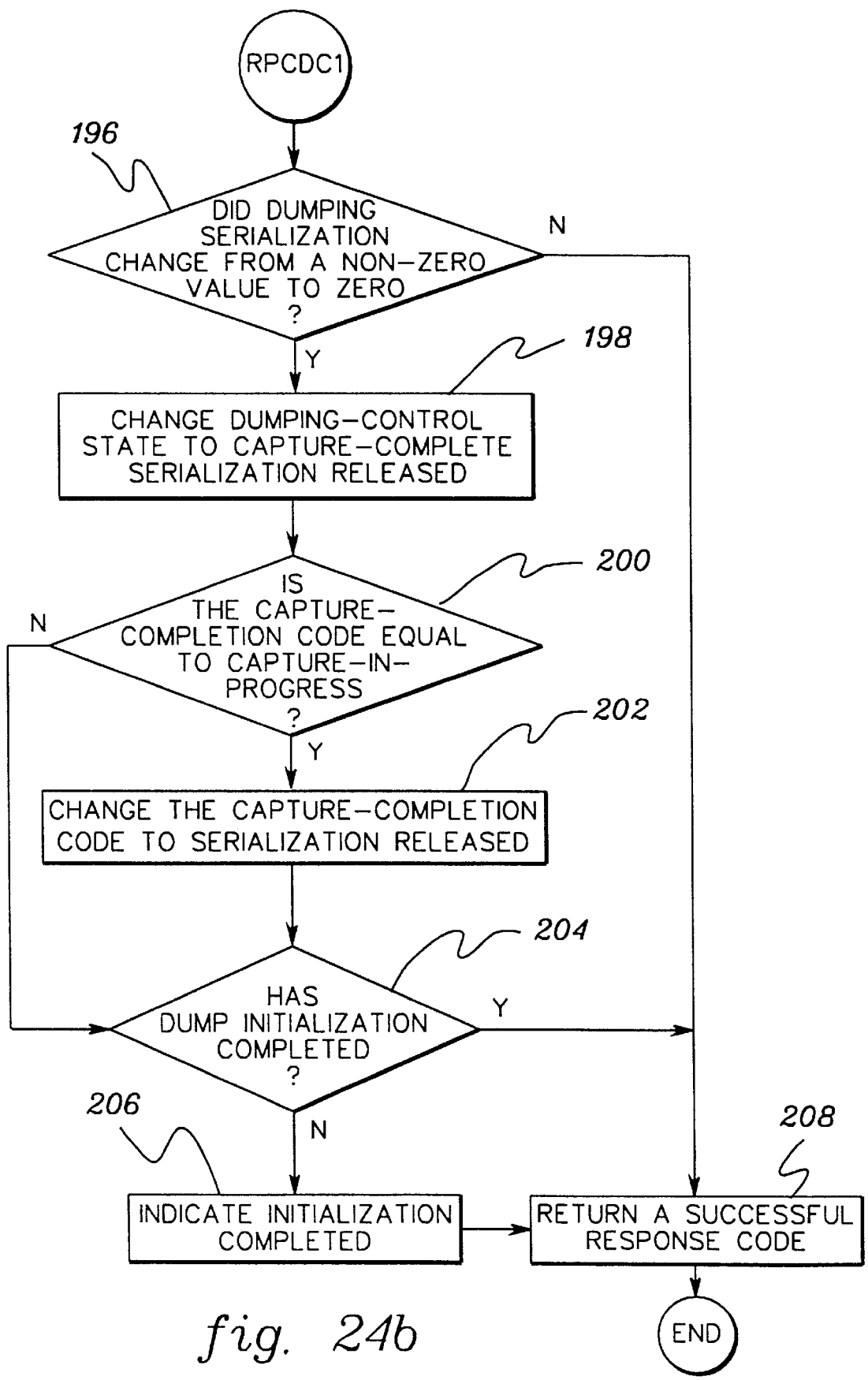

Referring to FIGS. 24a–24b, regarding the replace dumping controls command at the coupling facility, initially, the dumping-authority control is tested, INQUIRY 184 "IS DUMPING-AUTHORITY CONTROL EQUAL 0 OR NOT EQUAL TO THE CDAU OPERAND?" Should the dumping-authority control (see FIG. 16) be zero or if the dumping-authority control does not match the value of the CDAU operand (see FIG. 13), the command is complete and the value of the dumping authority is placed in the DAU response operand. The DAU operand and an exception response are returned, STEP 186 "RETURN EXCEPTION RESPONSE CODE AND DAU OPERAND."

When the value of the dumping-authority control is equal to the value of the CDAU operand and is not equal to zero, the dumping-serialization control is tested, INQUIRY 188 "IS DUMPING SERIALIZATION CONTROL EQUAL 0 AND IS THE DS REQUEST OPERAND NOT ZERO?" If the dumping serialization control is zero or the DS request operand is zero, the CDS operand is tested to determine if the dumping serialization control is equal to the CDS operand, INQUIRY 190 "IS DUMPING SERIALIZATION CONTROL EQUAL TO CDS OPERAND?" If the dumping serialization control does not match the value of the CDS operand or the dump serialization control is equal zero and the DS request operand is not equal to zero, the dumping-serialization control is placed in the DS response operand and the DS operand and an exception response are returned, STEP 192 "RETURN EXCEPTION RESPONSE CODE AND DS OPERAND."

Otherwise the value of the DS operand is placed in the dumping-serialization control, the value of the DAU operand is placed in the dumping-authority control, the value of the DINF operand is placed in the dumping-information control and the dumping-control state is updated, STEP 194.

When the dumping-serialization control is changed from a non-zero value to zero, INQUIRY 196 (FIG. 24b) "DID DUMPING SERIALIZATION CHANGE FROM A NON-ZERO VALUE TO ZERO?", the dumping-control state changes to capture complete serialization released, STEP 198 "CHANGE DUMPING-CONTROL STATE TO CAPTURE-COMPLETE SERIALIZATION RELEASED." Thereafter, a determination is made as to whether the capture completion code is equal to capture in progress, INQUIRY 200. If the capture-completion code contains a value equal to capture in progress, its value is changed to serialization released, STEP 202 "CHANGE THE CAPTURE-COMPLETION CODE TO SERIALIZATION RELEASED."

Subsequent to changing the capture-completion code or if the capture completion code is not equal to capture in progress, a determination is made as to whether dump initialization is complete, INQUIRY 204 "HAS DUMP INITIALIZATION COMPLETED?" If dump initialization has not completed, the initialization-complete indicator (ICI) is set to one, STEP 206 "INDICATE INITIALIZATION COMPLETE." After the ICI is set or if the answer to INQUIRY 204 is affirmative, a successful response code is returned, STEP 208 "RETURN A SUCCESSFUL RESPONSE CODE."

Returning to INQUIRY 196, when the dumping-serialization control has not changed from a non-zero value to zero, the dumping-control state and the capture-completion code remain unchanged and a successful response code is returned, STEP 208. Changes in the dumping status are made visible in the dump header.

Referring back to FIG. 20a, subsequent to setting the timer routine or if the ACCESSTIME limit is overridden and is unlimited, flow passes to STEP 216 and the dumping information values are set, STEP 216 "SET DUMPING INFORMATION VALUES." During this step, a dump authority block 218 (FIG. 25) is built in storage by the operating system. One embodiment of the components associated with dump authority block 218 is depicted in FIG. 25 and includes the following:

(a) A system identifier which includes the identification of the system processing the dump. The system identifier may be used at a later time to determine which operating system is responsible for the dump.

(b) A time stamp which represents the time that an associate dump table command, described below, was initiated or continued by another system.

(c) A dump version identifier, specifying the version number for this particular dump.

Returning to FIG. 20a, after setting the dumping information values, an associate dump table command is issued in which dump tables within the dump space are defined and associated with allocated structures, STEP 220 ASSOCIATE DUMP TABLE." In building the dump tables, dump authority block 218, associated request block 146, and dump tailoring options 144 are used. The associate dump table command is described in detail in co-pending U.S. patent application No. 08/073,909, entitled "A Dumping Service Facility For Multi-System Environments" assigned to International Business Machines Corporation and incorporated herein by reference in its entirety, as noted above. However, with reference to FIGS. 26a–26e, the associate dump table command will be described in detail.

Initially, the structure authority control (SAU) of cache-structure controls 69 (FIG. 4) or of the list structure controls 92 (FIG. 8) is tested to determine if it is equal to the CSAU operand located in the request/response operands of FIG. 13, INQUIRY 224 "DOES STRUCTURE AUTHORITY CONTROL EQUAL CSAU OPERAND?" When the structure authority control does not match the value of the CSAU operand, the command is completed, and the value of the structure authority is placed in the SAU response operand. The SAU operand and an exception response are returned, STEP 226 "RETURN EXCEPTION RESPONSE CODE AND SAU OPERAND." However, when the value of the structure authority control matches the value of the CSAU operand, the command is executed. Processing of the command depends on the value of the dumping-authority control and the availability of dumping space.

When the dumping authority control is zero, INQUIRY 228 "IS DUMPING AUTHORITY CONTROL EQUAL 0?", the total-dumping-space control is checked to see if it is equal to zero and a determination is made as to whether sufficient free dumping space exists to contain a dump header, INQUIRY 230 "IS TOTAL-DUMPING SPACE NON-ZERO AND DOES SUFFICIENT FREE DUMPING SPACE EXIST?"

When a dump is initiated and the total-dumping-space control is zero, the dumping controls are not updated and an exception response is returned, STEP 232 "RETURN EXCEPTION RESPONSE CODE." Further, when a dump is initiated and the total dumping-space control is non-zero, but insufficient free dumping space exists to contain the dump header, the dumping controls are not updated, and an exception response is returned, STEP 232 "RETURN EXCEPTION RESPONSE CODE."

When the total dumping space control (TDS) is non-zero and sufficient free dumping space exists, then a dump is initiated for the specified structure. Initiation of a dump for a structure involves, for instance, the following operations: The dumping objects, including dumping controls 140, dumping status 142, dump tailoring options 144 are initialized; the dump table size is computed; and the dumping controls are placed in the capture-in-progress state, STEP 234 "INITIALIZE DUMP OBJECTS."

In particular, the dumping serialization (DS), dumping information (DINF), and dumping authority (DAU) operands are set to the values in the DS, DINF, and RDAU request operands, respectively. The dumping controls for the structure being dumped are placed in the capture-in-progress state, and the count of associated dump tables (ADTC) is incremented. The dump-table size is determined from the valid set of objects specified in the associated request block. The structure type is set equal to the structure type. The initialization-complete indicator is initially set to zero. The dumping-status fields are initialized to zero. The dump-tailoring options are initialized to the values provided in the request operands and in the associated request block and the dump-local-cache-identifier object is initialized, if the structure type is a coupling facility (SES) cache. Commands that are executing when the dumping serialization is set are allowed to complete normally. However, commands that specify the structure are prevented from executing.

The set of input ranges is processed in the order they appear in the data block, STEP 236 (FIG. 26*b*) "PROCESS THE INPUT RANGES IN ORDER STARTING WITH DOT1, AII1, DEI1, RI1, SR1 AND ER1." The object identified by SR1 and the dump object type is placed first on the list of objects to be processed by the capture command. Processing of the list ranges in the associated request block should complete within the model-dependent time period, INQUIRY 238 "HAS A TIME-OUT CONDITION OCCURRED?" If, during processing of the first object, a time-out has not occurred, processing continues, as described below.

Figure 26A:
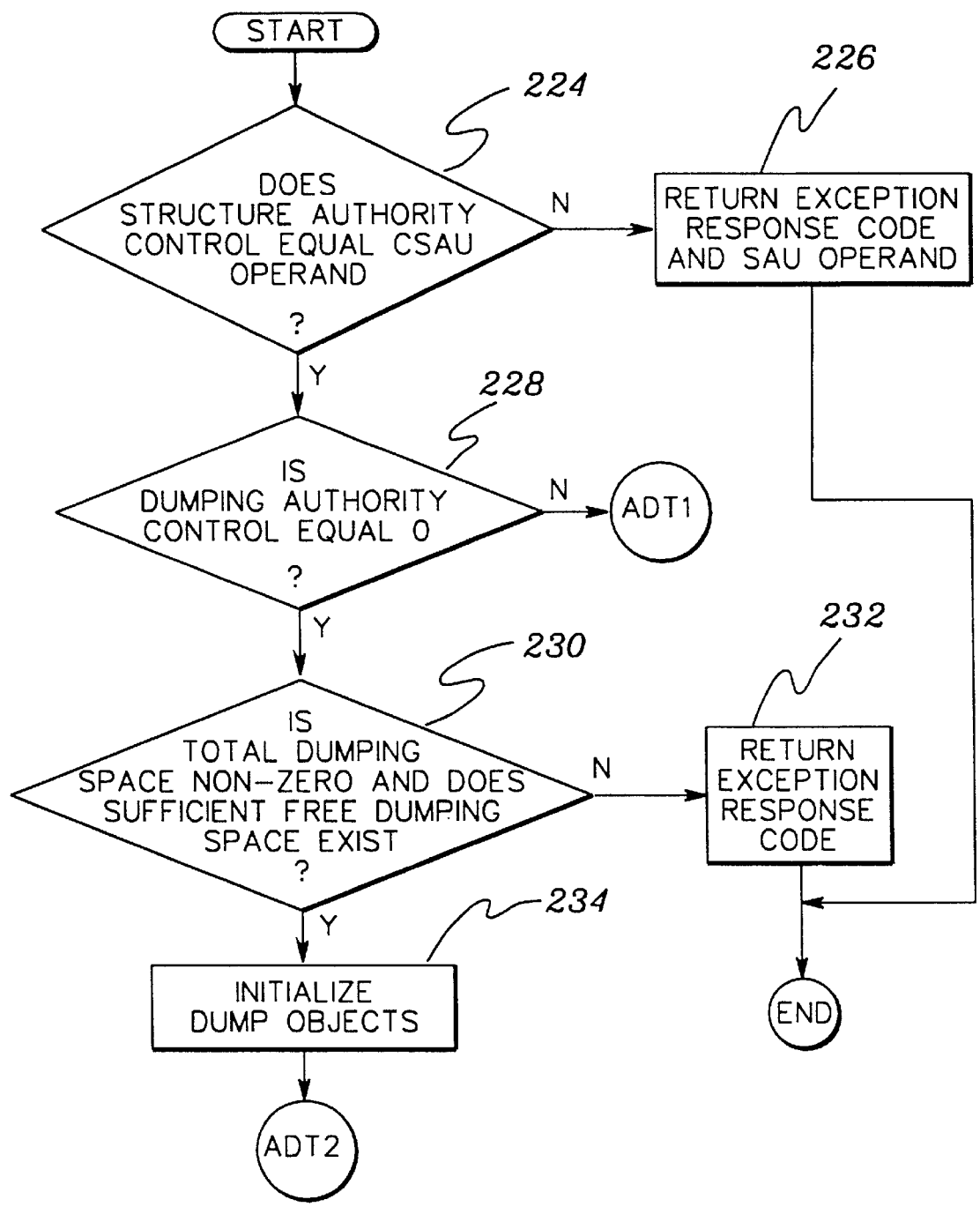
FIGS. 26a–26e illustrate one embodiment of the logic associated with an associate dump table command, in accordance with the principles of the present invention.
Figure 26B:
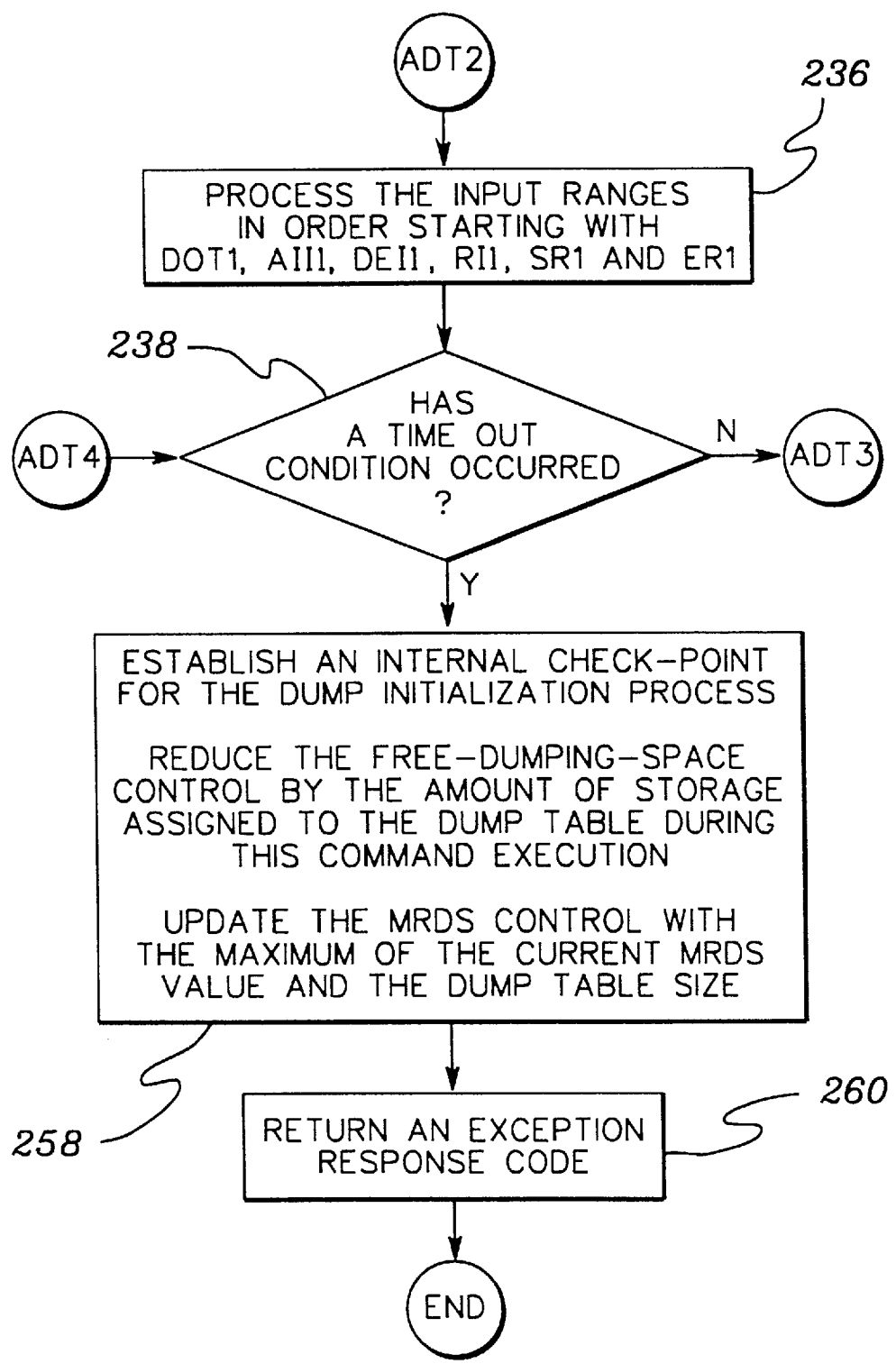
Figure 26C:
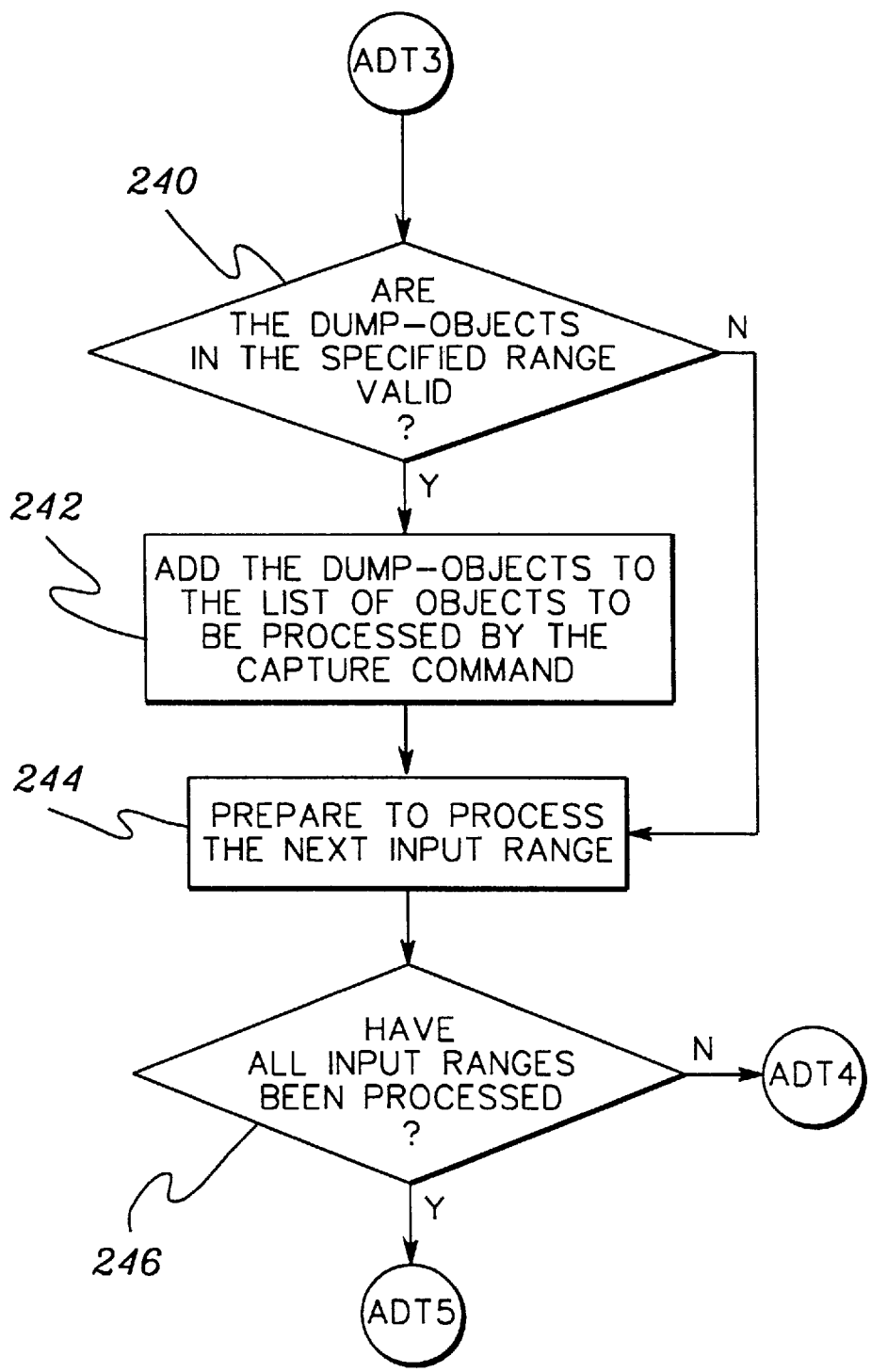
Figure 26D:
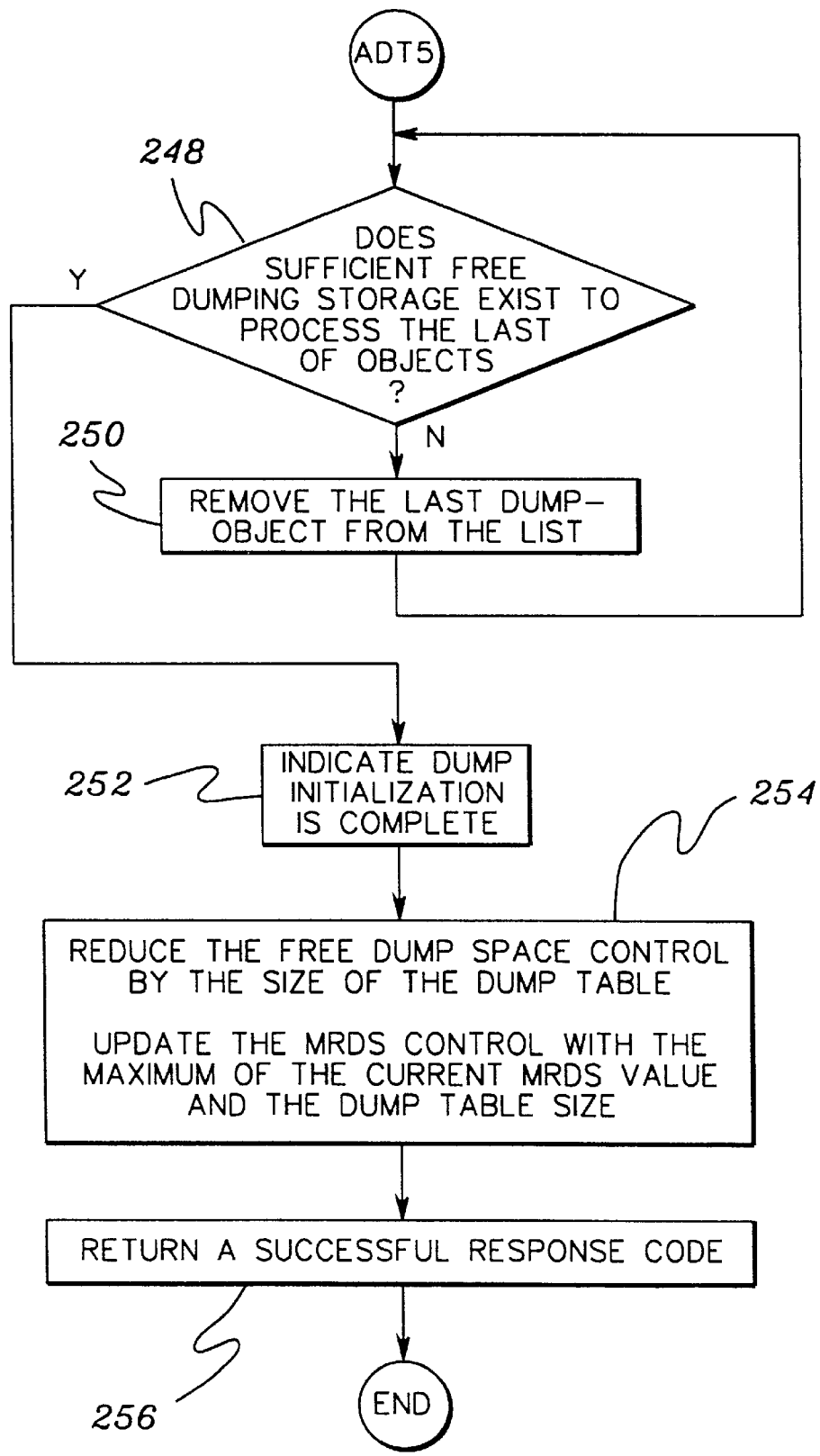
Figure 26E:
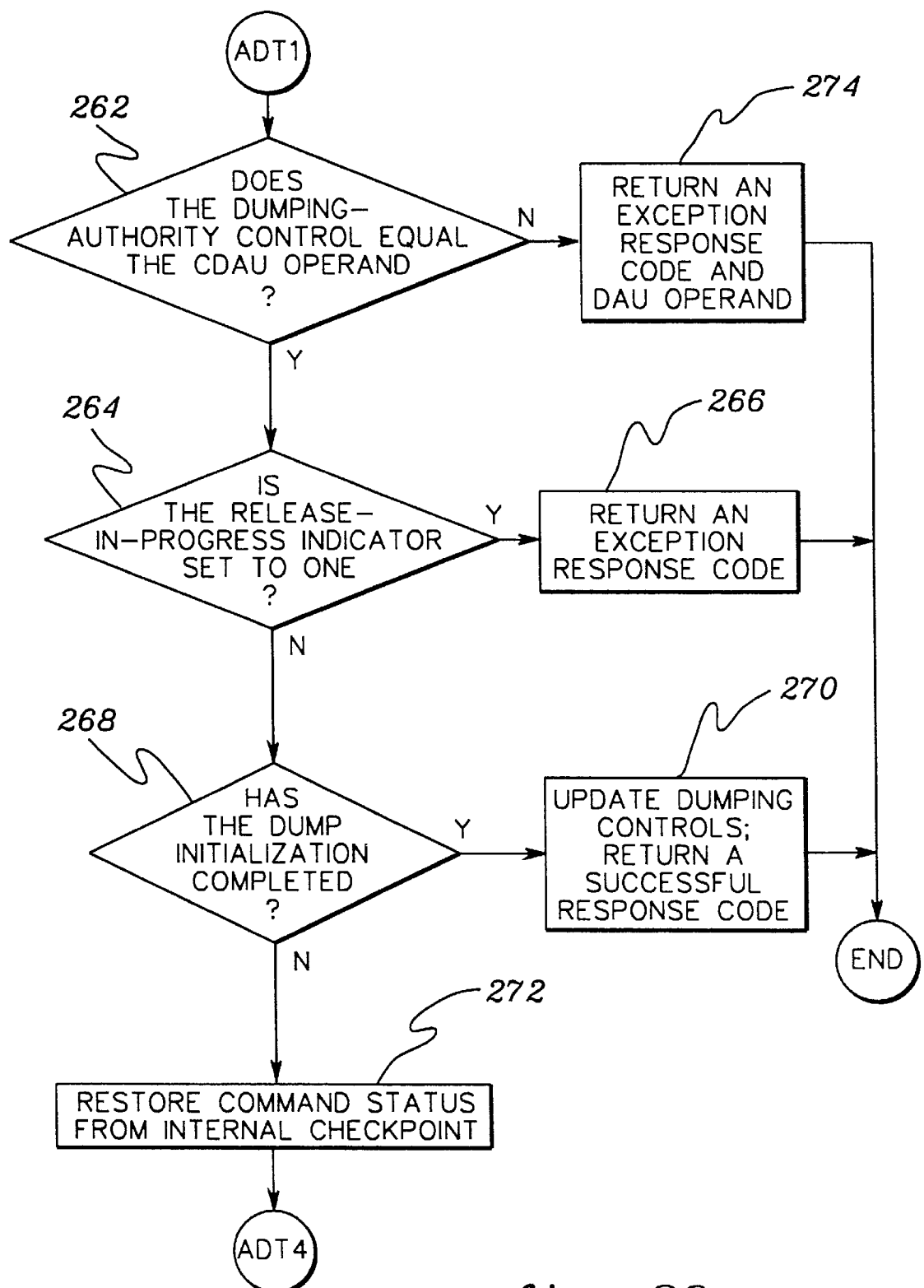

A determination is made as to whether the specified dump-objects are valid, INQUIRY 240 (FIG. 26*c*) "ARE THE DUMP-OBJECTS IN THE SPECIFIED RANGE VALID?" Should the objects be valid, then they are added to the list of objects to be processed by the capture command, STEP 242 "ADD THE DUMP-OBJECTS TO THE LIST OF OBJECTS TO BE PROCESSED BY THE CAPTURE COMMAND." Subsequent to adding the objects to the list or if the dump-objects are invalid, the next input range to be processed is prepared, STEP 244 "PREPARE TO PROCESS THE NEXT INPUT RANGE." The object identified by SR1+1 and the dump object type is the next object to be processed. List processing continues until all valid objects are identified, INQUIRY 246 "HAVE ALL INPUT RANGES BEEN PROCESSED?" If all of the input ranges have not been processed, then flow returns to INQUIRY 238 (FIG. 26*b*). Otherwise, processing continues, as described below.

Any objects identified outside of the range of allocated objects for the structure are ignored. Also ignored are any objects with a valid dumping-object type that is not present in the structure. In this way the specified list of objects to be captured is systematically created to conform to the structure attributes.

When the dumping-object type specifies a lock table or user controls for a SES list or local cache controls for a SES cache, the start-of-range and end-of-range operands are ignored. A subset of the lock table, user controls, or local cache controls cannot be specified in the dump. Each object to be dumped requires an amount of storage that contains the dump header for the object and, optionally, a dumping information block (DIB) for each element that exists in the structure object. A DIB is provided for each element in the object when the DIB exclusion indicator (DEI) request operand is set to zero. otherwise, dumping information blocks are excluded. When the adjunct-inclusion indicator (AII) is set to one, the DIB-exclusion indicator (DEI)is set to zero and the object contains adjunct data, then adjunct data is included in the DIB.

The request size of the dump table is the total of the storage required for the dump header, the sum of the storage required for each object header, and the sum of the storage amounts required for each DIB, provided dumping-information blocks are included. When insufficient free dumping storage exists to contain the dump table, INQUIRY 248 "DOES SUFFICIENT FREE DUMPING STORAGE EXIST TO PROCESS THE LAST OF OBJECTS?", the list of objects is reduced by removing objects from the bottom of the list until a maximal list is determined that can be contained in the dumping storage, STEP 250 "REMOVE THE LAST DUMP-OBJECT FROM THE LIST." The last object may be partially dumped. The reduced list determines the actual size of the dump table.

When processing is complete within the time period allowed by the model and sufficient free dumping storage exists, as defined above, the dump-initialization process is complete, STEP 252 "INDICATE DUMP INITIALIZATION IS COMPLETE." In particular, the initialization-complete indicator is set to one, the free-dumping-space control is reduced by the size of the dump table, the maximum-requested-dumping-space (MRDS) control is updated to the value of the maximum of the current value of the MRDS control and the dump-table size, STEP 254 and a successful response is returned, STEP 256 "RETURN A SUCCESSFUL RESPONSE CODE."

Otherwise, if a time-out has occurred, INQUIRY 238 (FIG. 26*b*), an internal checkpoint is established for the dump-initialization process, the free-dumping-space control is reduced by the current size of the dump table during this command execution, the maximum-requested-dumping space (MRDS) control is updated with the maximum of the current value of the MRDS control and the dump-table size, STEP 258, and an exception response is returned, STEP 260 "RETURN AN EXCEPTION RESPONSE CODE."

Referring back to FIG. 26*a* and, in particular INQUIRY 228, when dumping authority control is not equal to zero, a comparison is made between the dumping authority control and the comparative dumping authority control, INQUIRY 262 (FIG. 26*e*) "DOES THE DUMPING-AUTHORITY CONTROL EQUAL THE CDAU OPERAND?" When the comparative-dumping authority matches the value of the dumping authority control and the release-in-progress indicator is one, INQUIRY 264 "IS THE RELEASE-IN-PROGRESS INDICATOR SET TO ONE?", the command is completed and an exception response is returned, STEP 266 "RETURN AN EXCEPTION RESPONSE CODE."

When the comparative-dumping authority matches the value of the dumping-authority control and the release-in-progress indicator is not set to one, a determination is made as to whether dump initialization is complete, INQUIRY 268 "HAS THE DUMP INITIALIZATION COMPLETED?"

When the dump initialization process is complete, the initialization-complete indicator is set to one, the free-dumping-space control is reduced by the amount of additional storage assigned to the dump table, the maximum-requested-dumping-space (MRDS) control is updated to the value of the maximum of the current value of the MRDS control and the dump-table size, and a successful response is returned, STEP 270 "UPDATE DUMPING CONTROLS; RETURN A SUCCESSFUL RESPONSE CODE."

When the dump-initialization process has not yet been completed, processing is resumed from the internal checkpoint, STEP 272 "RESTORE COMMAND STATUS FROM INTERNAL CHECKPOINT," and continued for a model-dependent time period or until dump initialization is completed, INQUIRY 238 (FIG. 26b).

Returning to INQUIRY 262 (FIG. 26e), when the dumping-authority comparison fails, the dumping authority is placed in the DAU response operand and an exception response is returned, STEP 274 "RETURN AN EXCEPTION RESPONSE CODE AND DAU OPERAND."

Referring back to FIG. 20a, since the associate dump table command may time-out before it completes, it is issued iteratively until completion, INQUIRY 280 "COMPLETE OR TIME-OUT?" Should the associate dump table command time-out, the associate dump table command is reissued, STEP 220 "ASSOCIATE DUMP TABLE."

When the associate dump table command completes, a dump table has been created for the structure and the structure is serialized. In particular, the first associate dump table command serializes the dumping structure such that mainline commands cannot receive access to the structure. Structure serialization is held while capture dump data commands, described below, are being issued. In accordance with the principles of the present invention and as described in detail below, requests to access the structure are put on a deferred queue until dumping serialization is released.

In addition to the above, SVC dump issues a request to asynchronously update a function data set to reflect that a dump is in progress for this structure, STEP 282 "ASYNCHRONOUSLY UPDATE POLICY INDICATING DUMP IN PROGRESS." The function data set is on DASD and contains the active policy information. In particular, the function data set includes the dump version, which is used by the operator, to identify the structure dump table.

Subsequently, a capture dump data command is issued by SVC dump, STEP 284 "CAPTURE DUMP DATA." The capture dump data command is described in detail in the above-referenced co-pending patent application entitled, "A Dumping Service Facility for Multi-System Environments", U.S. patent application Ser. No. 08/073,909, which is incorporated herein by reference in its entirety, as noted above. The capture dump data command is used to initiate the capture of the requested information and is described below with reference to FIGS. 27a–27e.

Initially, the dumping-authority control is tested, INQUIRY 290 "IS DUMPING-AUTHORITY CONTROL EQUAL 0 OR NOT EQUAL TO CDAU OPERAND?" When the dumping-authority control is zero or does not match the value of the CDAU operand, the command is completed and the value of the dumping authority is placed in the DAU response operand. The DAU operand and an exception response are returned, STEP 292 "RETURN EXCEPTION RESPONSE CODE AND DAU OPERAND."

However, when the value of the dumping-authority control is equal to the value of the CDAU operand and not equal to zero, the dumping-serialization control is tested, INQUIRY 294 "IS DUMPING-SERIALIZATION CONTROL NOT EQUAL TO THE CDS OPERAND AND NOT ZERO?" If the dumping serialization control does not match the value of the CDS request operand and it is not zero, the command is completed and the value of the dumping-serialization control is placed in the DS response operand. The DS operand and exception response are returned, STEP 296 "RETURN EXCEPTION RESPONSE CODE AND DS OPERAND."

When the dumping-authority and dumping-serialization tests are successful, a test of the dump initialization complete indicator is performed, INQUIRY 298 "HAS DUMP INITIALIZATION COMPLETED?" Should the initialization-complete indicator be zero specifying that initialization is in progress, the command is completed and an exception response is returned, STEP 300 "RETURN EXCEPTION RESPONSE CODE." On the other hand, if dump initialization is complete, the release-in-progress indicator is tested, INQUIRY 302 "IS THE RELEASE-IN-PROGRESS INDICATOR SET?" When the release-in-progress indicator is one, the dump table is being released. Therefore, the command is completed, and an exception response is returned, STEP 300 "RETURN EXCEPTION RESPONSE CODE."

When the release-in-progress indicator is zero, the capture-completion code is tested, INQUIRY 304 "IS THE CAPTURE COMPLETION CODE EQUAL 0?" Should the capture completion code contain a non-zero value, the command is completed and the capture-completion code (CAPCC) and successful response are returned, STEP 306 "RETURN SUCCESSFUL RESPONSE CODE AND CAPCC OPERAND." When the capture completion code is zero, indicating capture in progress, a capturing operation is processed.

Capturing begins at the structure object located by loading the capturing restart token (CRT) from dumping status 142, STEP 308 (FIG. 27b) "RESTORE THE CAPTURING RESTART TOKEN." When the capturing restart token is zero, INQUIRY 310 "IS THE CAPTURING RESTART TOKEN EQUAL 0?", the capturing operation is delayed until all commands executing against the structure have completed, STEP 312 "QUIESCE ACTIVE COMMANDS". After all of the commands have been quiesced, the initial phase of capturing begins. This consists of creating dump header 132, which, as described above, contains structure controls 138, dumping controls 140, dumping status 142, dump-tailoring options 144 and associated request block 146, STEP 314 "CREATE A DUMP HEADER."

Subsequent to creating a dump header or if the capturing restart token is not equal to zero, a determination is made as to whether a time-out condition has occurred, INQUIRY 316 "HAS A TIME-OUT CONDITION OCCURRED?" If a model-dependent time-out has not occurred, then a determination is made as to whether the dump table is full, INQUIRY 318 "IS DUMP TABLE FULL?" If the dump table is not full, then a decision is made as to whether an object header has been created for the object identified by the capturing restart token, INQUIRY 320 "HAS AN OBJECT HEADER BEEN CREATED FOR THE OBJECT IDENTIFIED BY THE CAPTURING RESTART TOKEN?"

If an object header has not previously been created, then one is created, STEP 322 "CREATE AN OBJECT HEADER FOR THE OBJECT IDENTIFIED BY THE CAPTURING RESTART TOKEN." The capturing of an object starts with the creation of the object header. The object header contains fields that describe the attributes of the dumping object and contains the object controls. The size of the object header is, for example, 4 k bytes and is padded with zeros following the last control field. After the object header is created, flow passes to INQUIRY 316 (FIG. 27b) and processing continues, as described herein.

Returning to INQUIRY 320, when the object header has been created for the object identified by the capturing restart token, a determination is made as to whether all the DIBs have been created for the current object, INQUIRY 324 "HAVE ALL DIB(S) BEEN CREATED FOR THE CURRENT OBJECT?" If all of the DIBs have not been created, then a DIB for the next element in the structure object is created, STEP 326 "CREATE A DIB FOR THE NEXT ELEMENT IN THE STRUCTURE OBJECT." In particular, when the DEI control is zero, the capturing process for the object continues with the capturing of the list of dumping-information blocks (DIB). A DIB is created for each element in the structure object. The format of the dumping information block is determined by the dumping-object type. The elements are captured in object order. When the element contains adjunct data and the AII control is one, adjunct data is included in the DIB.

Figure 27A:
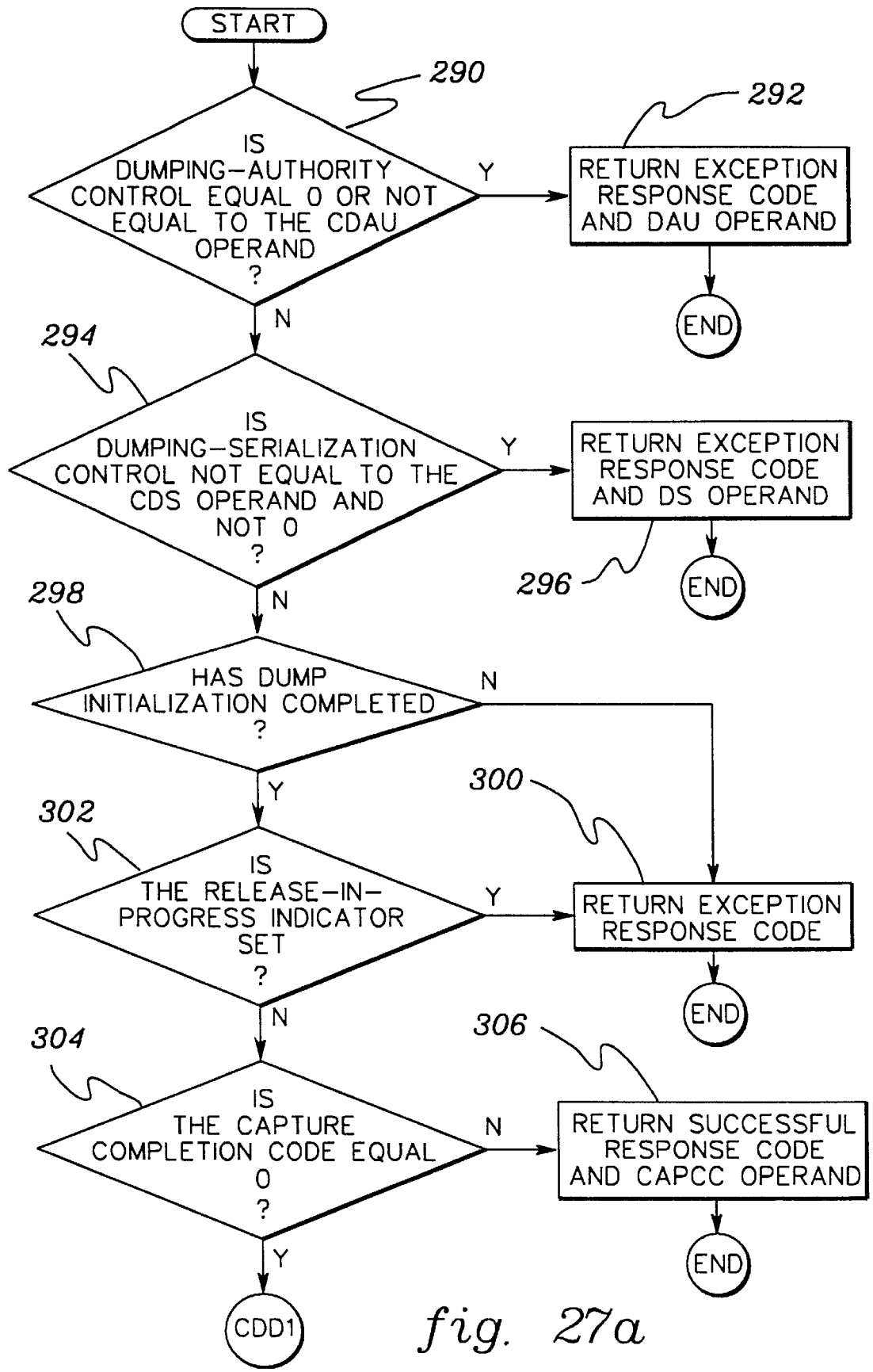
FIGS. 27a–27e illustrate one embodiment of the logic associated with a capture dump data command, in accordance with the principles of the present invention.
Figure 27B:
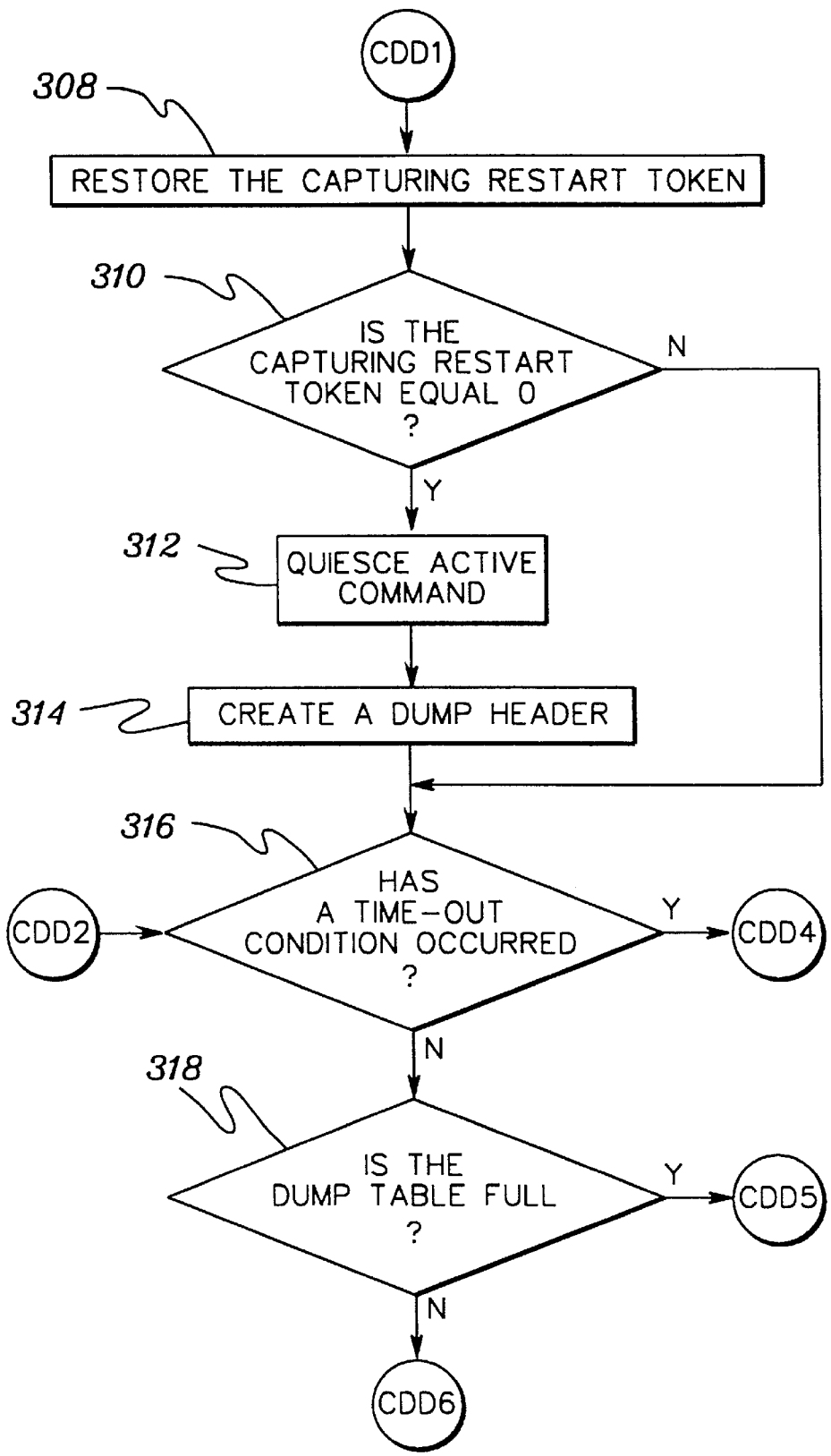
Figure 27C:
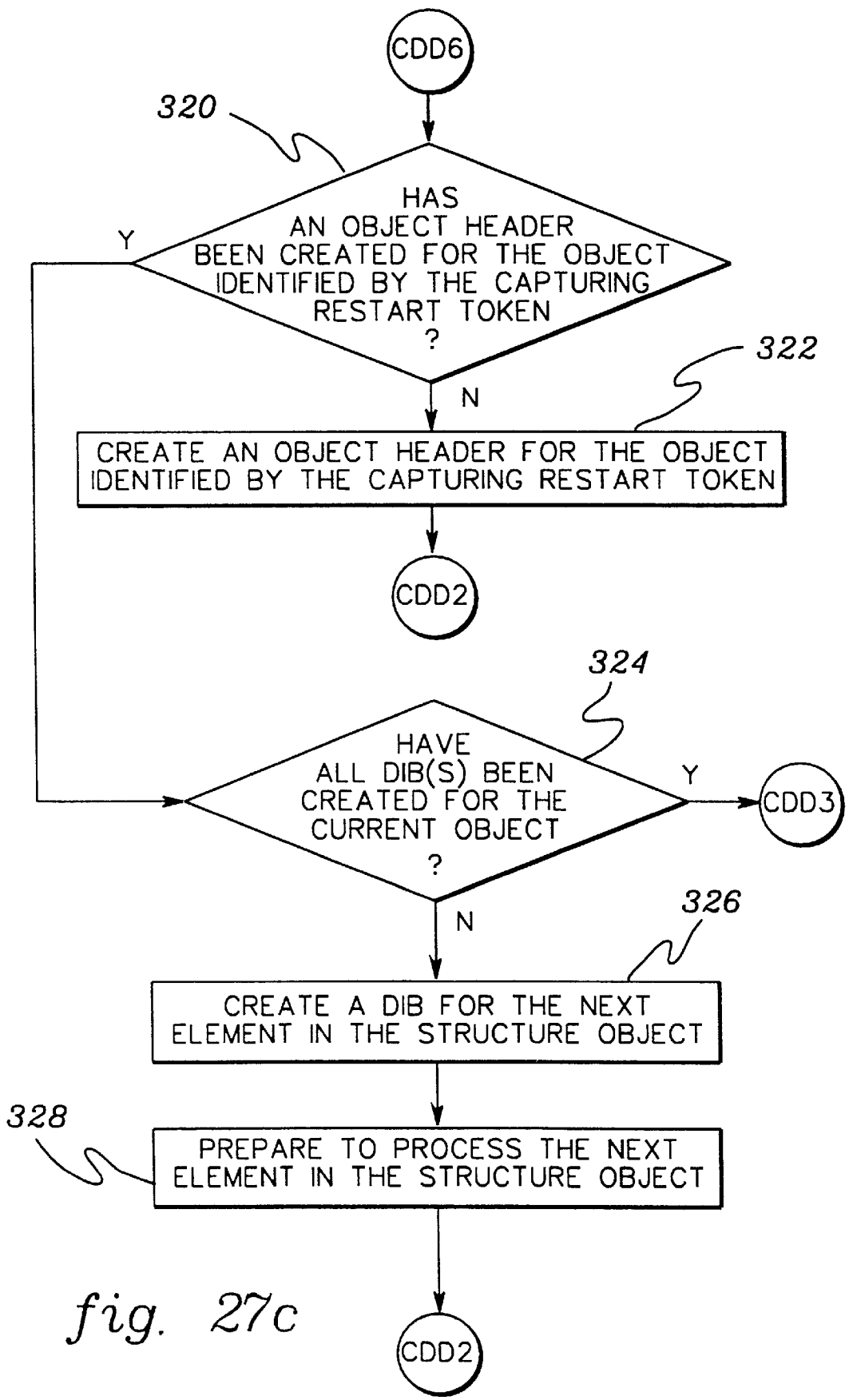

Subsequent to creating the DIB, the next element in the structure object is located in preparation of processing the next element, STEP 328 "PREPARE TO PROCESS THE NEXT ELEMENT IN THE STRUCTURE OBJECT" and flow passes to INQUIRY 316 (FIG. 27b).

Figure 27D:
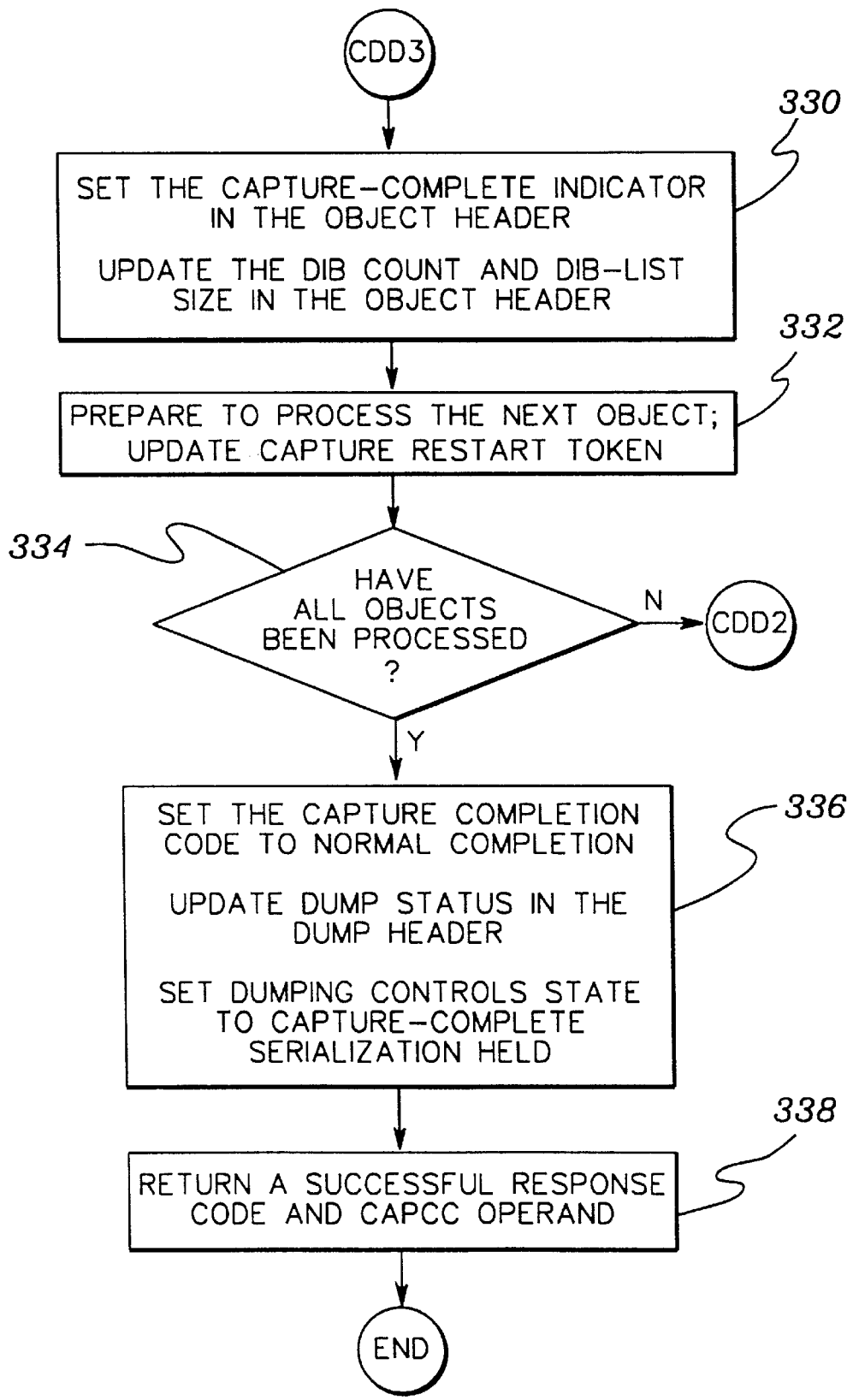

Returning to FIG. 27c and, in particular, INQUIRY 324, when all elements in the object have been added to the DIB list, the capture-complete indicator in the object header is set to one and the DIB count and DIB-list size are updated in the object header, STEP 330 (FIG. 27d). Thereafter, the next object is processed and the capture restart token is updated, STEP 332 "PREPARE TO PROCESS THE NEXT OBJECT; UPDATE CAPTURE RESTART TOKEN."

Subsequently, a determination is made as to whether all the objects have been processed, INQUIRY 334 "HAVE ALL OBJECTS BEEN PROCESSED?" This is determined by checking the capture-complete indicators for every valid object specified in the associated request block. When the indicators are all set to one, the capture process has reached normal completion. The capture-completion code is set to normal completion and the dump status is updated in the dump header. The state of the dumping controls is capture-complete serialization held. The capture-completion code and successful response are returned, STEPS 336, 338.

If all the objects have not been processed, INQUIRY 334, flow passes to INQUIRY 316 (FIG. 27b) and processing continues as described herein.

Figure 27E:
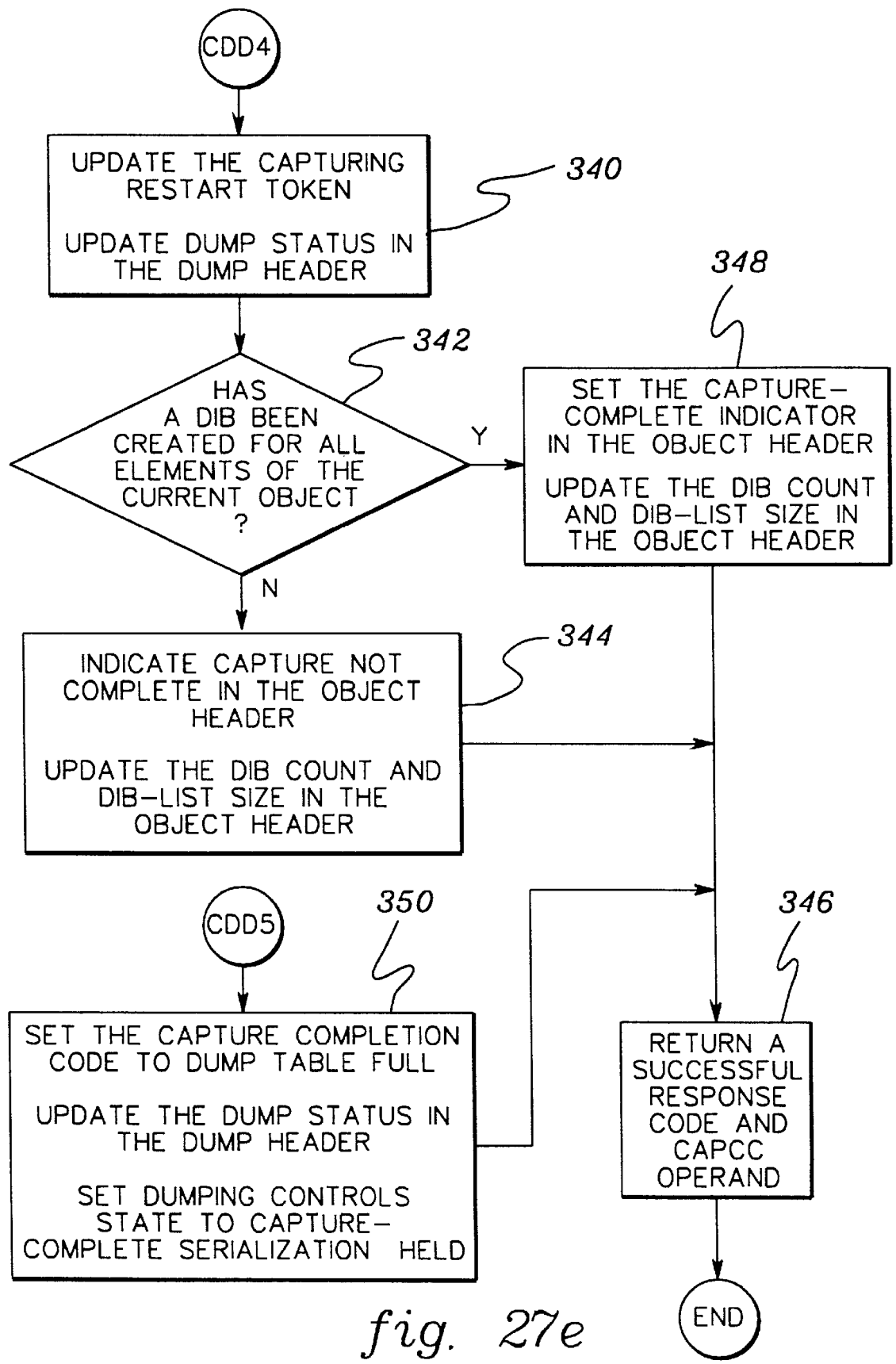

Returning to INQUIRY 316 (FIG. 27b), when a model-dependent time-out period has elapsed, the capturing restart token is updated to specify the next element in an object to be captured and the dumping status is updated in the dumping header, STEP 340 (FIG. 27e). If processing of a DIB list terminates prior to completing the capture of every element in the object, INQUIRY 342 "HAS A DIB BEEN CREATED FOR ALL ELEMENTS OF THE CURRENT OBJECT?", the capture-complete indicator in the object header is set to zero and the DIB count and DIB-list size are updated in the object header, STEP 344. The state of the dumping controls remains capture in progress. The capture-completion code and successful response are returned, STEP 346 "RETURN A SUCCESSFUL RESPONSE CODE AND CAPCC OPERAND." Further, when a DIB has been created for all elements of the current object, the capture-complete indicator is set to one and the DIB count and DIB-list size are updated, STEP 348. Thereafter, flow passes to STEP 346 and processing continues, as described above.

Returning back to INQUIRY 318 (FIG. 27b), when the last entry in the dump table is used and the capture process has not reached normal completion, the capture completion code is set to dump table full, the dump status is updated in the dump header, and the command is completed. The state of the dumping controls is capture-complete serialization held, STEP 350. The capture-completion code and successful response are returned, STEP 346.

When a lock table is captured, dumping-information blocks are included in the dump table for each non-zero lock-table entry. Zero-valued lock-table entries are not included in the dump table. Changes in the dumping status must be made visible in the dump header.

As with the associate dump table command, the capture dump data command may also time-out before capture is complete, and therefore, it is issued iteratively until capture is completed, INQUIRY 360 (FIG. 20a) "COMPLETE OR TIME-OUT?" As shown in FIG. 20a, if the capture dump data command times out, then flow passes back to STEP 284 and the capture dump data command is repeated once again, STEP 284 "CAPTURE DUMP DATA."

The captured data which is in the dump table after the capture dump data command completes includes, for instance:
1. Structure control data;
2. The user attached controls, if USERCNTLS, was specified;
3. List entry controls for all entries in the requested lists and directory information for all entries in the requested storage classes and cast-out classes. This information is excluded when the SUMMARY option is specified.
4. The adjunct data for each entry, if ADJUNCT=CAPTURE was specified;
5. For a coupling facility cache structure:
   a) Storage class control data for each requested storage class and cast-out class control data for each requested cast-out class; and
   b) The local cache index of the user requested by the specified CONTOKEN or CONNAME for each directory entry, if CONTOKEN or CONNAME was specified;
6. For a coupling facility list structure:
   a) List control data for each requested list;
   b) The list registry associated with each list; and
   c) The lock entries, if LOCKENTRIES was specified.

In one example, the entry data is not captured into the facility dump space, it is written directly to the dump data set later in SVC dump processing.

Figure 28:
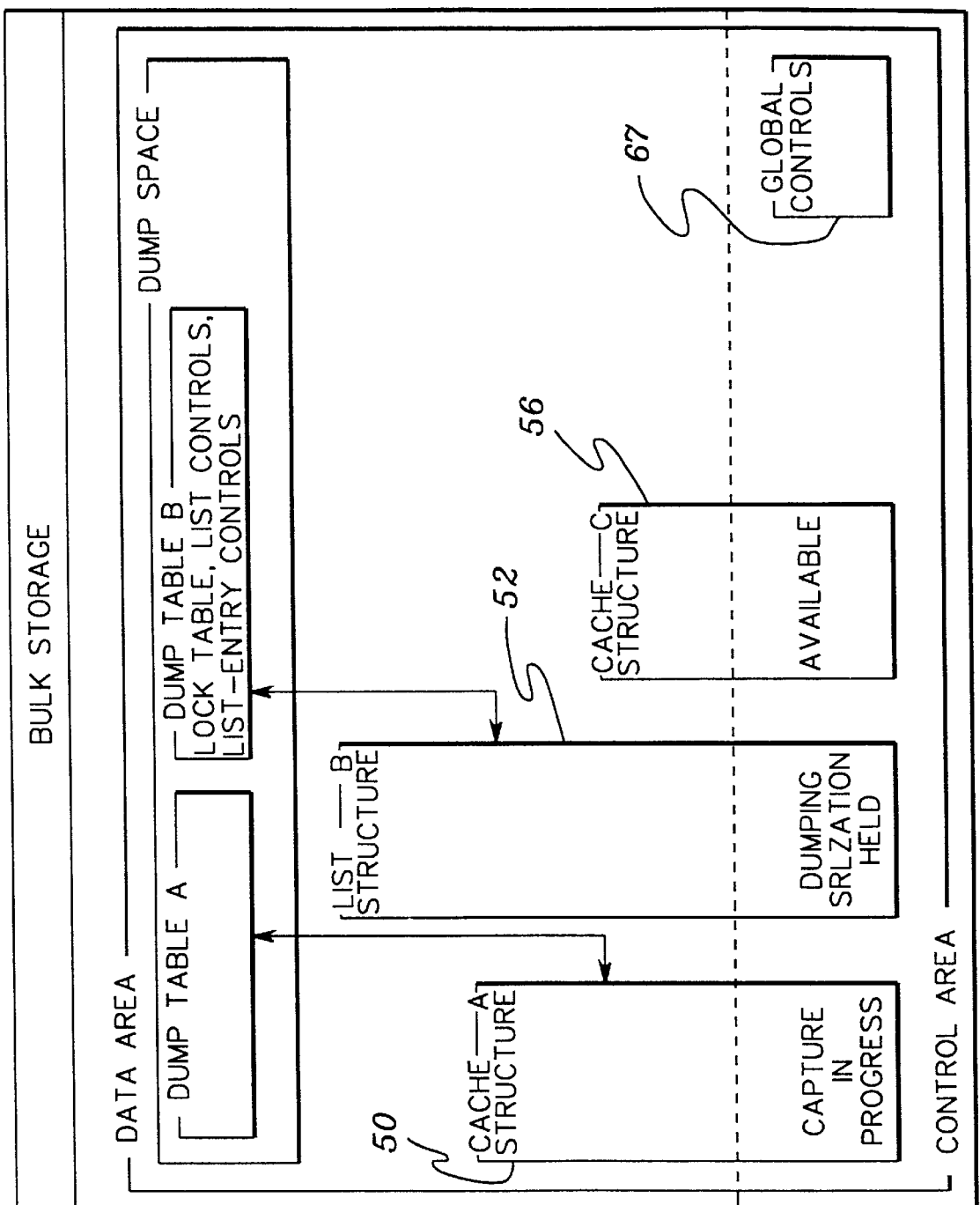
FIG. 28 depicts one example of a coupling facility structure in which dumping serialization is held, in accordance with the principles of the present invention.

Subsequent to completing the capture dump data command, a determination is made as to whether serialization is held and, if it is held, whether it should be released, INQUIRY 362 (FIG. 20b) "IS SERIALIZATION HELD AND SHOULD SERIALIZATION BE RELEASED?" One example of a structure having dump serialization held is depicted in FIG. 28. As shown in FIG. 28, List Structure B shows, in the control area, that dump serialization is held.

Figure 29:
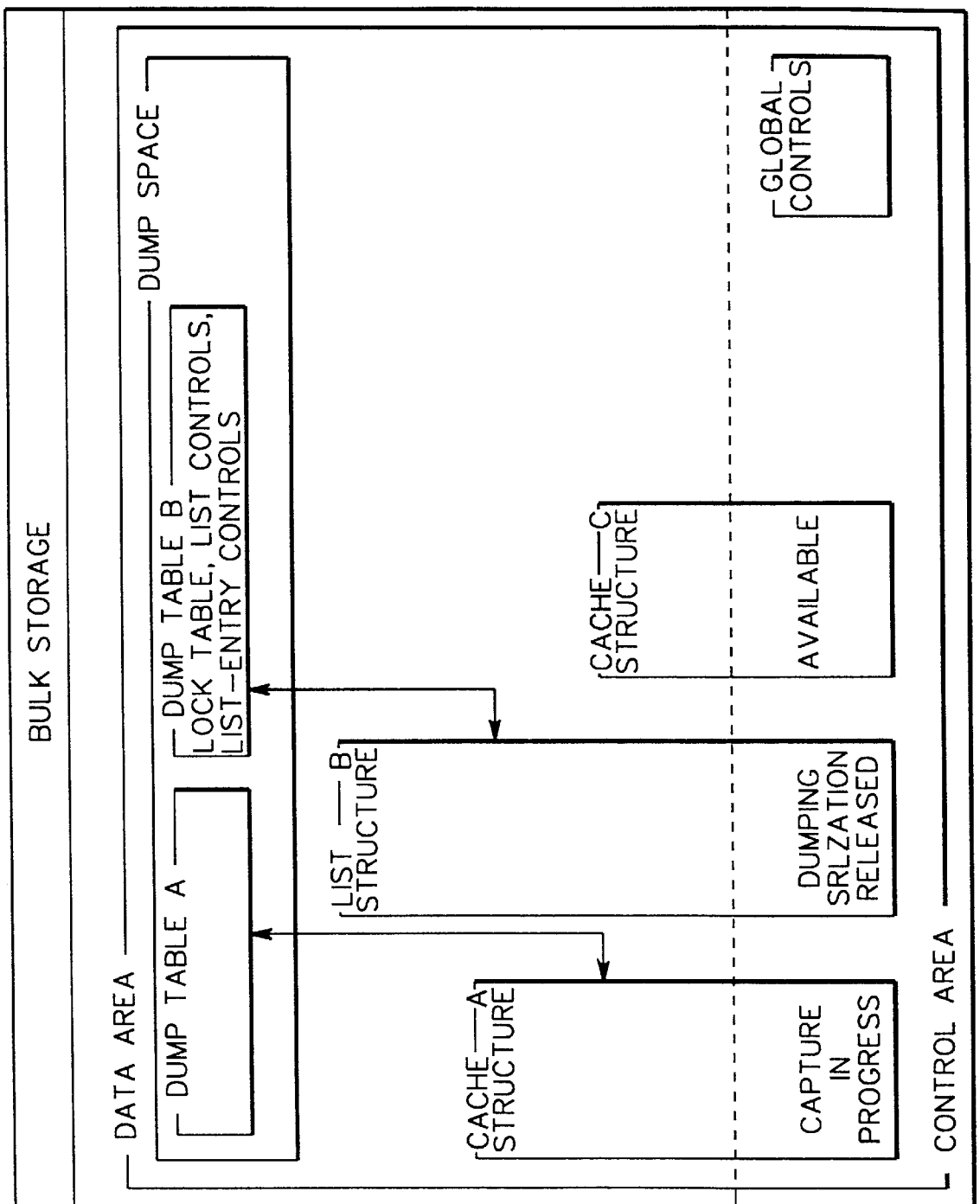
FIG. 29 depicts one example of a coupling facility structure in which dumping serialization is released, in accordance with the principles of the present invention.

Returning to FIG. 20b, if serialization is held and it should be released, the replace dumping controls command, which is described in detail above, is used, STEP 364 "REPLACE DUMP CONTROLS TO RELEASE SERIALIZATION." Once dumping serialization is released, mainline command execution may be performed against the structure in parallel with retrieving data from the associated dump table. FIG. 29 depicts List Structure B with dumping serialization released, as indicated in the control area.

Whenever SVC dump releases dumping structure serialization, it sends notification to the operating systems that serialization has been released, STEP 366 (FIG. 20b) "SEND NOTIFICATION THAT DUMPING SERIALIZATION HAS BEEN RELEASED." Users failing to connect to the structure because dumping structure serialization is held, may listen for this notification and reattempt to connect. MVS also uses this notification to determine when to re-drive commands against the structure, as described below. These commands may succeed now that serialization has been released.

Subsequent to sending notification that dumping serialization has been released, or if serialization was not held, a read captured block command is issued, STEP 368 "READ CAPTURED BLOCK." SVC dump uses the read captured block command to read the first two dump table entries into a buffer in virtual storage. These entries contain the dump pattern which is used to determine the characteristics of the remaining dump table entries to be read. The buffer containing the dump header is copied to an output buffer which is written to the dump data set.

The read captured block command returns the contents of the dump table to the program. Each execution of the read captured block command returns a 4 k dump table entry addressed by a program specified dump table entry number. (In another embodiment, each execution of the read captured block command returns one or more dump table entries.) Programming is responsible for manipulating the dump table entry number and passing it as input to the subsequent read captured block command to retrieve the next 4 k block from the dump table. A dump table entry number of zero indicates the first 4 k block in the dump table should be returned. The read captured block command is explained in detail with reference to FIG. 30.

Figure 30:
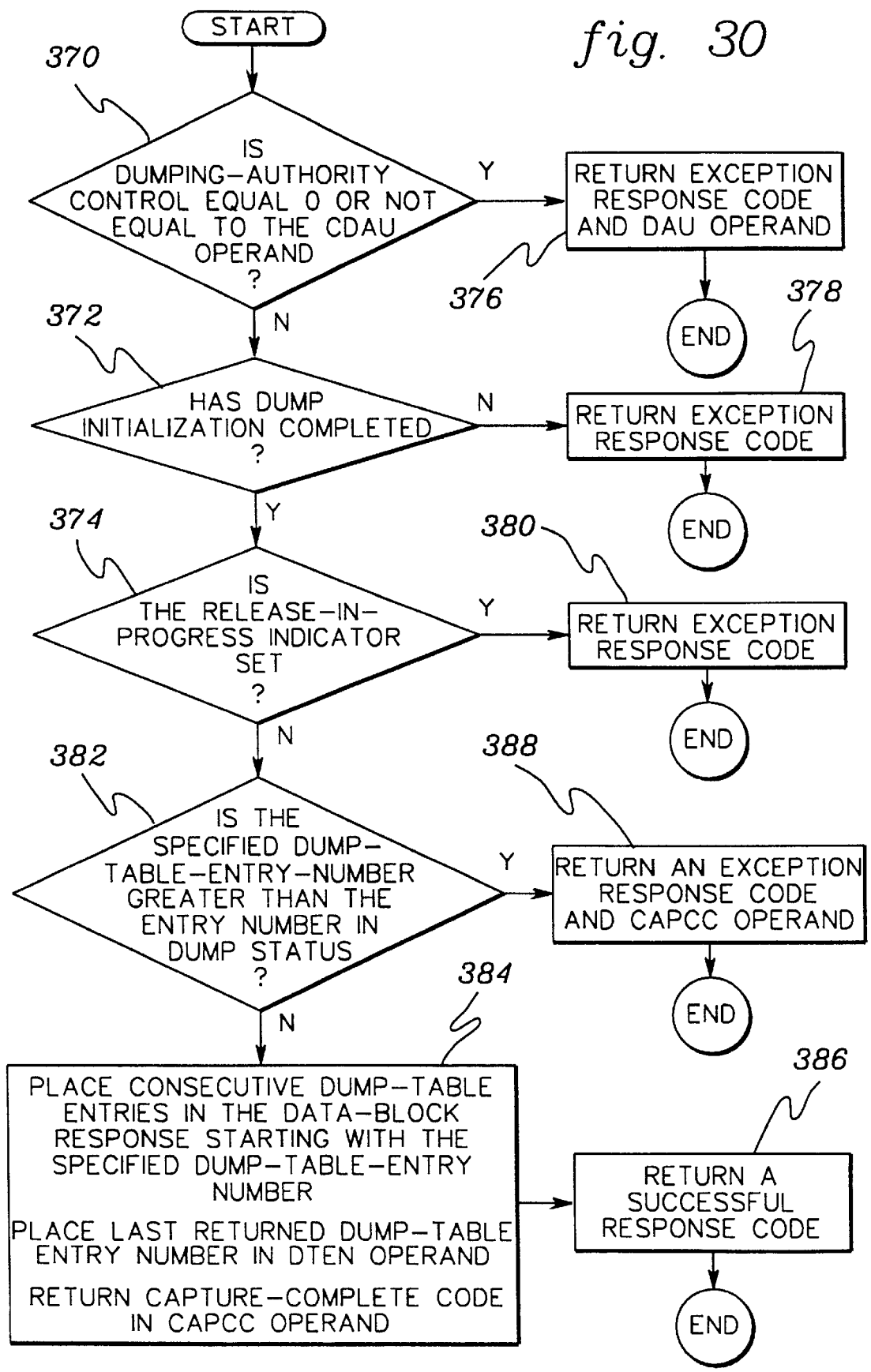
FIG. 30 depicts one embodiment of the logic associated with the read captured block command, in accordance with the principles of the present invention.

Referring to FIG. 30, the dumping-authority control, the initialization-complete indicator, and the release-in-progress indicator are tested, INQUIRIES 370, 372 and 374. When the dumping-authority control is zero or does not match the value of the CDAU operand, the command is completed and the value of the dumping authority is placed in the DAU response operand. An exception response and the DAU operand are returned, STEP 376 "RETURN EXCEPTION RESPONSE CODE AND DAU OPERAND."

When the value of the dumping authority control is non-zero and is equal to the value of the CDAU operand, and the initialization-complete indicator is zero, indicating dump initialization is incomplete, the command is completed and an exception response is returned, STEP 378 "RETURN EXCEPTION RESPONSE CODE."

However, when the value of the dumping authority control is non-zero and is equal to the value of the CDAU operand, dump initialization has completed and the release-in-progress indicator is one, the dump table is being released. Thus, the command is completed and an exception response is returned, STEP 380 "RETURN EXCEPTION RESPONSE CODE."

When the value of the dumping-authority is non-zero and is equal to the value of the CDAU operand, initialization is complete, and the release-in-progress indicator is not set, a test is made to determine if the specified dump-table-entry-number is greater than the entry number in dump status, INQUIRY 382. If the specified dump-table-entry number is less than or equal to the value of the last dump-table-entry number in the dumping status, consecutive dump-table entries starting with the specified dump-table entry are placed in the data-block response operand, the entry number of the last dump-table entry is placed in the DTEN response operand, the capture-completion code is placed in the CAPCC response operand, STEP 384, and a successful response is returned, STEP 386 "RETURN A SUCCESSFUL RESPONSE CODE."

However, when the dump-table-entry number specified by the DTEN request operand is larger than the last dump-table-entry number, the capture completion code is placed in the CAPCC response code, and an exception response is set, STEP 388 "RETURN AN EXCEPTION RESPONSE CODE AND CAPCC OPERAND." When this exception response is presented to the program and the DTEN operand is zero, no data has been captured. This may result if a read captured block command is processed before any capture dump data command is processed.

If there are more dump table entries, SVC dump issues a read captured block command to read the captured data into a buffer. The data that is returned is either an object header containing information about the following dumping information blocks (DIB's) or a DIB. The object header is copied to an output buffer and written to the dump data set. If a dumping information block is returned, SVC dump determines whether the entry data relating to the control entry represented by the DIB must be read, INQUIRY 390 (FIG. 20b) "IS THIS A DIB THAT HAS EDATA To BE READ?" This is determined by checking the associated request block 146 contained in dump header 132 that was read into virtual storage. The associated request block indicates whether entry data was requested for the entries in the object. If entry data was requested, a read dumping-object data command is issued to read the entry data into a buffer, STEP 392 "READ DATA."

The read dumping-object data command is described in co-pending U.S. patent application Ser. No. 08/073,909, which is incorporated by reference in its entirety, as noted above.

Figure 31A:
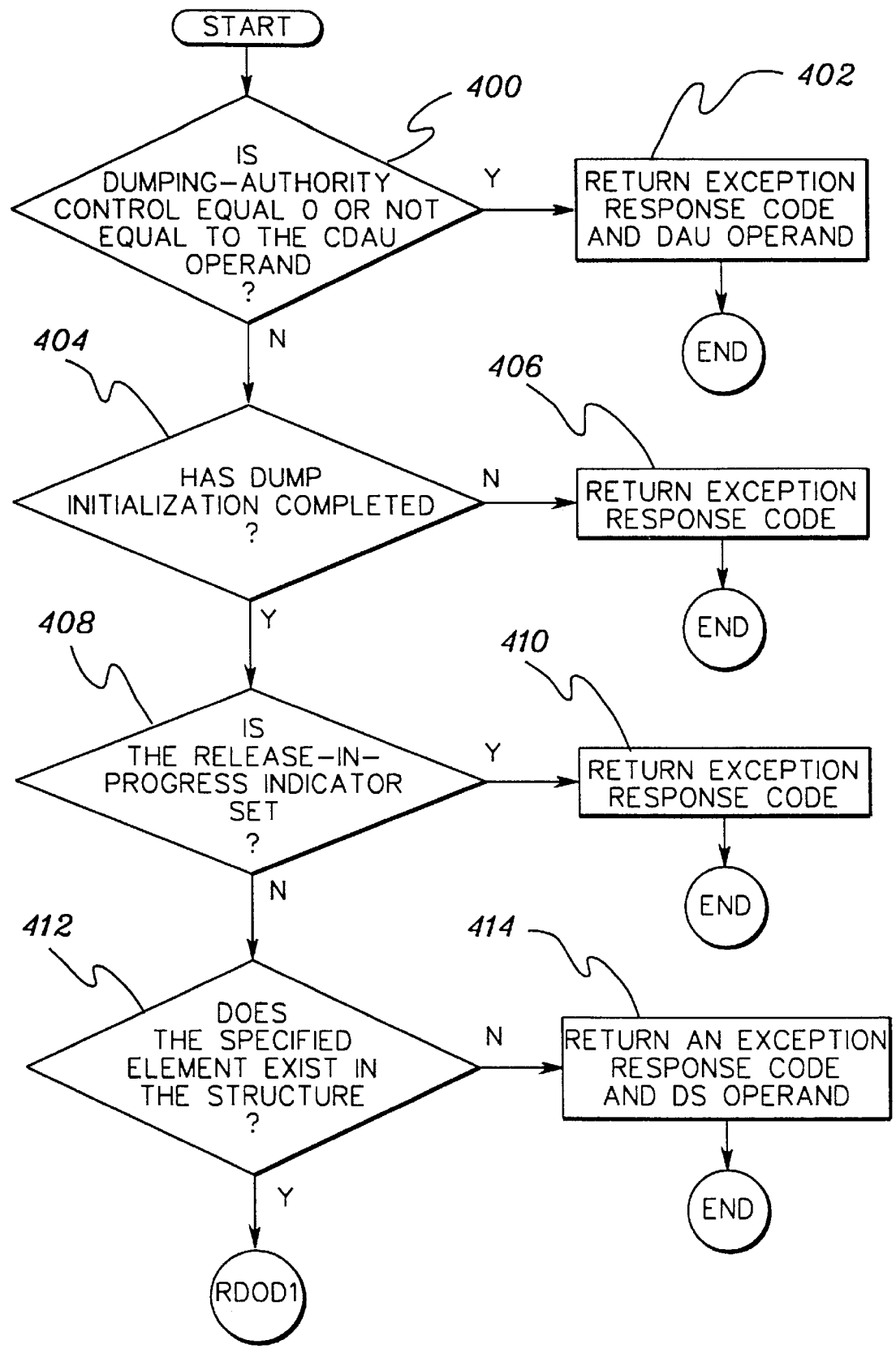
FIGS. 31a–31b depict one embodiment of the logic associated with a read dumping-object data command, in accordance with the principles of the present invention.
Figure 31B:
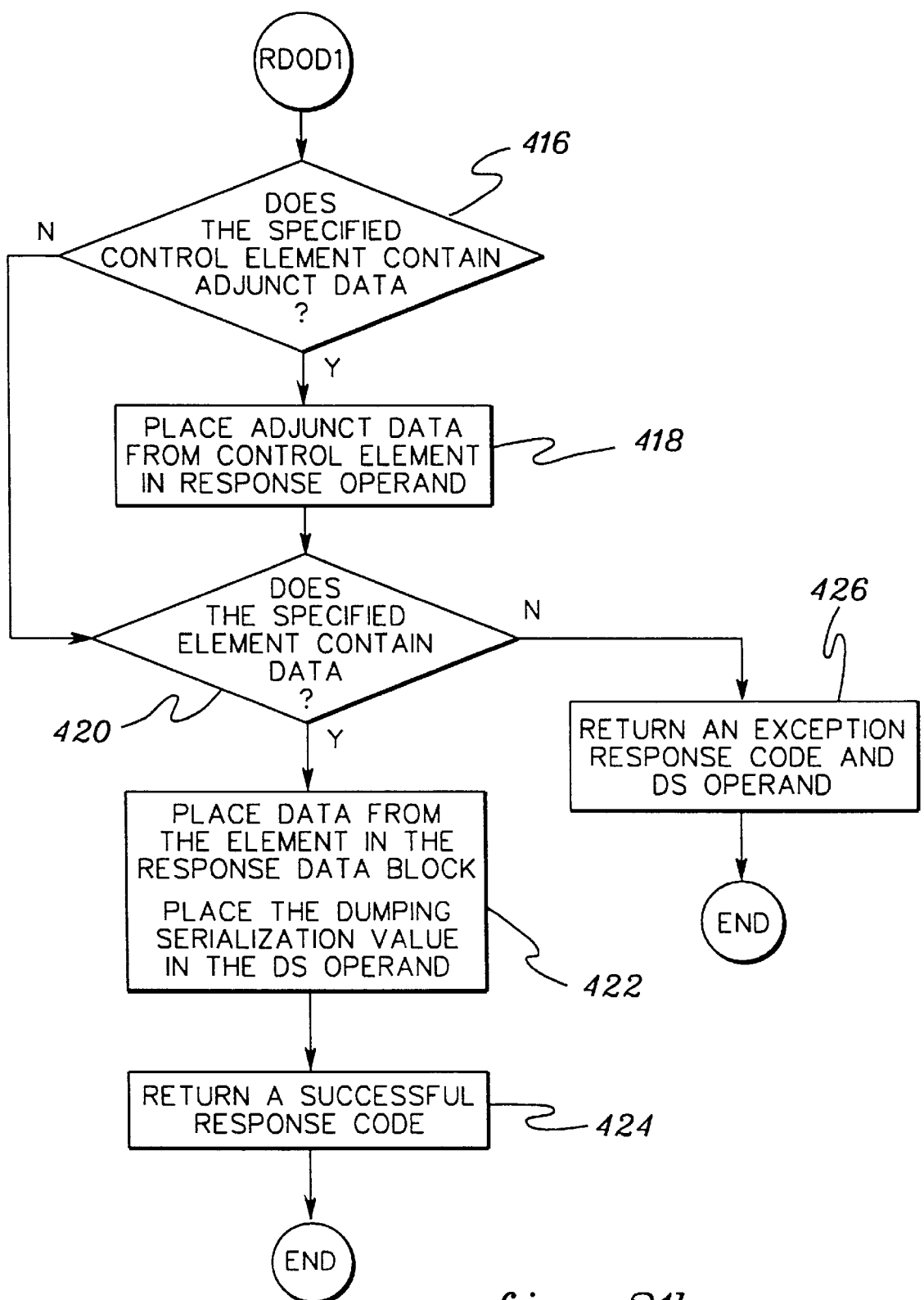

The read dumping-object data command is used to retrieve named data entries and optionally adjunct entries from the structure. The command does not access data in the dump table. This command may be executed either under dumping serialization or after dumping serialization is released, but must be executed against a structure with an in-use associated dump table. In other words, the state of the structure related dumping controls must be capture-in-progress, dumping-serialization-held or dumping-serialization-released. Unlike mainline commands against the structure, the read dumping-object data command does not alter any structure related controls, such as storage class queues or the contents of instrumentation counters. The read dumping-object data command is described in detail with reference to FIGS. 31a–31b.

Initially, the dumping-authority control is tested, INQUIRY 400 "IS DUMPING-AUTHORITY CONTROL EQUAL 0 OR NOT EQUAL TO THE CDAU OPERAND?" When the dumping-authority control is zero or does not match the value of the CDAU request operand, the command is completed and the value of the dumping authority is placed in the DAU response operand. The DAU operand and an exception response are returned to the program, STEP 402 "RETURN EXCEPTION RESPONSE CODE AND DAU OPERAND."

When the value of the dumping-authority control is non-zero and is equal to the value of the CDAU operand, the initialization-complete indicator is tested, INQUIRY 404 "HAS DUMP INITIALIZATION COMPLETED?" Should the initialization-complete indicator be zero, the command is completed and an exception response is returned, STEP 406 "RETURN EXCEPTION RESPONSE CODE."

However, if the dump initialization indicator is non-zero, indicating that dump initialization is complete, a determination is made as to whether the release-in-progress indicator is set, INQUIRY 408 "IS THE RELEASE-IN-PROGRESS INDICATOR SET?" When the release-in-progress indicator is one, the dump table is being released. Thus, the command is completed and an exception response is returned, STEP 410 "RETURN EXCEPTION RESPONSE CODE."

If the release-in-progress indicator is not set, then an inquiry is made as to whether the specified element exists in the structure, INQUIRY 412 "DOES THE SPECIFIED ELEMENT EXIST IN THE STRUCTURE?" If the specified element does not exist in the structure, the dumping serialization is placed in the DS response operand and an exception response code and DS operand are returned, STEP 414 "RETURN AN EXCEPTION RESPONSE CODE AND DS OPERAND."

On the other hand, when the element exists, a determination is made as to whether the specified control element contains adjunct data, INQUIRY 416 (FIG. 31b) "DOES THE SPECIFIED CONTROL ELEMENT CONTAIN ADJUNCT DATA?" If the control-element identified by the element name has an adjunct area, the adjunct-area object is placed in the response operand and the response count is set to indicate the presence of adjunct-area data, STEP 418 "PLACE ADJUNCT DATA FROM CONTROL ELEMENT IN RESPONSE OPERAND." Otherwise, the response count is set to indicate the absence of adjunct-area data.

If the specified control element does not contain adjunct data or subsequent to placing the adjunct data in the response operand, a test is made to determine whether the specified element contains data, INQUIRY 420 "DOES THE SPECIFIED ELEMENT CONTAIN DATA?" When the object element identified by the element name contains data, the data is placed in the data block and the dumping serialization is placed in the DS response operand, STEP 422. The data block, the DS response operand and a successful response code are returned, STEP 424 "RETURN A SUCCESSFUL RESPONSE CODE."

When the object element identified by the element name does not contain data, the DS response operand and an exception response are returned, STEP 426 "RETURN AN EXCEPTION RESPONSE CODE AND DS OPERAND."

The read dumping-object data command may be issued after the dumping serialization has been freed. However, if a consistent view of the data is required, the dumping serialization must be maintained across the retrieval of the data.

Returning to FIG. 20b, subsequent to reading the entry data or if no entry data needed to be read, the DIB and the entry data are copied to an output buffer and written to the dump data set, STEP 428 "WRITE DIB & DATA." This process continues until all dump table entries are processed, INQUIRY 430 "ARE ALL BLOCKS READ?" In particular, if all of the blocks have not been read, flow returns to STEP 368 "READ CAPTURED BLOCK" and the process continues.

When all of the captured dump data is written to the dump data set, the structure dump table is deleted, using a release dump table command, which is described in detail in co-pending U.S. patent application Ser. No. 08/073,909, which is incorporated herein by reference, STEP 432 "DELETE DUMP TABLE." The release dump table command is also described with reference to FIG. 32.

Figure 32:
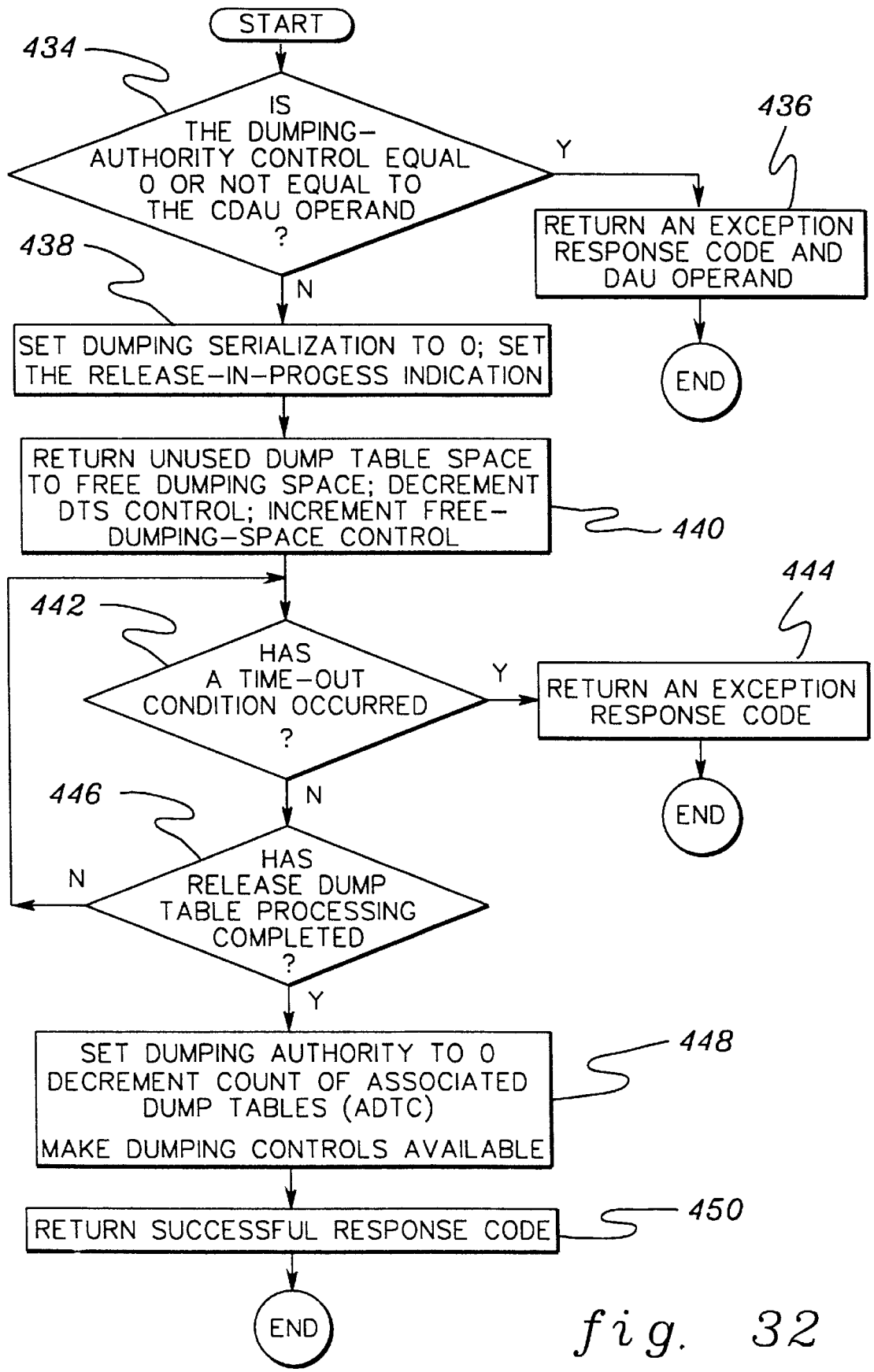
FIG. 32 depicts one embodiment of the logic associated with a release dump table command, in accordance with the principles of the present invention.

Referring to FIG. 32, the dumping-authority control is tested, INQUIRY 434 "IS THE DUMPING-AUTHORITY CONTROL EQUAL 0 OR NOT EQUAL TO THE CDAU OPERAND?" When the dumping-authority control is zero or does not match the value of the CDAU operand, the command is completed and the value of the dumping authority is placed in the DAU response operand. The DAU operand and an exception response are returned, STEP 436 "RETURN AN EXCEPTION RESPONSE CODE AND DAU OPERAND."

When the value of the dumping-authority control is not zero and is equal to the value of the CDAU operand, the dumping serialization is set to zero and the release-in-progress indicator is set to one, STEP 438 "SET DUMPING SERIALIZATION TO 0; SET THE RELEASE-IN-PROGRESS INDICATOR." The release dump table command continues the release of the dump table when the release-in-progress indicator is one. Unused dump table space is returned to free dumping space, the dump table size is decremented and free dumping space control is incremented, STEP 440.

When a model-dependent time-out period has elapsed before the release process is completed, INQUIRY 442 "HAS A TIME-OUT CONDITION OCCURRED?", the release-in-progress indicator is set, the free-dumping-space control and the dump table size are updated by the amount of dump table storage released, and an exception response is returned, STEP 444 "RETURN AN EXCEPTION RESPONSE CODE." If a time-out condition has not occurred, then a determination is made as to whether release dump table processing is complete, INQUIRY 446 "HAS RELEASE DUMP TABLE PROCESSING COMPLETED?"

Should the release dump table processing be incomplete, flow passes to INQUIRY 442. However, when processing is complete and a dump table is released, the dumping authority is set to zero; the count of associated dump tables (ADTC) is decremented; the dumping controls are made available, STEP 448; and a successful response is returned, STEP 450.

The release dump table command also releases dumping structure serialization, which may be held due to requests for ENTRYDATA=SERIALIZE, so notification that dumping serialization is released is sent to the operating systems, STEP 452 (FIG. 20b) "SEND NOTIFICATION THAT DUMPING SERIALIZATION HAS BEEN RELEASED."

As shown in FIG. 20a, subsequent to releasing the dump table, another dump request for the structure may be accepted and flow returns to STEP 170 (FIG. 20a) "WAIT FOR THE DUMP REQUEST."

As described above, when serialization is held, requests against the structure are queued and re-driven at a later time when serialization is released. While the structure is serialized by dump processing, existing connections may continue to make requests against the coupling facility structure, but those requests will be deferred until serialization is released. In one embodiment, these requests will be given an indication that they will be informed of request completion asynchronously. When dumping serialization is released, the deferred requests will be re-driven, as described in detail below.

Figure 33:
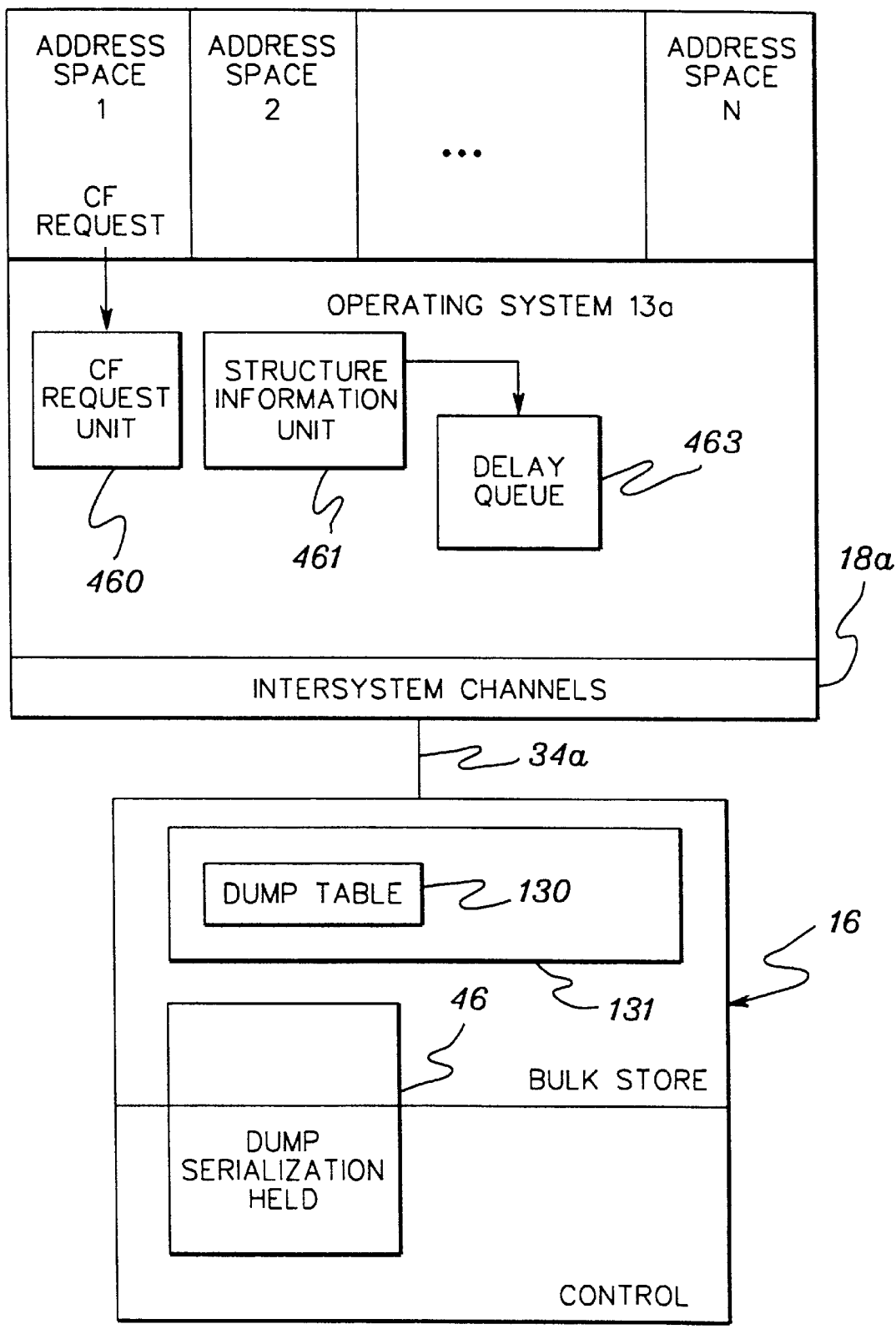
FIG. 33 illustrates one embodiment of a diagram associated with queuing of requests during dumping serialization, in accordance with the principles of the present invention.
Figure 34:
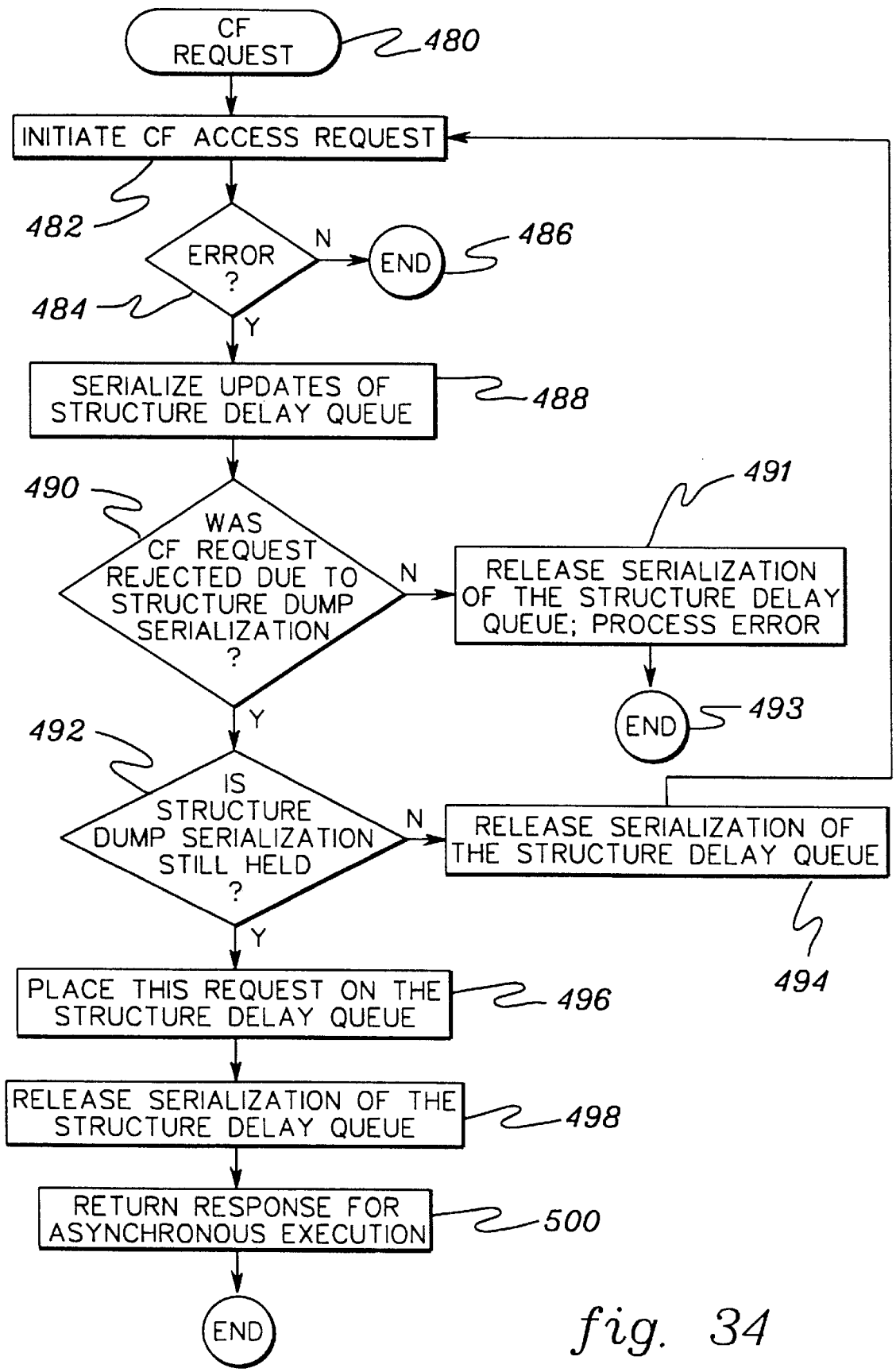
FIG. 34 illustrates one embodiment of the logic associated with queuing requests for dumping serialization, in accordance with the principle of the present invention.

The controlling of access to information stored in a data processing system and, in particular, the queuing of requests during dumping serialization is described in detail with reference to FIGS. 33 and 34. FIG. 33 is one embodiment of a diagram demonstrating the delay of requests due to dumping serialization. As shown, CPC 12a is coupled to coupling facility 16 via bus 34a. CPC 12a includes, for instance, a plurality of address spaces (1-n), operating system 13a and intersystem channels 18a, described above.

Operating system 13a includes a coupling facility request unit 460 for requesting information in a particular structure, structure information unit 461 for storing the state of the structure requested and a delay queue 463 for holding the delayed requests.

Coupling facility 16 includes dump table 130 within dump space 131 and a structure, such as, for instance, cache structure 46 with dump serialization held, as described in detail above.

A request for a coupling facility structure is made by, for example, address space 1 and passed to coupling facility request unit 460. If the coupling facility request unit determines the structure cannot be accessed because dump serialization is held, the request is delayed and stored on delay queue 463. As described below, when the structure is available, the requests on the queue are re-driven.

The logic associated with queuing a structure request is described in detail with reference to FIG. 34. When a request is initiated by address space 1 to access a coupling facility structure, STEP 480 "CF REQUEST," a command is built by the operating system and sent to the coupling facility, STEP 482 "INITIATE CF ACCESS REQUEST." If the command completes with an acceptable response, INQUIRY 484 "ERROR?" command processing completes, STEP 486 "END."

However, if an error condition is returned from the coupling facility, indicating that a structure cannot be accessed, serialization of delay queue 463 is obtained such that a request may be added to the queue, STEP 488 "SERIALIZE UPDATES OF STRUCTURE DELAY QUEUE." In one embodiment, in order to serialize the delay queue a known MVS locking mechanism, referred to as SETLOCK is used. SETLOCK is described in detail in MVS/ESA Application Development Reference Services For Authorized Assembler Language Programs, IBM Publication Number GC28-1650, pages 17–25, which is incorporated herein by reference in its entirety.

After structure delay queue 463 is serialized, a determination is made as to whether the coupling facility request was rejected due to structure dump serialization, INQUIRY 490 "WAS CF REQUEST REJECTED DUE TO STRUCTURE DUMP SERIALIZATION?" If the error condition received in INQUIRY 484 indicates that structure dumping serialization is not held due to dumping serialization, the error is processed, STEP 491 "RELEASE SERIALIZATION OF THE STRUCTURE DELAY QUEUE; PROCESS ERROR", and the process for queuing for dump serialization ends, STEP 493 "END."

However, if the error condition indicates structure dumping serialization is held, a check is made to see if dumping serialization is still held, INQUIRY 492 "IS STRUCTURE DUMP SERIALIZATION STILL HELD?" This is determined by checking a dumping serialization released count. This count is only implemented when dumping serialization is released. A copy of the current count is saved in virtual storage before each access to a coupling facility structure. If an error condition indicates such structure dumping serialization is held, the saved count is compared to the current count. If the counts are different, dumping serialization may have been released, so the coupling facility request is re-driven, as described below. If the saved count is equal to the current count, dumping serialization is still held. Serialization for the structure delay queue must be held whenever the dumping serialization release count is checked or updated.

If INQUIRY 492 indicates that structure dump serialization is not held, serialization of the structure delay queue is released, STEP 494 "RELEASE SERIALIZATION OF THE STRUCTURE DELAY QUEUE," and flow returns to, STEP 482 "INITIATE CF ACCESS REQUEST." In one embodiment, release of the delay queue is obtained by using MVS SETLOCK, as described above.

On the other hand, if structure dump serialization is still held, the request is placed on structure delay queue 463, STEP 496 "PLACE THIS REQUEST ON THE STRUCTURE DELAY QUEUE." In one embodiment, the delay queue is a first in/first out (fifo) queue. After placing the request on the queue, serialization of the delay queue is released, STEP 498 "RELEASE SERIALIZATION OF THE STRUCTURE DELAY QUEUE," and a response to the requester of the structure is sent indicating that the command will execute asynchronously, STEP 500 "RETURN RESPONSE FOR ASYNCHRONOUS EXECUTION." In particular, when dumping serialization is released for a structure, a signal is sent to all systems.

Figure 35:
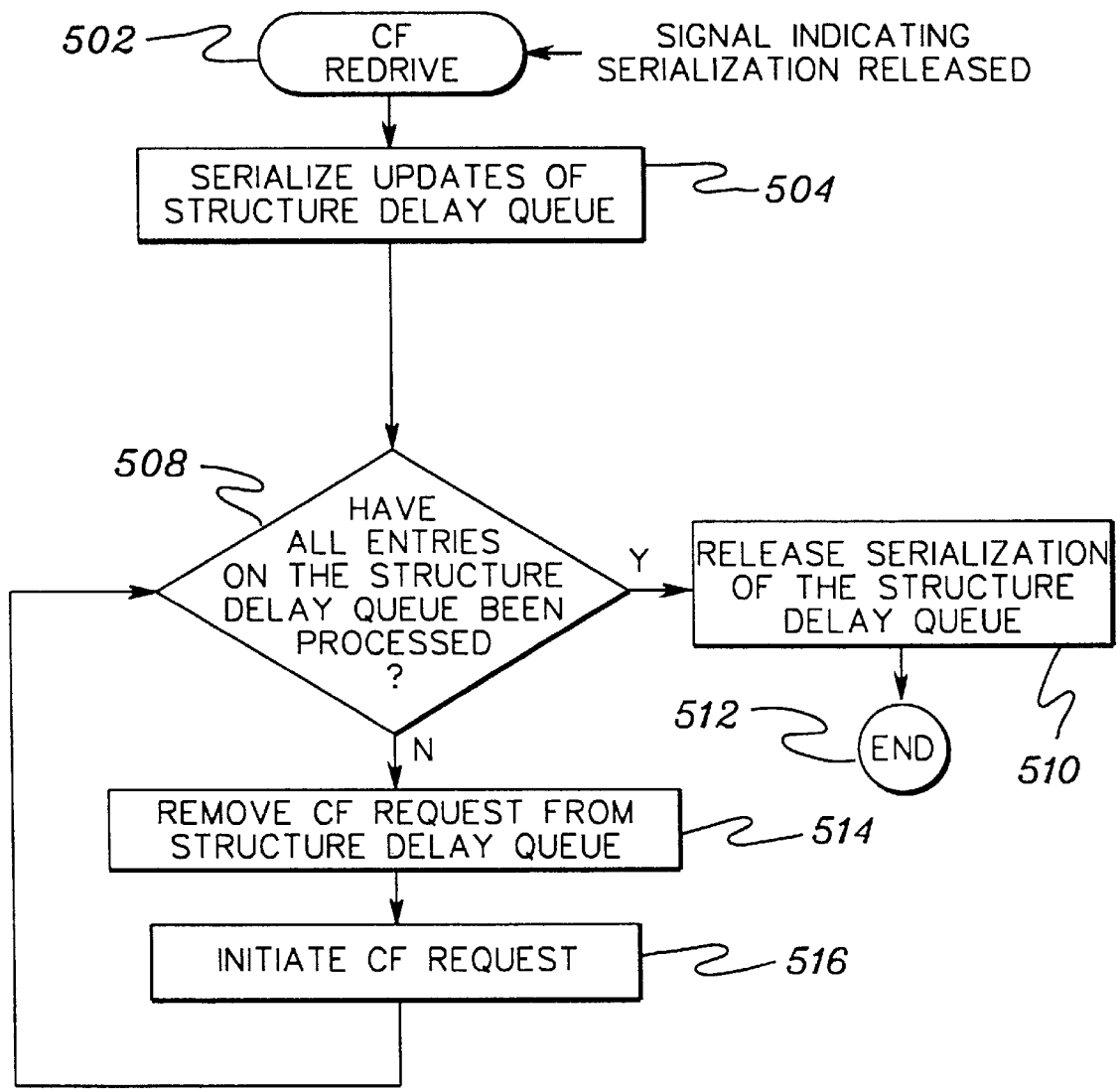
FIG. 35 illustrates one embodiment of the logic associated with re-driving of delayed coupling facility requests, in accordance with the principles of the present invention.

Referring to FIG. 35, receipt of this signal initiates processing to re-drive coupling facility requests for the structure that has been delayed due to dump serialization being held, STEP 502 "CF RE-DRIVE."

In order to re-drive the delayed coupling facility requests, serialization is obtained for the structure delay queue such that no further updates may be made, STEP 504 "SERIALIZE UPDATES OF THE STRUCTURE DELAY QUEUE." Thereafter, a determination is made as to whether all of the entries on the structure delay queue have been processed, INQUIRY 508. If all of the entries on the delay queue have been processed, serialization of the structure delay queue is released, STEP 510, and processing is complete, STEP 512 "END."

On the other hand, if there are additional entries on the structure delay queue to be processed, a coupling facility request is removed from the structure delay queue, STEP 514, and an asynchronous unit of work is scheduled to re-drive the coupling facility request to access the structure, STEP 516 "INITIATE CF REQUEST." After the coupling facility request is initiated, flow returns to INQUIRY 508 to determine if there are further entries on the queue to be processed.

Described above is a technique for initiating and handling a dump request and for queuing and re-driving requests against a serialized structure, in accordance with the principles of the present invention. Described below is a mechanism for initiating or completing a dump when a system loses communication with a coupling facility. As examples, an operating system loses communication with the coupling facility when the operating system loses connectivity to a coupling facility or when the operating system fails. If the operating system loses communication while an SVC dump is in progress, the dump is continued in a manner described below.

Figure 36:
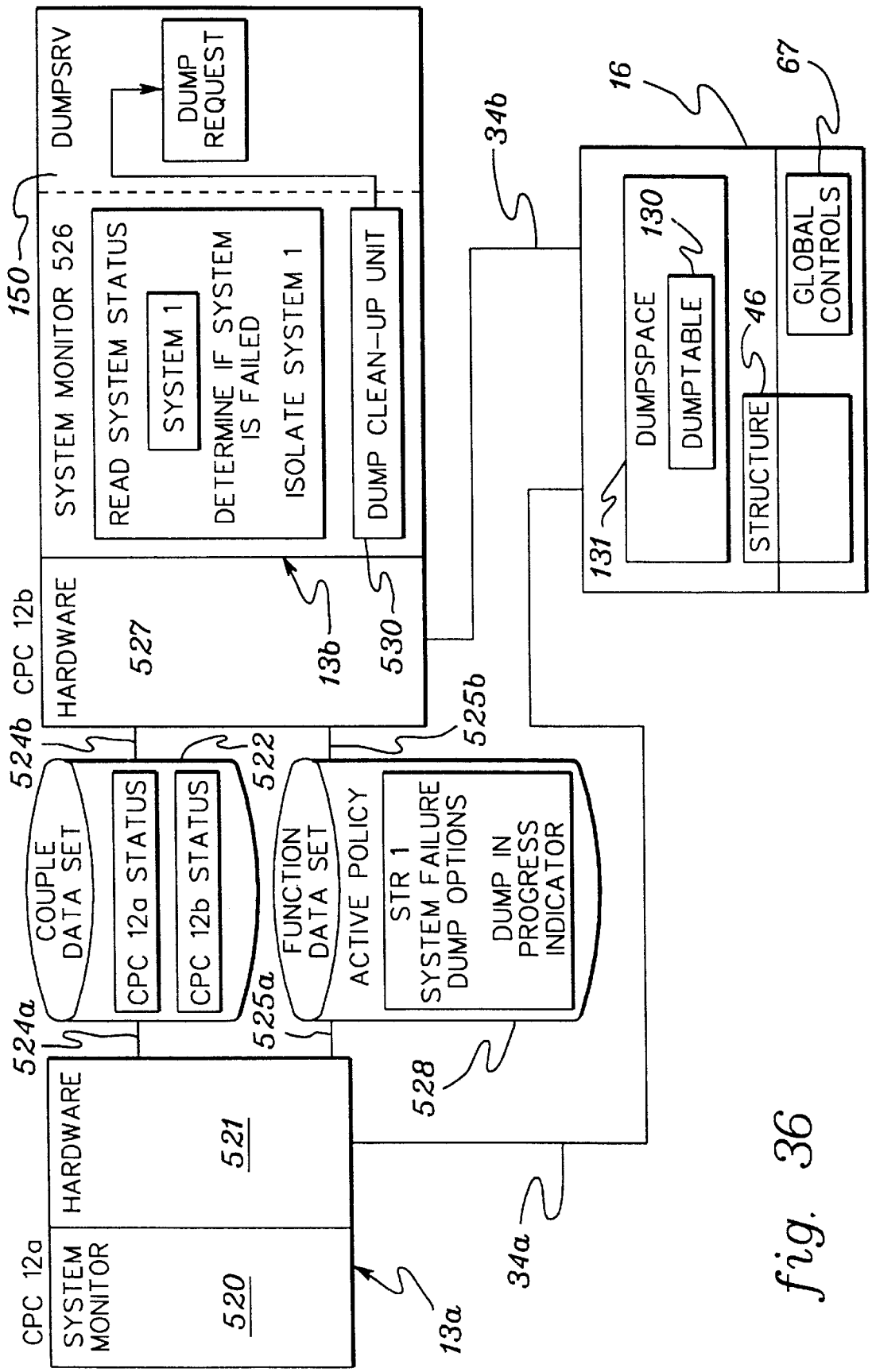
FIG. 36 illustrates one example of a diagram associated with completing a dump for an operating system that has lost communication with a coupling facility, in accordance with the principles of the present invention.

When a system loses communication with a coupling facility while an SVC dump is in progress, the data captured in the coupling facility dump space will remain there until the operator deletes it or until another system writes the captured data to a dump data set. FIG. 36 illustrates one example of the components associated with completing a dump for a system that has lost communication with the coupling facility. In the system shown in FIG. 36, two CPC's exist, CPC 12a and CPC 12b. CPC 12a includes a system monitor 520 located in operating system 13a and hardware 521 to connect CPC 12a to coupling facility 16, couple data set 522 and a function data set 528. In particular, I/S channels 18a (not shown) are used to connect CPC 12a to coupling facility 16 via bus 34a; I/O channels 22 (not shown) are used to connect CPC 12a to couple data set 522 via a link 524a; and function data set 528 is attached to CPC 12a via I/O channels 525a.

Similarly, CPC 12b includes a system monitor 526 located in operating system 13b, a dump service address space DUMPSRV 150 and hardware 527 to connect CPC 12b to coupling facility 16, couple data set 522 and function data set 528. In one example, hardware 527 includes intersystem channels 18b (not shown) to connect CPC 12b to coupling facility 16 via bus 34b; I/O channels 22 (not shown) are used to connect CPC 12b to couple data set 522 via a link 524b;

and function data set 528 is attached to CPC 12b via I/O channels 525b. As described further below, system monitor 526 reads system status from the couple data set to determine, for example, if operating system 13a of CPC 12a has failed and will isolate CPC 12a, if a failure has occurred. Further, operating system 13b associated with system monitor 526 includes a dump clean-up unit 530 which sends a dump request to dump service address space 150 when a dump needs to be continued.

The couple data set includes status for both CPCs. Further, function data set 528 includes the active policy indicating the system failure dump options for the structures in coupling facility 16, such as cache structure 46, and whether a dump is in progress.

In one embodiment, coupling facility 16, which is coupled to CPC 12a and CPC 12b, includes dump table 130 located within dump space 131, a cache structure 46 and global controls 67, as described above.

The logic associated with the technique for continuing a dump when an operating system loses communication with the coupling facility is described in detail with reference to FIGS. 37a–37b. The dump clean-up routine will get control during the system clean-up processing that occurs when a system failure is detected by the system monitor, e.g., system monitor 526 (FIG. 36), or when a system is notified that another system has lost connectivity to the coupling facility. The active policy is read from function data set 528 into a virtual storage buffer, STEP 550 "READ ACTIVE POLICY FROM THE FUNCTION DATA SET." This active policy contains information about the structures that may be allocated in the coupling facility, e.g., cache structure 46 shown in FIG. 36.

Thereafter, a determination is made as to whether processing for the failure has been completed for all of the structures defined in the active policy, INQUIRY 552 "HAS PROCESSING FOR THE FAILURE BEEN COMPLETED FOR ALL STRUCTURES?" If processing is not complete for all of the structures, then a determination is made as to whether the structure is allocated in the coupling facility, INQUIRY 554 "IS THIS STRUCTURE ALLOCATED?" If the structure has not been allocated, then flow returns to INQUIRY 552. On the other hand, if the structure has been allocated, then the read dumping controls command, described in detail below with reference to FIG. 38, is issued so the dump clean-up routine can determine if a structure dump table exists, STEP 556 "READ DUMPING CONTROLS FOR THIS STRUCTURE."

Figure 38:
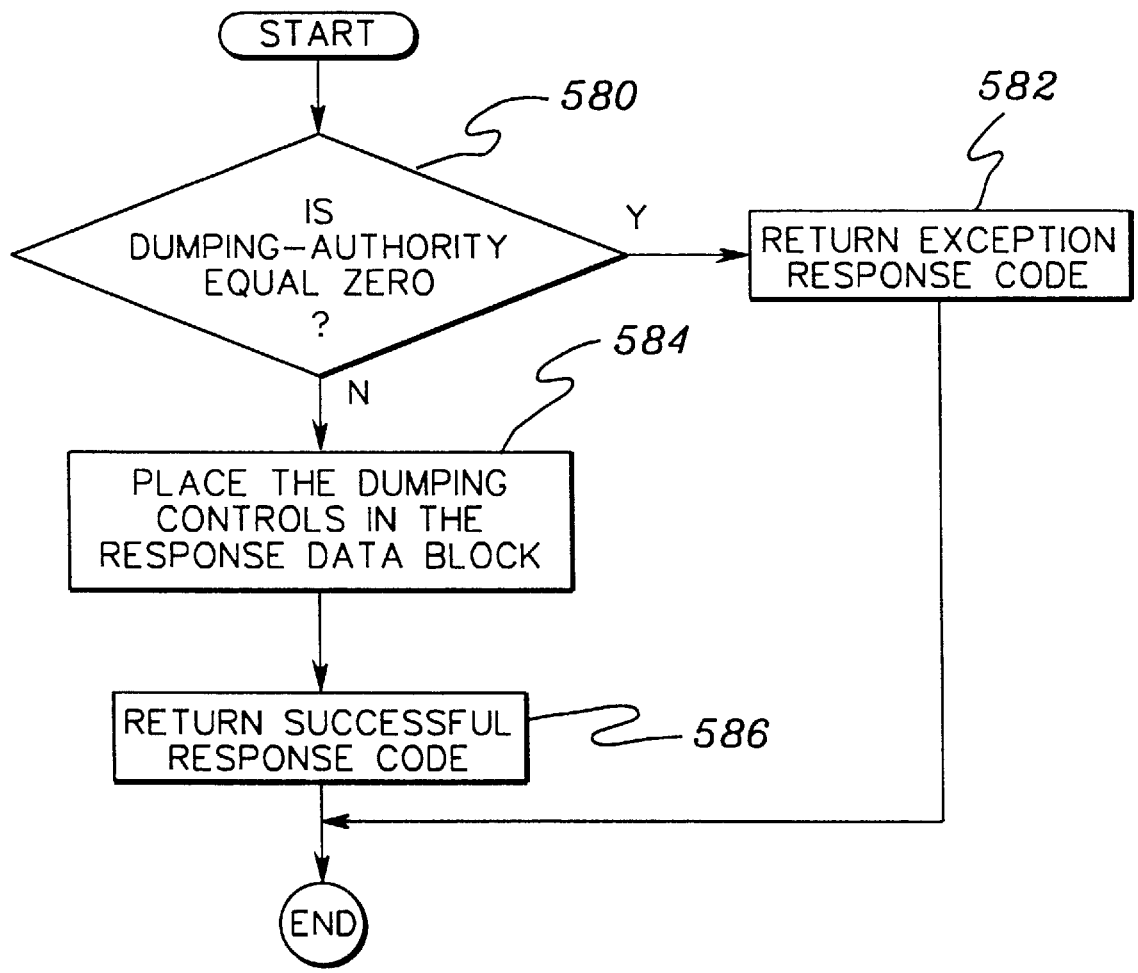
FIG. 38 illustrates one example of the logic associated with a read dumping controls command, in accordance with the principles of the present invention.

In particular, referring to FIG. 38, in order to read the dumping controls, an inquiry is made to determine whether the dumping authority (DAU) located in dumping controls 140 is equal to zero, INQUIRY 580 "IS DUMPING-AUTHORITY EQUAL ZERO?" When the dumping authority is zero, no dump table is assigned to the specified structure. In this case, the data block is not returned, and an exception response is placed in the response operand, STEP 582 "RETURN EXCEPTION RESPONSE CODE."

When the dumping authority is non-zero, the dumping controls are placed in response data block 114, STEP 584 "PLACE THE DUMPING CONTROLS IN THE RESPONSE DATA BLOCK." In particular, the dumping information is placed in the DINF operand, the dumping authority is placed in the DAU operand, the dump serialization value is placed in the DS operand, the dump-table size is placed in the DTS operand, the structure type is placed in the ST operand, and the initialization-complete indicator is placed in the ICI operand. A successful response and the data block are returned, STEP 586 "RETURN SUCCESSFUL RESPONSE CODE."

Returning to FIG. 37a, should there be an associated dump table, INQUIRY 558 "IS THERE AN ASSOCIATE DUMP TABLE?" and a dump is in progress, then dumping controls 140 are returned. The dumping authority field (DAU) of the dumping controls contains the system identifier of the system that is responsible for writing the dump to a dump data set. An inquiry is made as to whether the system identifier in the dump authority field is equal to the identifier of the system that lost communication with the coupling facility, INQUIRY 560 "IS THE DUMP OWNED BY THE FAILED SYSTEM?" If the dump is not owned by the failed system, then flow returns to INQUIRY 552. However, if the system identifiers are equal, then the structure dump is continued by another system and the information is written to the dump data set.

To continue the structure dump, the dump cleanup routine issues the replace dumping controls command, which was described above in detail, passing a new version of the dump authority with the system identifier replaced with the current system identifier and replace the time stamp in the dump authority, STEP 562. This indicates that the current system owns the dump and is responsible for writing it to a dump data set.

Figure 37A:
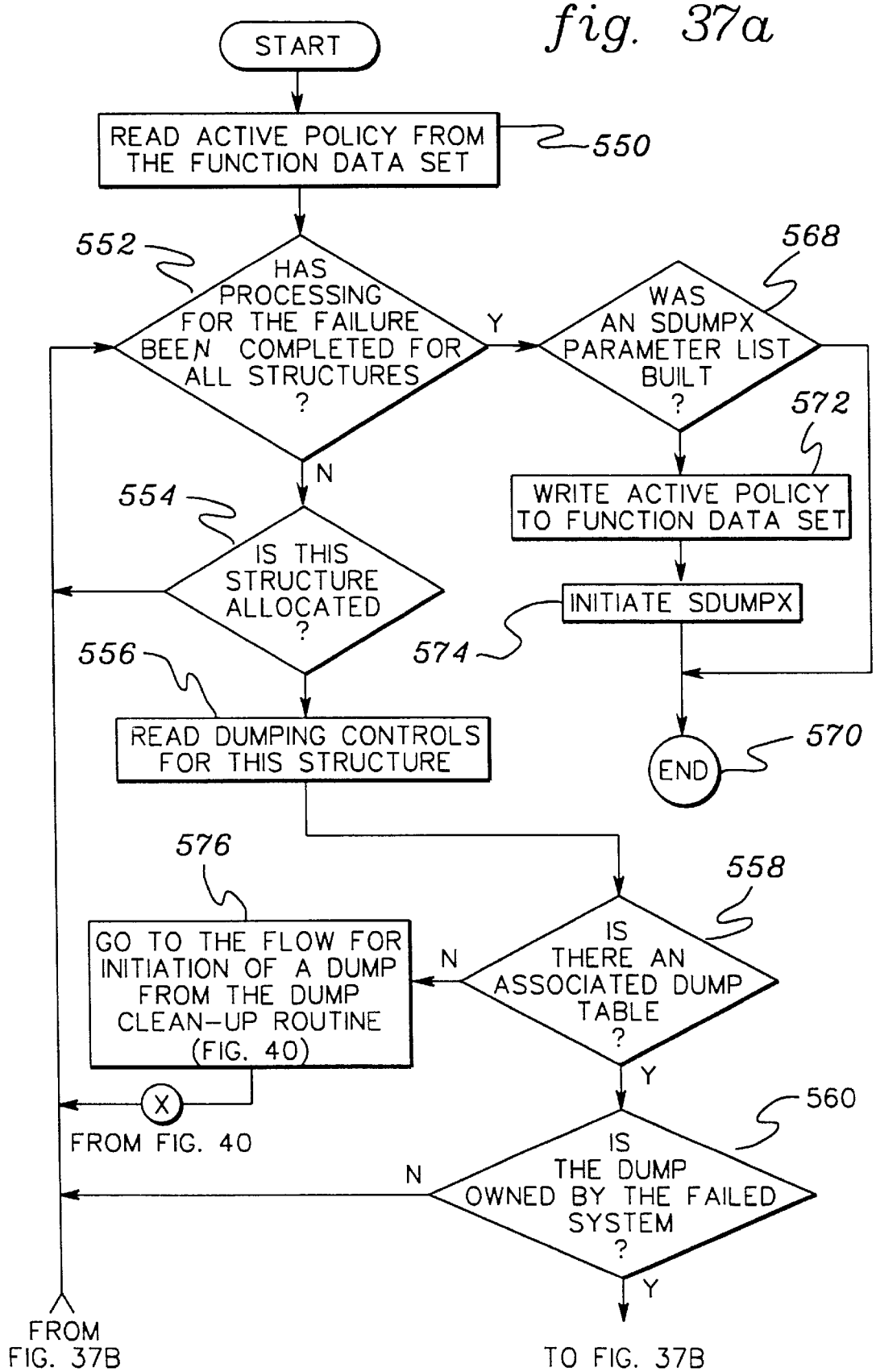
FIGS. 37a–37b illustrate one embodiment of the logic associated with a dump clean-up routine, in accordance with the principle of the present.
Figure 37B:
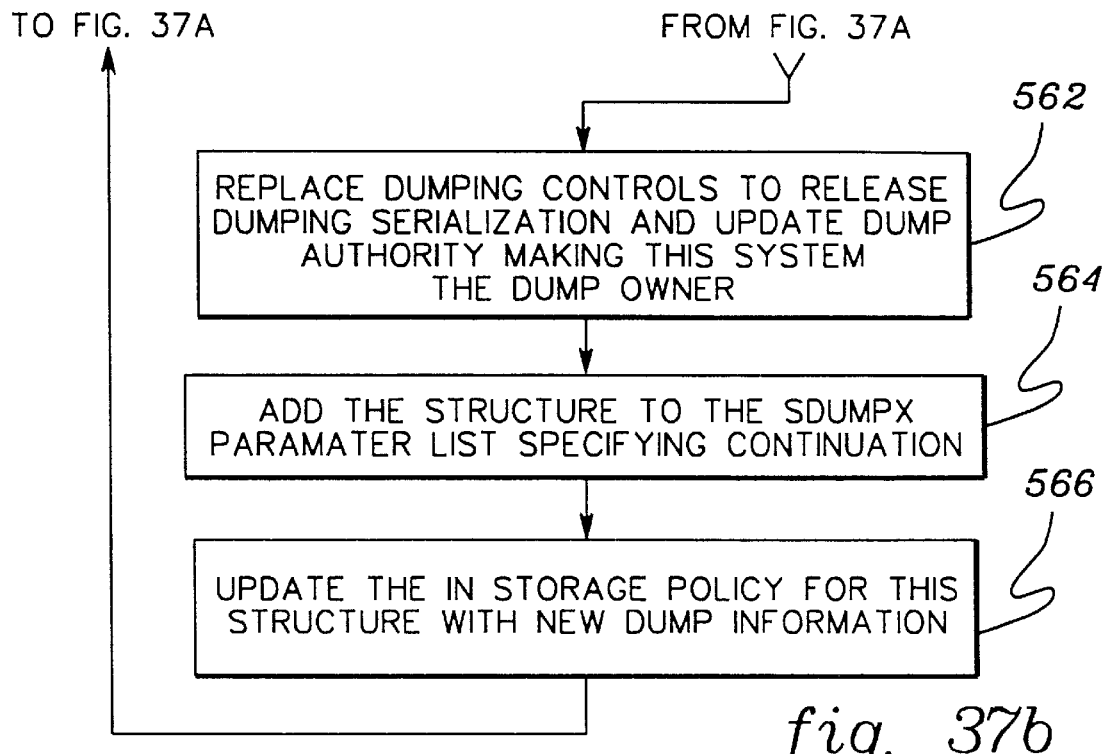

In order to get the structure dump table included in an SVC dump, the dump clean-up routine adds the structure to the STRLIST parameter list and sets a flag indicating that this is a request for an SVC dump to continue the structure dump and bypass the capture processing, STEP 564 "ADD THIS STRUCTURE TO THE SDUMPX PARAMETER LIST SPECIFYING CONTINUATION." Thereafter, the virtual storage buffer containing the policy information for this structure is updated to reflect the dump owner, STEP 566, and flow returns to INQUIRY 552 (FIG. 37a).

Returning to INQUIRY 552, if all of the structures defined in the active policy have been processed, then another determination is made as to whether an SDUMPX parameter list was built, INQUIRY 568 "WAS AN SDUMPX PARAMETER LIST BUILT?" If the parameter list was not built, then processing ends, STEP 570 "END."

However, if an SDUMPX parameter list was built, then the virtual storage buffer containing the updated policy information is written to function data set 528, STEP 572, and the dump clean-up routine requests an SVC dump passing the STRLIST parameter list, STEP 574. The manner in which SDUMPX is initiated for continuation of a dump is described in detail below with reference to FIG. 39.

Figure 39:
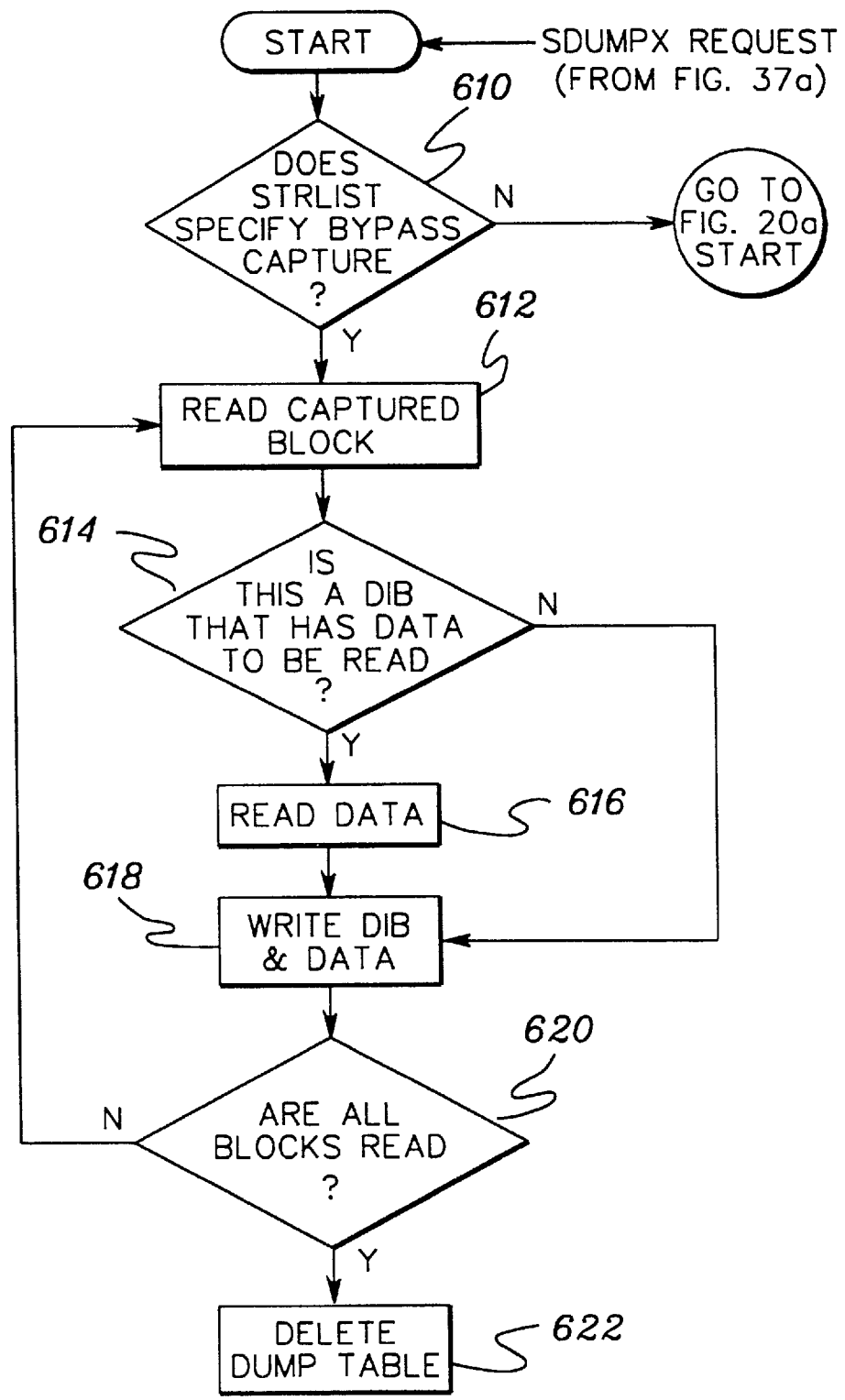
FIG. 39 illustrates one embodiment of the logic associated with a dump request for a continuation of a dump, in accordance with the principles of the present invention.

Referring to FIG. 39, initially, an indication is made as to whether the STRLIST specifies bypass capture, INQUIRY 610 "DOES STRLIST SPECIFY BYPASS CAPTURE." If bypass capture is specified, then processing will continue as described with reference to FIGS. 20a–20b. However, if SVC dump receives a dump request for a structure with the flag set to continue an existing structure dump, it bypasses the captured processing for that structure. To write the captured structure dump to the dump data set, SVC dump uses the read captured block command, described in detail above, to read the first two dump table entries into a buffer in virtual storage, STEP 612 "READ CAPTURE BLOCK."

The entries contain the dump header which is used to determine the characteristics of the remaining dump table entries to be read. The buffer containing the dump header is copied to an output buffer which is written to the dump data set. The data that is returned may either be an object header containing information about the following dumping information blocks or a dumping information block (DIB). The object header is copied to an output buffer and written to the dump data set. If a DIB is returned, SVC dump determines whether the entry data relating to the control entry represented by the DIB must be read, INQUIRY 614 "IS THIS A DIB THAT HAS DATA TO BE READ?" In particular, the dump header that was read into a virtual storage buffer contains the associated request block that was used for the request. For each object header processed, the associated request block is checked to determine whether entry data was requested for the entries in the object. If so, the read dumping object data command, described in detail above, is issued to read the entry data into a buffer, STEP 616 "READ DATA." The DIB and its entry data, if there are any, are copied to an output buffer and written to the dump data set, STEP 618 "WRITE DIB AND DATA." This process continues until all dump table entries are processed, INQUIRY 620 "ALL BLOCKS READ?" In particular, if all of the blocks have not been read, then flow passes to STEP 612 "READ CAPTURED BLOCK." Otherwise, when all of the captured structure dump data is written to the dump data set, the structure dump table is deleted, using the release dump table command, described in detail above, STEP 622 "DELETE DUMP TABLE."

Returning to INQUIRY 558 of FIG. 37*a*, if there is no associated dump table, a dump routine may be initiated, as described in detail below with reference to FIG. 40.

Figure 40:
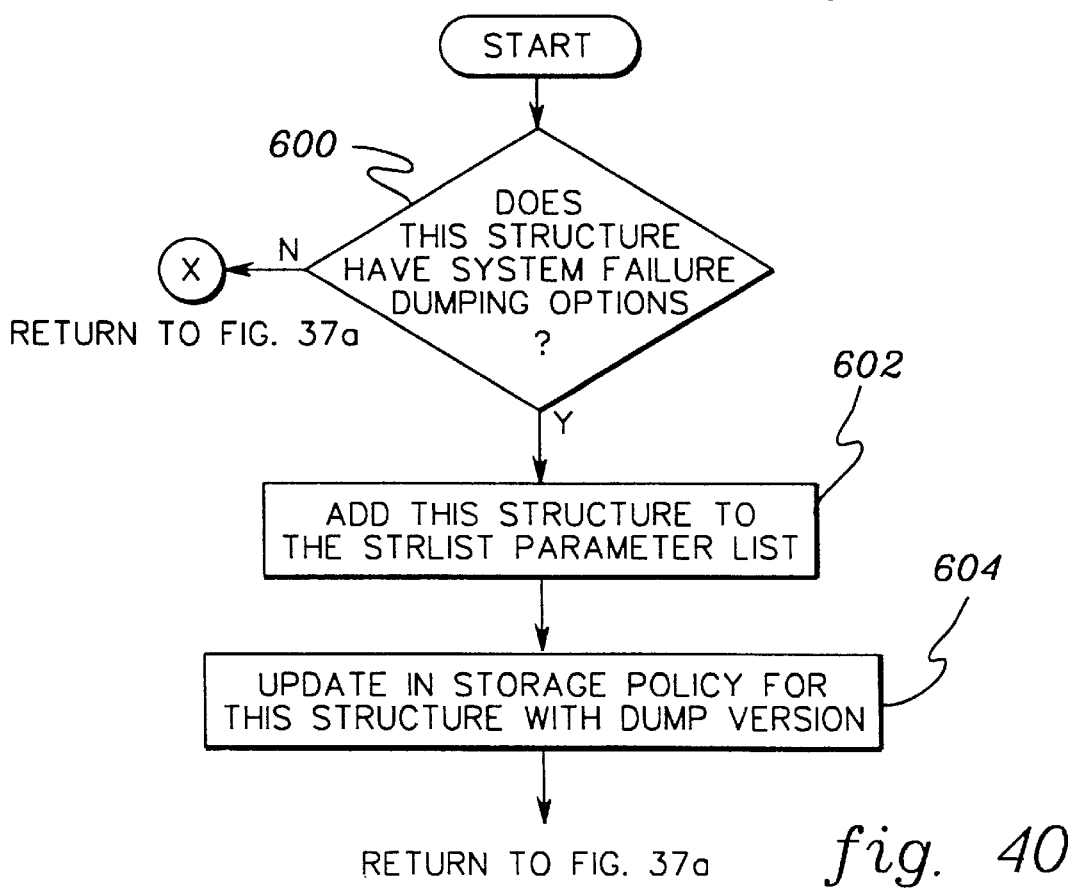
FIG. 40 illustrates one embodiment of the logic associated with a dump initiation routine, in accordance with the principles of the present invention.

Referring to FIG. 40, when an operator specifies structures to be included in a dump when a system fails, dump tailoring options may also be specified. This information is saved in the active policy in function data set 528, along with other information about the structures. Therefore, the dump initiation routine checks each structure in the policy to determine if system failure dumping options were specified, INQUIRY 600 "DOES THIS STRUCTURE HAVE SYSTEM FAILURE DUMPING OPTIONS?" If no dumping failure options were specified then flow returns to INQUIRY 552 of FIG. 37*a*.

On the other hand, if dumping options are specified, the structure name and the saved options are added to the STRLIST parameter list, STEP 602 "ADD THIS STRUCTURE TO THE STRLIST PARAMETER LIST" and the copy of the active policy in the virtual storage buffer is updated to indicate that a dump will be requested for this structure, STEP 604. Thereafter, flow returns to FIG. 37*a* and, in particular, INQUIRY 552.

Described in detail above, are a method and system for capturing and accessing data through program request and when a system loses communication with a coupling facility. When data is being captured, requests against the data are queued and later re-driven, as described in detail herein, in accordance with the principles of the present invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for controlling access to information stored in a data processing system, said method comprising the steps of:

providing, by a user of a processor of said data processing system, a user-specified access time limit, said user-specified access time limit comprising an amount of time said user can tolerate not having access to information located within a coupling facility coupled to said processor;

(ii) initiating at said processor a request for said information located in said coupling facility;

(iii) determining at said coupling facility whether said information is prohibited from being accessed;

(iv) storing said request at said processor when said information cannot be accessed at said coupling facility;

(v) determining, using said user-specified access time limit, how long said information is to be unavailable; and (vi) re-initiating by said processor said request when said information is available.

2. The method of claim 1, wherein said determining (iii) step further comprises the step of ascertaining whether said information is unavailable due to dump serialization.

3. The method of claim 2, wherein said storing step comprises the step of queuing said request when said information is unavailable due to a dumping operation associated with said information.

4. The method of claim 1, wherein said information comprises one or more of control information, entry data and adjunct data.

5. The method of claim 1, wherein said user is a first user connected to said information.

6. The method of claim 1, further comprising the step of overriding any time-out to be initiated due to said user-specified access time limit.

7. A system for controlling access to information stored in a data processing system, said system for controlling access to information comprising:

(i) means for providing, by a user of a processor of said data processing system, a user-specified access time limit, said user-specified access time limit comprising an amount of time said user can tolerate not having access to information located within a coupling facility coupled to said processor;

(ii) means for initiating at said processor a request for said information located in said coupling facility;

(iii) means for determining at said coupling facility whether said information is prohibited from being accessed;

(iv) means for storing said request at said processor when said information cannot be accessed at said coupling facility;

(v) means for determining, using said user-specified access time limit, how long said information is to be unavailable; and (vi) means for re-initiating by said processor said request when said information is available.

8. The system of claim 7, wherein said determining means (iii) further comprises means for ascertaining whether said information is unavailable due to dump serialization.

9. The system of claim 7, wherein said storing means comprises means for queuing said request when said information is unavailable due to a dumping operation associated with said information.

10. The system of claim 7, wherein said information comprises one or more of control information, entry data and adjunct data.

11. The system of claim 7, wherein said user is a first user connected to said information.

12. The system of claim 7, further comprising means for overriding any time out to be initiated due to said user-specified access time limit.

* * * * *